US006791647B1

(12) United States Patent
Kim et al.

(10) Patent No.: US 6,791,647 B1
(45) Date of Patent: *Sep. 14, 2004

(54) MULTI-DOMAIN LIQUID CRYSTAL DISPLAY DEVICE

(75) Inventors: Jeom Jae Kim, Seoul (KR); Doo Hyun Ko, Kumi-shi (KR); Joun Ho Lee, Daeku-kwangyokshi (KR); Jong Soon Kim, Kumi-shi (KR); Jong Hwan Kim, Anyang-shi (KR); Young Woo Cho, Kunpo-shi (KR); Mi Kyung Chu, Anyang-shi (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/598,213

(22) Filed: Jun. 21, 2000

Related U.S. Application Data

(63) Continuation-in-part of application No. 09/256,180, filed on Feb. 24, 1999.

(30) Foreign Application Priority Data

Jun. 21, 1999 (KR) ......................................... 1999-23194
Aug. 11, 1999 (KR) ......................................... 1999-32945

(51) Int. Cl.⁷ ..................... G02F 1/1337; G02F 1/1343; G02F 1/136
(52) U.S. Cl. ........................... 349/129; 349/38; 349/46; 349/110
(58) Field of Search ........................... 349/129, 38, 46, 349/110, 111, 108, 141, 143

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |

(List continued on next page.)

FOREIGN PATENT DOCUMENTS

| | | |
|---|---|---|
| EP | 0 752 611 | 1/1997 |
| EP | 0 814 142 | 12/1997 |
| EP | 0 854 377 | 7/1998 |
| EP | 0 884 626 | 12/1998 |
| GB | 2 296 810 | 7/1996 |
| GB | 2 321 718 | 8/1998 |
| GB | 2 337 843 | 1/1999 |
| JP | 05-297412 | * 11/1993 |

(List continued on next page.)

OTHER PUBLICATIONS

A. Lien, R.A. John, Two–Domain TN–LCDs Fabricated by Parallel Fringe Field Method, SID Digest, 1993, pp. 269–272.

A. Lien, R.A. John, TFT–Addressed Two–Domain TN VGA Displays Fabricated Using the Parallel Fringe Field Method, SID Digest, 1994, pp. 594–597.

N. Koma, Y. Baba, K. Matsuoka, No–Rub Multi–Domain TFT–LCD Using Surrounding–Electrode Method, SID Digest, 1995, pp. 869–872.

(List continued on next page.)

*Primary Examiner*—Robert H. Kim
*Assistant Examiner*—Mike Qi
(74) *Attorney, Agent, or Firm*—McKenna Long & Aldridge

(57) ABSTRACT

A multi-domain liquid crystal display device comprises first and second substrates facing each other; a liquid crystal layer between the first and second substrates; a plurality of gate bus lines arranged in a first direction on the first substrate and a plurality of data bus lines arranged in a second direction on the first substrate to define a plurality of pixel region; a thin film transistor positioned at a crossing area of the data bus line and the gate bus line, the thin film transistor comprising a gate electrode, a semiconductor layer, and source/drain electrodes; a common-auxiliary electrode comprising at least one electrode in the each pixel region; a plurality of pixel electrodes electrically charged through the thin film transistor; and an alignment layer on at least one substrate between the first and second substrates.

32 Claims, 72 Drawing Sheets

U.S. PATENT DOCUMENTS

| | | | | |
|---|---|---|---|---|
| 4,978,203 | A | | 12/1990 | Yamazaki et al. ...... 350/339 R |
| 5,249,070 | A | | 9/1993 | Takano ........................ 359/54 |
| 5,528,396 | A | * | 6/1996 | Someya et al. ............... 359/59 |
| 5,574,582 | A | | 11/1996 | Takeda et al. ................ 359/59 |
| 5,623,354 | A | | 4/1997 | Lien et al. .................. 349/124 |
| 5,668,650 | A | | 9/1997 | Mori et al. .................... 349/42 |
| 5,737,051 | A | | 4/1998 | Kondo et al. ............... 349/141 |
| 5,777,701 | A | | 7/1998 | Zhang .......................... 349/44 |
| 5,907,376 | A | * | 5/1999 | Shimada et al. .............. 349/42 |
| 6,100,953 | A | * | 8/2000 | Kim et al. ................... 349/129 |
| 6,184,945 | B1 | * | 2/2001 | Sung ............................ 349/38 |
| 6,184,961 | B1 | * | 2/2001 | Ham .......................... 349/141 |
| 6,335,776 | B1 | * | 1/2002 | Kim et al. .................. 349/129 |
| 6,462,798 | B1 | * | 10/2002 | Kim et al. .................. 349/129 |

FOREIGN PATENT DOCUMENTS

| | | |
|---|---|---|
| JP | 09-054342 | 2/1997 |
| JP | 09-197420 | 7/1997 |
| JP | 09-230387 | 9/1997 |
| WO | 961 0774 | 4/1996 |

OTHER PUBLICATIONS

H. Murai, M. Suzuki, S. Kaneko, Novel High Contrast Random and Controlled 4–Domain CTN–LCDs with Wide Viewing Angle, Euro Display '96, pp. 159–161.

Y. Koike, S. Kataoka, T. Sasaki, H. Chida, H. Tsuda, A. Takeda K. Ohmuro, T. Sasabayashi, K. Okamoto, A Vertically Aligned LCD Providing Super–High Image Quality, IDW '97, pp. 159–162.

N. Koma, R. Nishikawa, Development of a High–Quality TFT–LCD for Projection Displays, SID Digest, 1997, pp. 461–464.

K. Ohmuro, S. Kataoka, T. Sasaki, Y. Koike, Development of Super–High Image Quality Vertical Alignment Mode LCD, SID Digest, 1997, pp. 845–848.

U.S. patent application Ser. No. 09/250,262, Kim et al., filed Feb. 1999.

U.S. patent application Ser. No. 09/357,247, Lee, filed Jul. 1999.

U.S. patent application Ser. No. 09/537,570, Kim et al., filed Mar. 2000.

U.S. patent application Ser. No. 09/256,180, Seo et al., filed Feb. 1999.

U.S. patent application Ser. No. 09/326,415, Kim et al., filed Jan. 1999.

U.S. patent application Ser. No. 09/421,114, Kim et al., filed Oct. 1999.

U.S. patent application Ser. No. 09/448,276, Lee et al., filed Nov. 1999.

U.S. patent application Ser. No. 09/497,507, Lee et al., filed Feb. 2000.

U.S. patent application Ser. No. 09/327,283, Yoo et al., filed Jan. 1999.

U.S. patent application Ser. No. 09/598,213, Kim et al., filed Jun. 2000.

U.S. patent application Ser. No. 09/541,426, Kim et al., Apr. 2000.

U.S. patent application Ser. No. 09/567,134, Kim et al., May. 2000.

U.S. patent application Ser. No. 09/618,165, Choi et al., Jul. 2000.

* cited by examiner

MULTI-DOMAIN LIQUID CRYSTAL DISPLAY DEVICE

CROSS REFERENCE TO RELATED APPLICATIONS

The application is a Continuation-in-Part of U.S. patent application Ser. No. 09/256,180 filed on Feb. 24, 1999 and this application also claims the benefit of Korean Patent Application No. 1999-23194, filed on Jun. 21, 1999 and No. 1999-32945, filed on Aug. 11, 1999, which are hereby incorporated by reference for all purposes as if fully set forth herein.

BACKGROUND OF THE INVENTION

1. Field of the Invention

The present invention relates to a liquid crystal display device (LCD), and more particularly, to a liquid crystal display device having a common-auxiliary electrode.

2. Description of the Related Art

Recently, an LCD has been proposed where the liquid crystal is not aligned and the liquid crystal is driven by side-electrodes insulated from pixel electrodes. FIG. 1 is sectional view of pixel unit of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions. A thin film transistor (TFT) applies image signal delivered from the data bus line to a pixel electrode 13 on a passivation layer 37. The TFT is formed on each pixel region and comprises a gate electrode, a gate insulator, a semiconductor layer, a source electrode, and a drain electrode, etc. Side electrode 15 is formed surrounding the pixel electrode 13 on the gate insulator, thereon passivation layer 37 is formed over the whole first substrate, and a part of pixel electrode 13 overlaps side electrode 15.

Alternatively, pixel electrode 13 is formed on the gate insulator, and passivation layer 37 is formed over the whole first substrate.

On second substrate, a common electrode 17 is formed and together with pixel electrode 13 applies electric field to a liquid crystal layer. Side electrode 21 and open area (slit) 27 distort the electric field applied to the liquid crystal layer. Then in a unit pixel liquid crystal molecules are driven variously. This means that when voltage is applied to the LCD, dielectric energy due to the distorted electric field arranges the liquid crystal directors in needed or desired positions.

In the LCDs, however, open area 27 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak. Then, when voltage over a threshold voltage, $V_{th}$, is applied, the time needed to stabilize the liquid crystal directors increases. In particular, the response time can be over 100 msec. At this time, disclination occurs from the area where the liquid crystal directors are parallel with a transmittance axis of the polarizer, which results in a decrease in brightness. Further, according to the surface state of LCDs, the liquid crystal texture has an irregular structure.

Furthermore, in the conventional LCDs, although a storage electrode is formed on the gate bus line to maintain the voltage applied to the pixel electrode, there are still the problems of filters resulted from the shortage generated between the gate bus line and the storage electrode.

SUMMARY OF THE INVENTION

Accordingly, the present invention is directed to an LCD that substantially obviates one or more problems due to limitations and disadvantages of the related art.

An object of the present invention is to provide a multi-domain LCD having high response time characteristics and high brightness by stable arrangement of liquid crystal molecules, and preventing the flicker from generating.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a liquid crystal layer between the first and second substrates; a plurality of gate bus lines arranged in a first direction on the first substrate and a plurality of data bus lines arranged in a second direction on the first substrate to define a plurality of pixel region; a thin film transistor positioned at a crossing area of the data bus line and the gate bus line, the thin film transistor comprising a gate electrode, a semiconductor layer, and source/drain electrodes; a common-auxiliary electrode comprising at least one electrode in the each pixel region; a plurality of pixel electrodes electrically charged through the thin film transistor; and an alignment layer on at least one substrate between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings:

FIGS. 23A to 24D are sectional views taken along the line VIII—VIII of FIG. 21A;

FIG. 24 is a sectional view taken along the line IX—IX of FIG. 21B;

DETAILED DESCRIPTION OF THE PREFERRED EMBODIMENTS

Hereinafter, the multi-domain liquid crystal display device of the present invention is explained in detail by accompanying the drawings.

Figure 1:
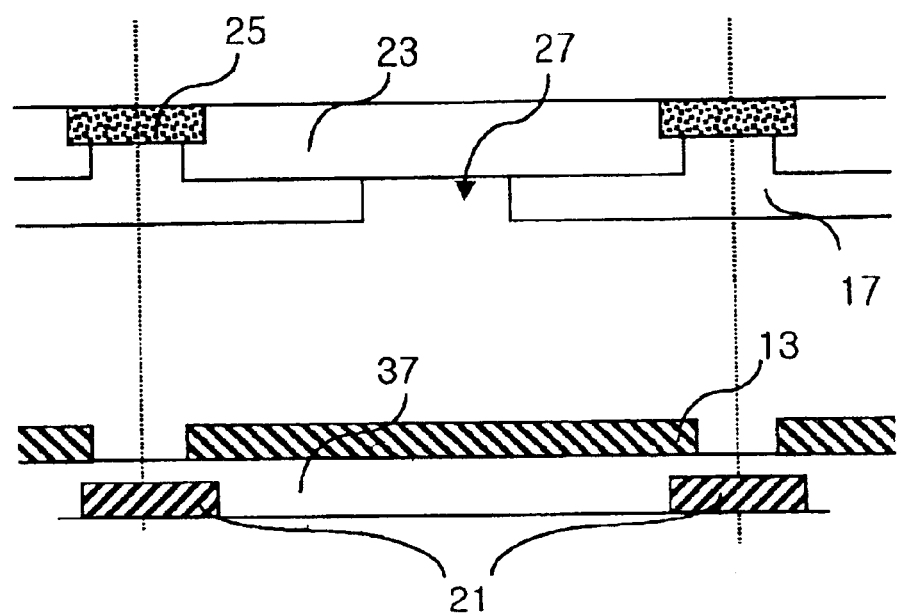
FIG. 1 is a sectional view of the liquid crystal display device in the related art.
Figure 2A:
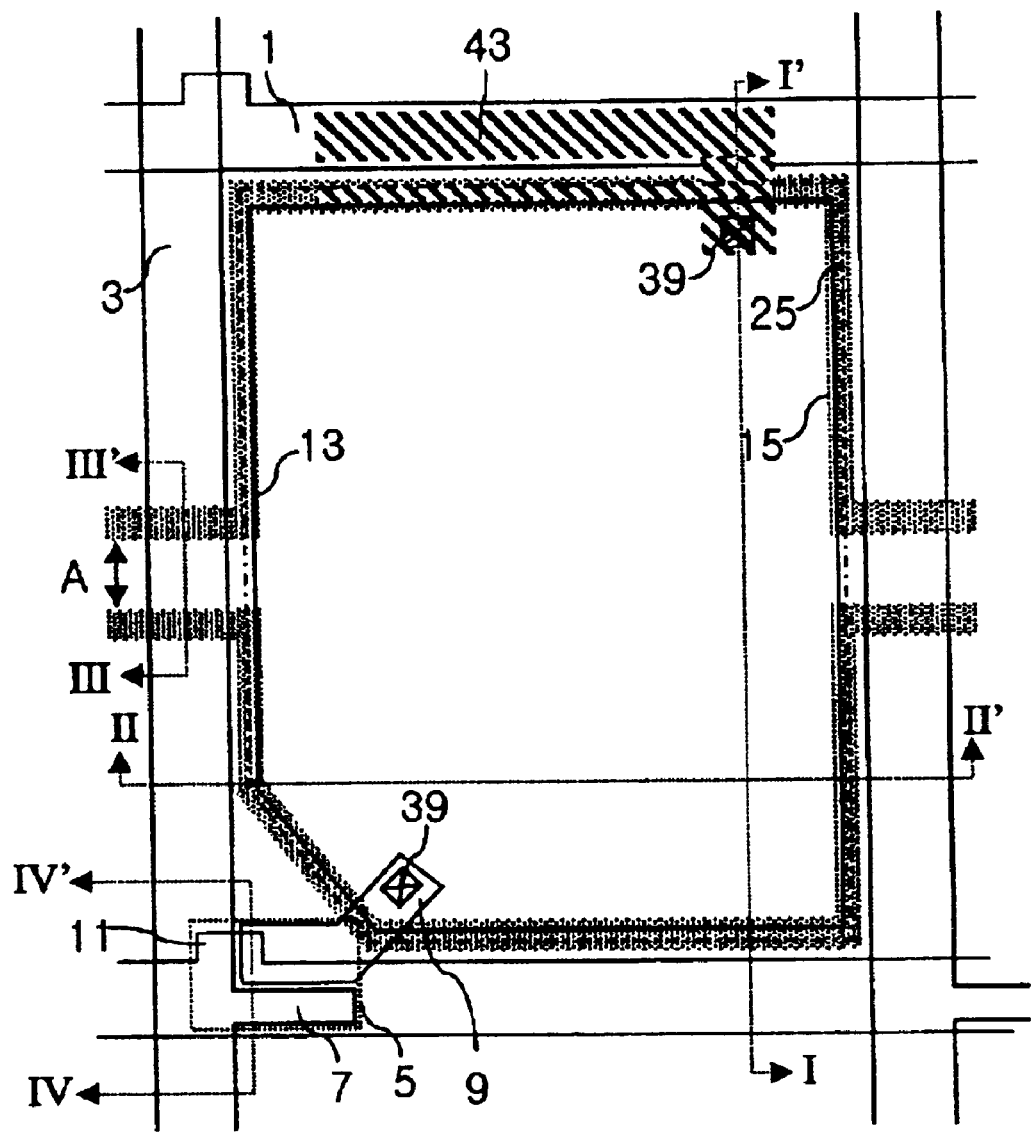
FIGS. 2A to 2C are plans of the multi-domain liquid crystal display devices according to the first embodiment of the present invention.
Figure 2B:
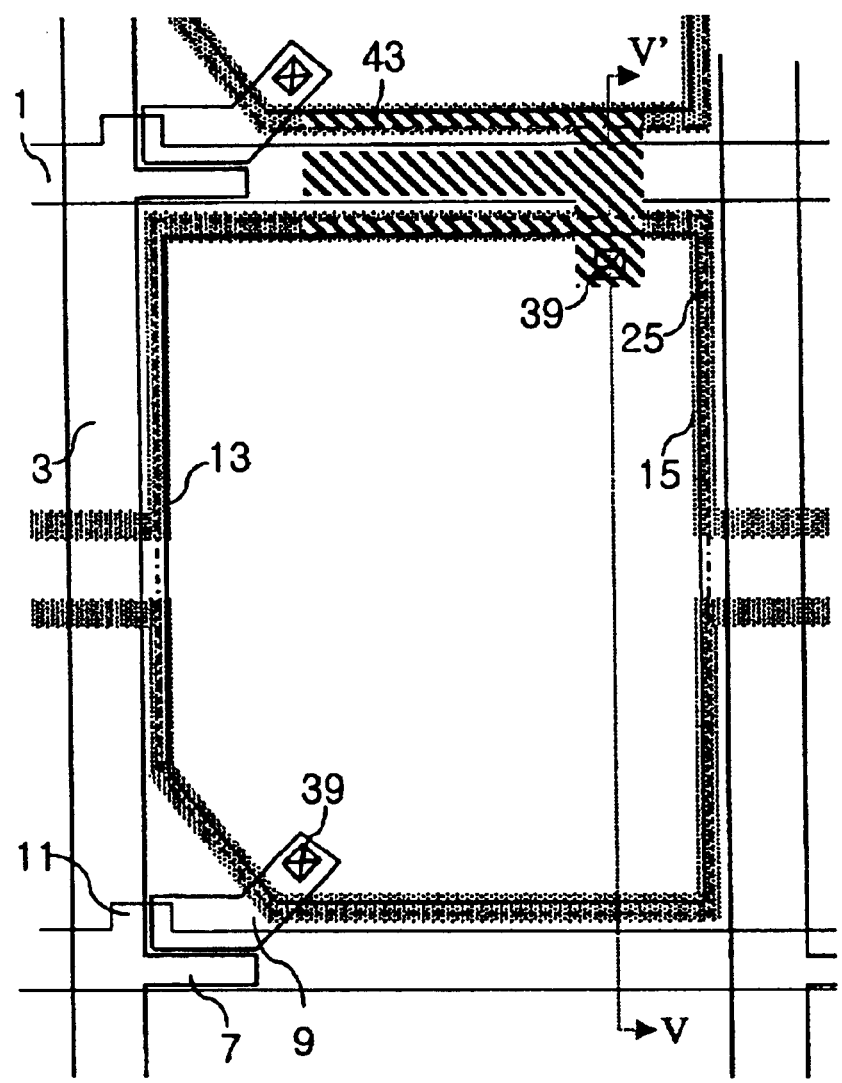
Figure 2C:
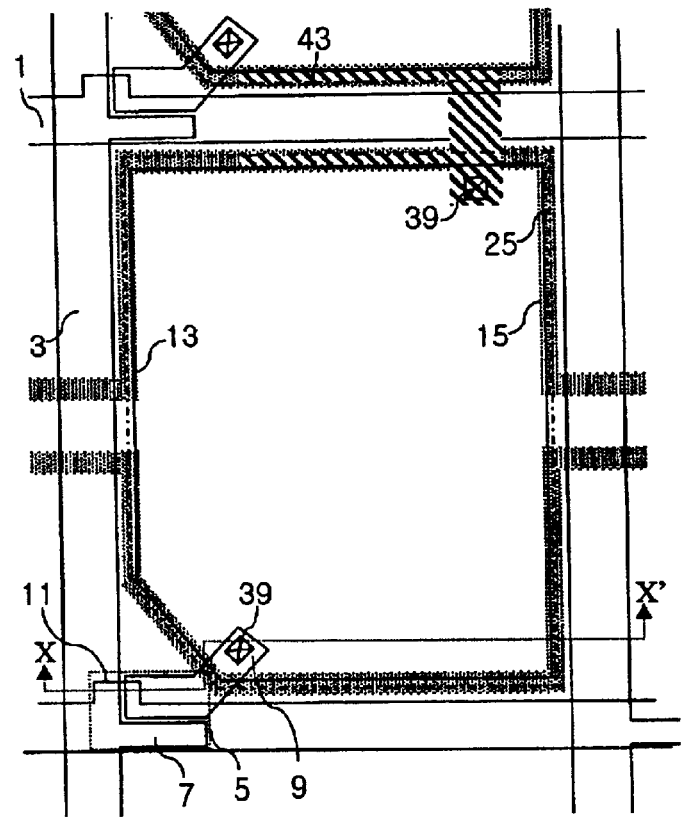
Figure 3:
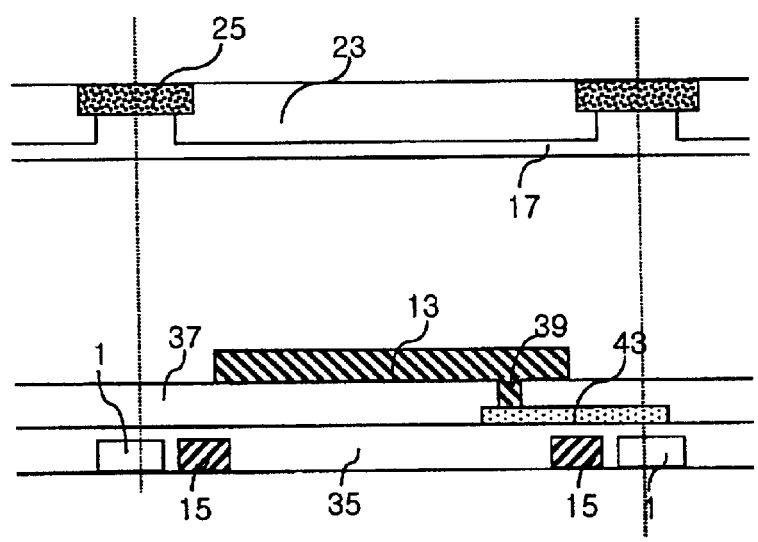
FIG. 3 is a sectional view taken along the line I—I of FIG. 2A.
Figure 4A:
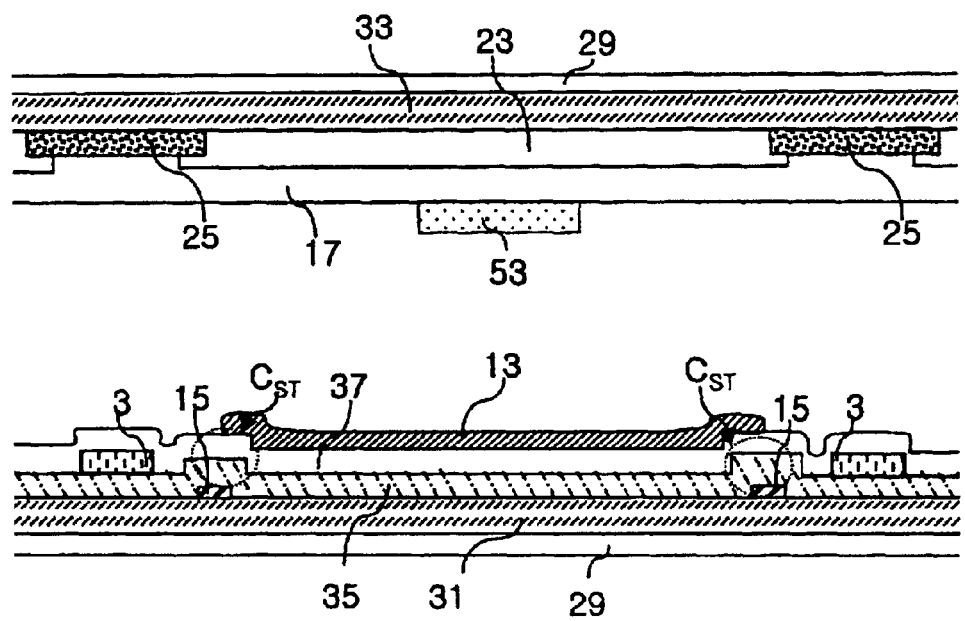
FIGS. 4A to 4B are sectional views taken along the line II—II of FIG. 2A
Figure 4B:
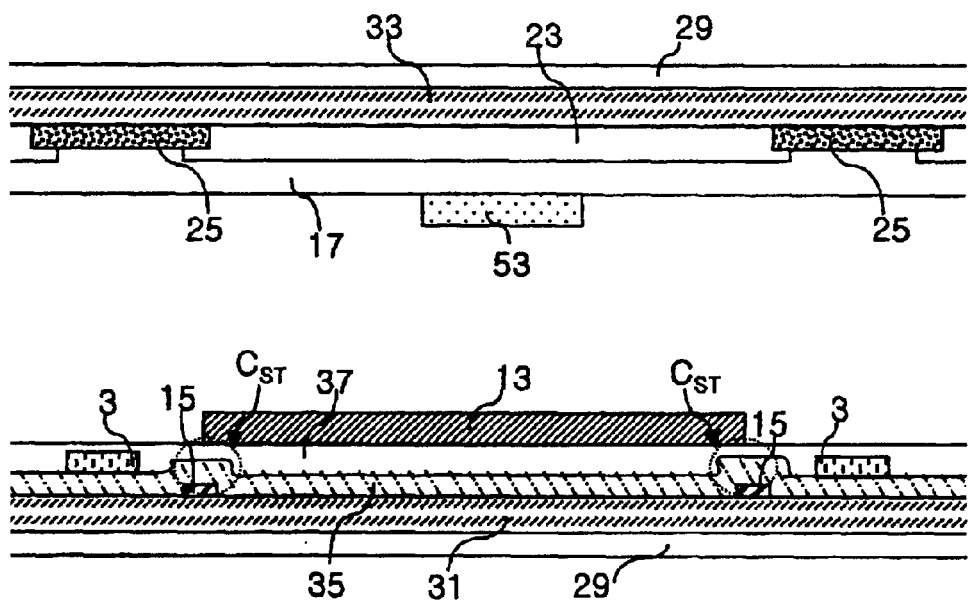
Figure 5:
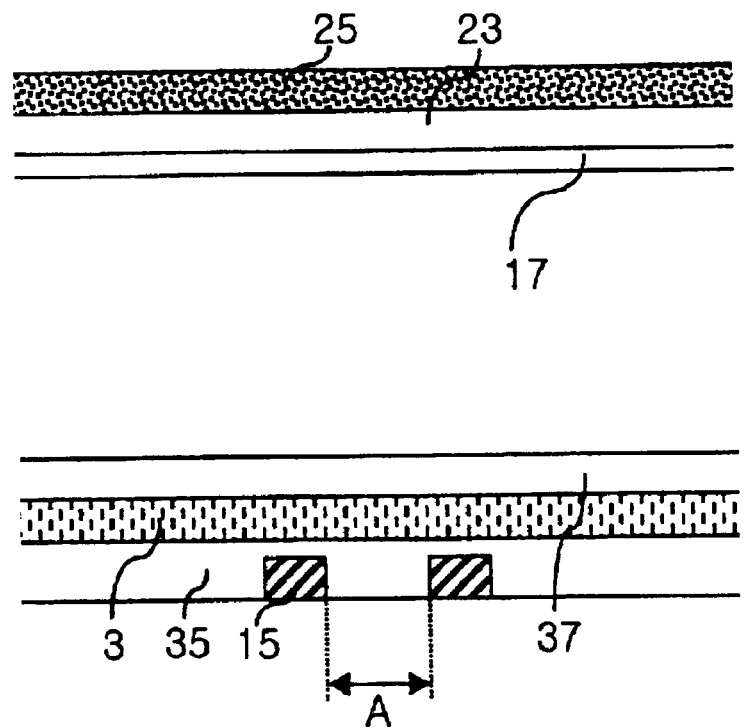
FIG. 5 is a sectional view taken along the line III—III of FIG. 2A.
Figure 6:
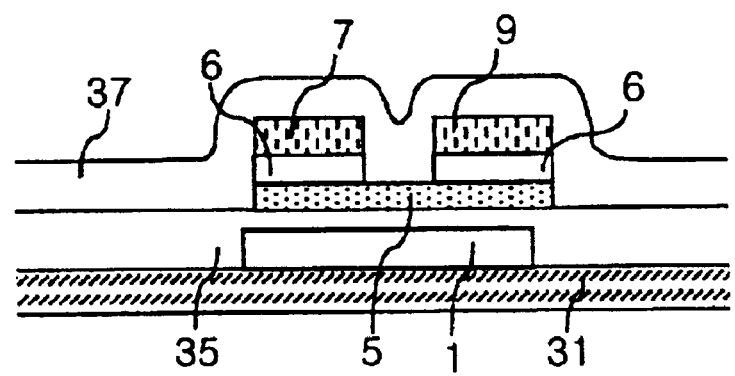
FIG. 6 is a sectional view taken along the line IV—IV of FIG. 2A.
Figure 7:
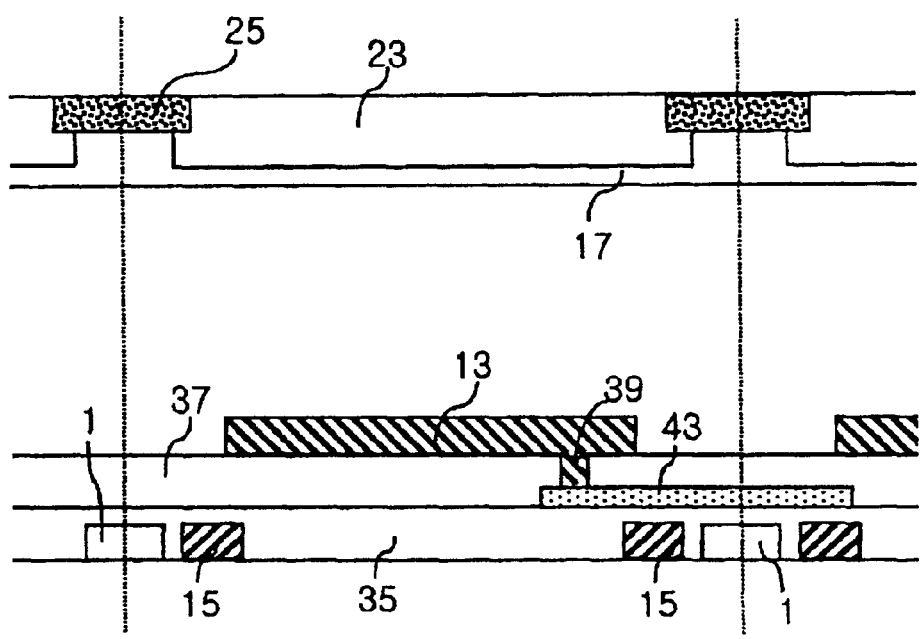
FIG. 7 is a sectional view taken along the line V—V of FIG. 2B.

FIGS. 2A to 2C are plans of the multi-domain liquid crystal display devices according to the first embodiment of the present invention, FIG. 3 is a sectional view taken along the line I—I of FIG. 2A, FIGS. 4A to 4B are sectional views taken along the line II—II of FIG. 2A, FIG. 5 is a sectional view taken along the line III—III of FIG. 2A, FIG. 6 is a sectional view taken along the line IV—IV of FIG. 2A, FIG. 7 is a sectional view taken along the line V—V of FIG. 2B.

As shown in the figures, the present invention comprises first and second substrates, a plurality of gate bus lines 1 arranged in a first direction on a first substrate and a plurality of data bus lines 3 arranged in a second direction on the first substrate, a common-auxiliary electrode 15, a TFT, a passivation layer 37, and a pixel electrode 13.

Data bus lines 3 and gate bus lines 1 divide the first substrate into a plurality of pixel regions. The common-auxiliary electrode 15 comprises at least one electrode in a pixel region on the same layer whereon the gate bus line 1 is formed. The TFT is formed on each pixel region and comprises a gate electrode 11, a gate insulator 35, a semi-conductor layer 5, an ohmic contact layer 6, and source/drain electrodes 7, 9. Passivation layer 37 is formed on the whole first substrate 31. Pixel electrode 13 is coupled to drain electrode 9.

On a second substrate, a light shielding layer 25 is formed to shield the light leaked from gate and data bus lines 1, 3, and the TFT, a color filter layer 23 is formed on the light shielding layer, a common electrode 17 is formed on the color filter layer, and a liquid crystal layer is formed between the first and second substrates.

FIGS. 31A to 31E are views showing the forming process of the present multi-domain liquid crystal display device taken along the line X—X of FIG. 2C.

To manufacture the multi-domain LCD of the present invention, in each pixel region on the first substrate 31, a TFT is formed comprising gate electrode 11, gate insulator 35, semiconductor layer 5, ohmic contact layer 6 and source/drain electrodes 7, 9. At this time, a plurality of gate bus lines 1 and a plurality of data bus lines 3 are formed to divide the first substrate 31 into a plurality of pixel regions.

Gate electrode 11 and gate bus line 1 are formed by sputtering and patterning a metal such as Al, Mo, Cr, Ta, Al alloy, etc. At this time, common-auxiliary electrode 15 is formed surrounding the pixel region. (refer to the FIG. 31A) The common-auxiliary electrode 15 comprises at least one electrode in each pixel region, the each electrode is driven independently one another. And, as shown in the FIGS. 2A and 5, the distance A between the common-auxiliary electrodes is within 7 μm, and preferably 4 to 7 μm, at the connecting parts which connect to a common-auxiliary electrode in a pixel region neighboring the pixel region.

The gate insulator 35 is formed by depositing $SiN_x$ or $SiO_x$ using PECVD thereon. Semiconductor layer 5 and the ohmic contact layer 6 are formed by depositing with PECVD(Plasma Enhanced Chemical Vapor Deposition) and patterning amorphous silicon (a-Si) and doped amorphous silicon ($n^+$a-Si), respectively. Also, gate insulator 35, amorphous silicon (a-Si), and doped amorphous silicon ($n^+$a-Si) are formed by PECVD and patterned. (refer to the FIG. 31B)

Data bus line 3 and source/drain electrodes 7, 9 are formed by sputtering and patterning a metal such as Al, Mo, Cr, Ta, Al alloy, etc. (refer to the FIG. 31C)

A storage electrode 43 is formed to overlap gate bus line 1 and/or common-auxiliary electrode 15 at the same time, the storage electrode 43 makes a storage capacitor with gate bus line 1 and/or common-auxiliary electrode 15.

Subsequently, passivation layer 37 is formed with BCB (BenzoCycloButene), acrylic resin, polyimide based material, $SiN_x$ or $SiO_x$ on the whole first substrate. Pixel electrode 13 is formed by sputtering and patterning a metal such as ITO(indium tin oxide). (refer to the FIG. 31D)

A contact hole 39 is formed to connect the pixel electrode to the drain and storage electrodes by opening and patterning a part of the passivation layer on drain electrode 9. (refer to the FIG. 31E)

When common-auxiliary electrode 15 and gate bus line 1 are formed with the same material, the common-auxiliary and gate electrodes are simultaneously formed with one mask and connected electrically to common electrode 17, or it is possible to form them with different materials or double layer with additional masks.

On the second substrate 33, a light shielding layer 25 is formed to shield any light leakage from gate and data bus lines 1, 3, the TFT, and common-auxiliary electrode 15. A color filter layer 23 is formed R, G, B (red, green, blue) elements to alternate on the light shielding layer. A common electrode 17 is formed with ITO on the color filter layer, and a liquid crystal layer is formed by injecting liquid crystal between the first and second substrates.

The liquid crystal layer may include liquid crystal molecules having positive or negative dielectric anisotropy. Also, the liquid crystal layer may include chirals dopants.

On at least one substrate between the first and second substrates, a dielectric frame 53 is formed by depositing photosensitive material in a region other than a region where the pixel electrode 13 is formed and patterning in various shapes using photolithography.

The dielectric frame 53 includes material of which dielectric constant is same or smaller than that of the liquid crystal, and the dielectric constant thereof is preferably below 3, for example, photoacrylate or BCB (BenzoCycloButene).

To apply voltage ($V_{com}$) to common-auxiliary electrode 15, Ag-dotting part is formed in each corner of driving area on first substrate 31, electric field is applied with second substrate 33, and the liquid crystal molecules are driven by the potential different. A voltage ($V_{com}$) is applied to common-auxiliary electrode 15 by connecting the Ag-dotting part to the common-auxiliary electrode, which is accomplished simultaneously by forming the common-auxiliary electrode.

On at least one substrate, a compensation film 29 is formed with polymer. The compensation film is a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming one pixel to multi-domain.

In the present multi-domain liquid crystal display device, it is possible to form a negative biaxial film as the compensation film, which has two optical axes and wider viewing-angle characteristics as compared with the negative uniaxial film. The compensation film could be formed on both substrates or on one of them.

After forming the compensation film, polarizer is formed on at least one substrate. At this time, the compensation film and polarizer are preferably composed as one.

In the multi-domain liquid crystal display device of the present invention, the pixel electrode 13 overlaps common-auxiliary electrode 15, light shielding layer 25 overlaps the common-auxiliary electrode, and then the aperture ratio is improved. Storage electrode 43 forms a storage capacitor $C_{ST}$ by overlapping gate bus line 1 and/or the common-auxiliary electrode 15.

In the multi-domain liquid crystal display device of the in the FIG. 2A, two common-auxiliary electrode 15 surround the pixel region and are driven independently in the pixel region. The each common-auxiliary electrode has connecting parts which connect to a common-auxiliary electrode in a pixel region neighboring the pixel region. A storage electrode 43 is formed overlapping the common-auxiliary electrode 15 and the gate bus line 1 to obtain storage capacitance.

In the multi-domain liquid crystal display device of the in the FIG. 2B, two common-auxiliary electrode 15 surround the pixel region and are driven independently in the pixel region. The each common-auxiliary electrode has connecting parts which connect to a common-auxiliary electrode in a pixel region neighboring the pixel region. A storage electrode 43 is formed overlapping the common-auxiliary electrode 15, the gate bus line 1, and a common-auxiliary electrode in a pixel region neighboring the pixel region to obtain storage capacitance.

In the multi-domain liquid crystal display device of the in the FIG. 2C, two common-auxiliary electrode 15 surround the pixel region and are driven independently in the pixel region. The each common-auxiliary electrode has connecting parts which connect to a common-auxiliary electrode in a pixel region neighboring the pixel region. A storage electrode 43 is formed overlapping the common-auxiliary electrode 15 and a common-auxiliary electrode in a pixel region neighboring the pixel region to obtain storage capacitance and to remove the signal delay of the bus lines.

Figure 8A:
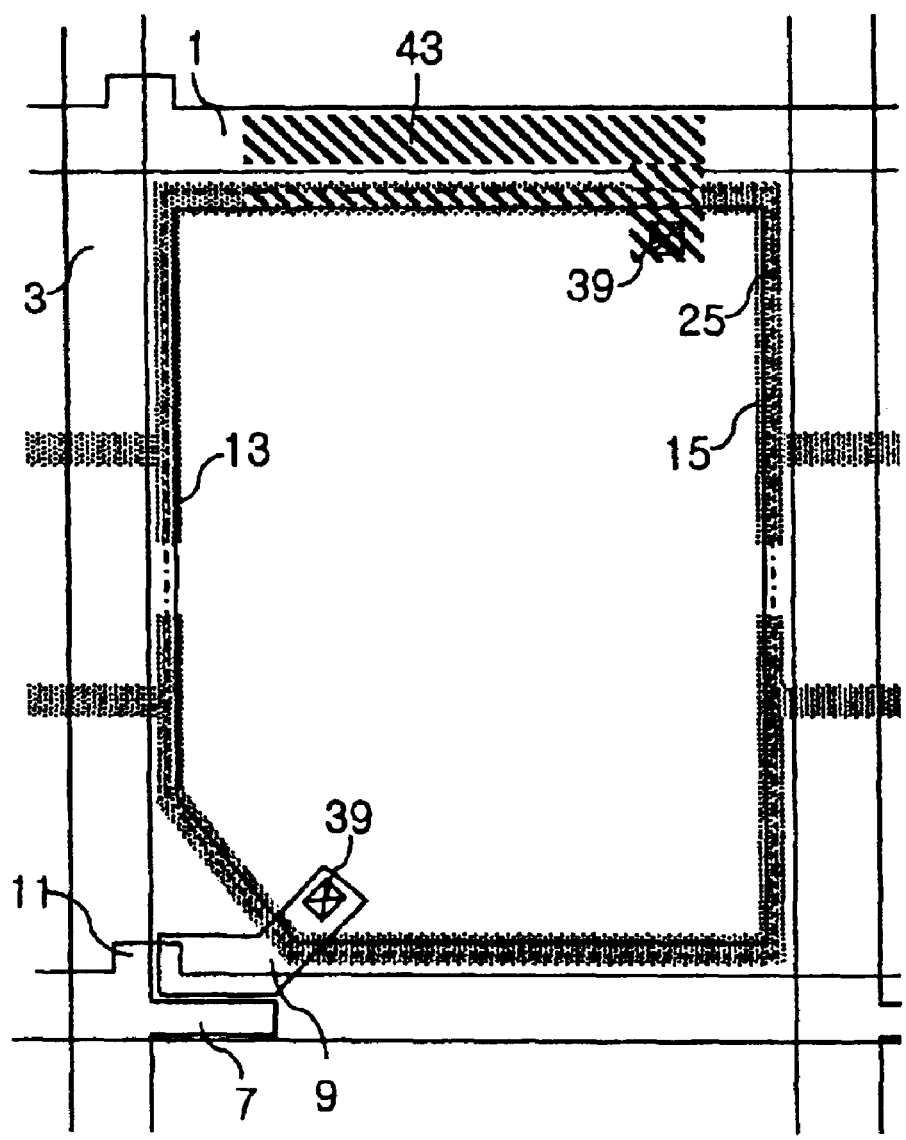
FIGS. 8A to 8C are plan views of the multi-domain liquid crystal display devices according to the second embodiment of the present invention.
Figure 8B:
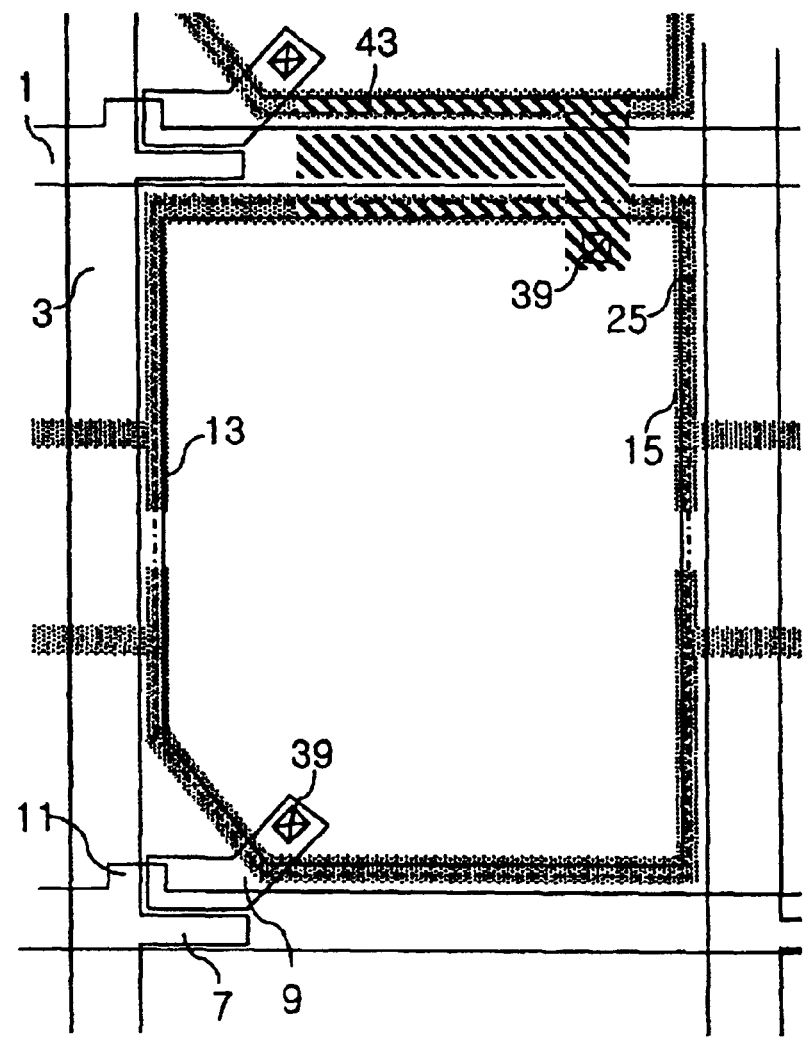
Figure 8C:
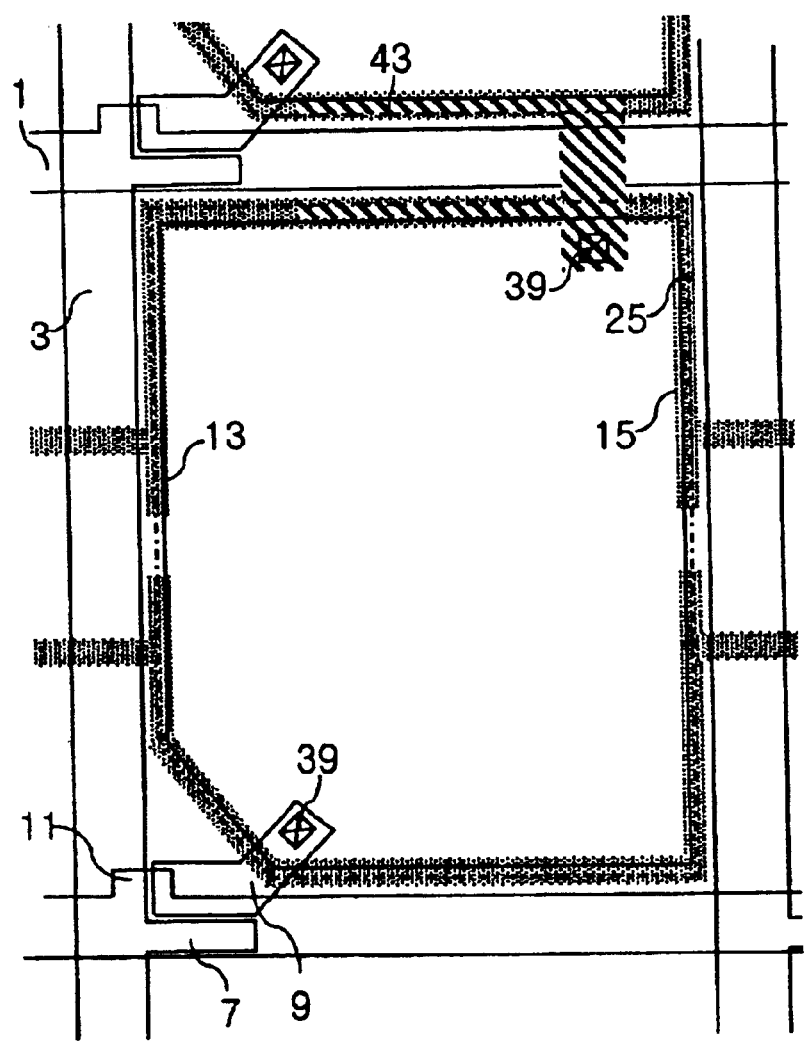
Figure 9A:
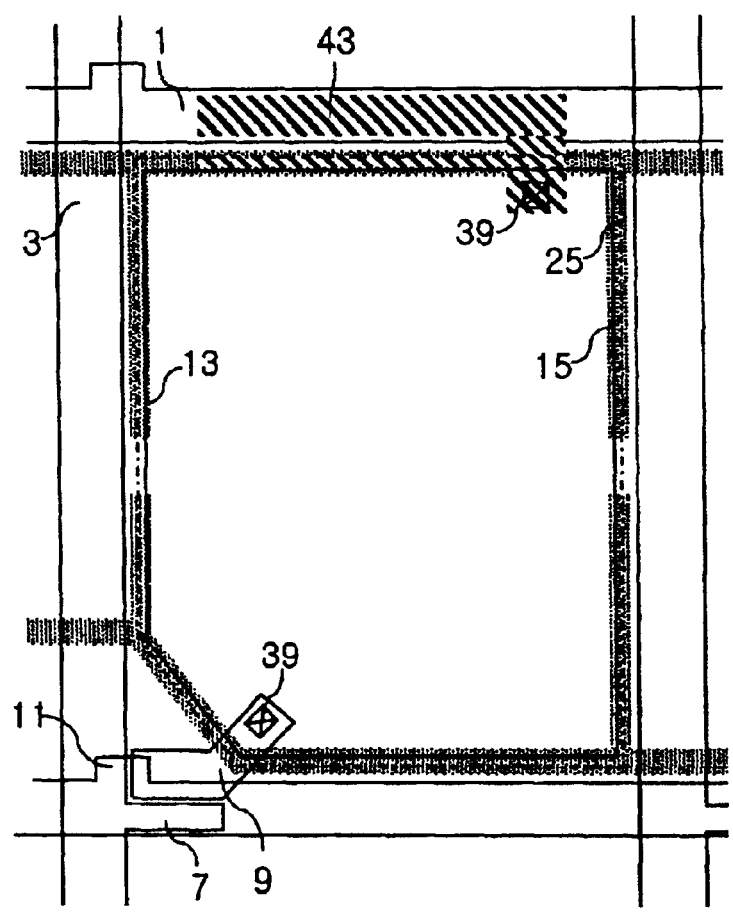
FIGS. 9A to 9C are plan views of the multi-domain liquid crystal display devices according to the third embodiment of the present invention.
Figure 9B:
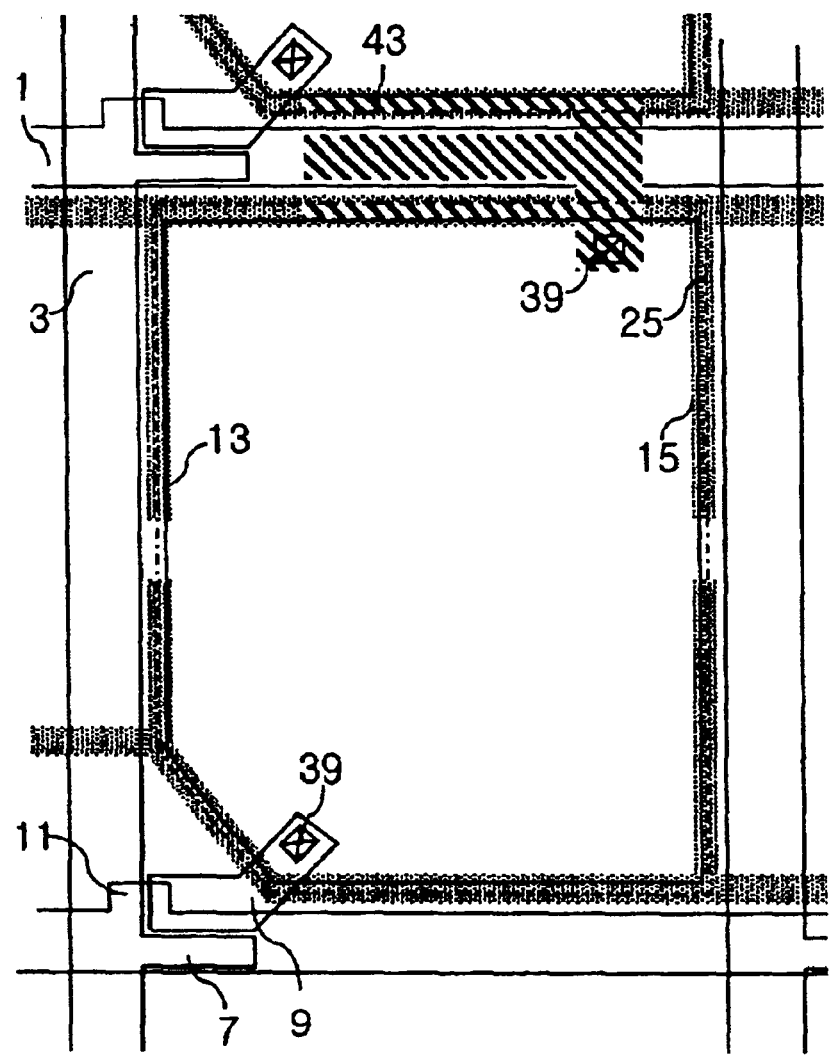
Figure 9C:
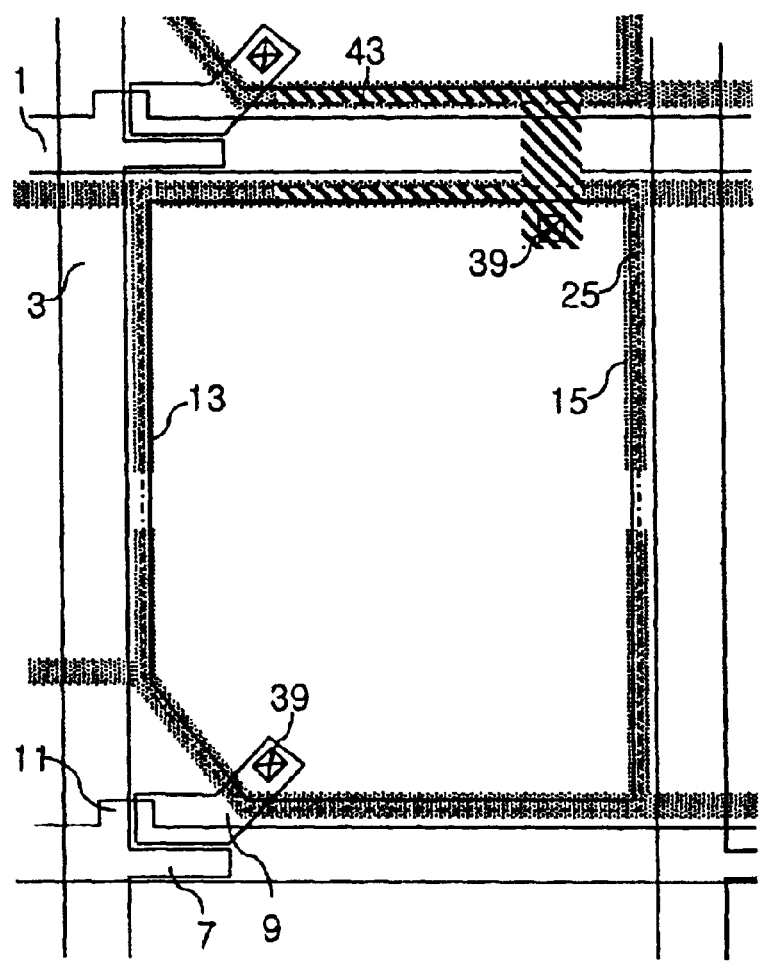
Figure 10A:
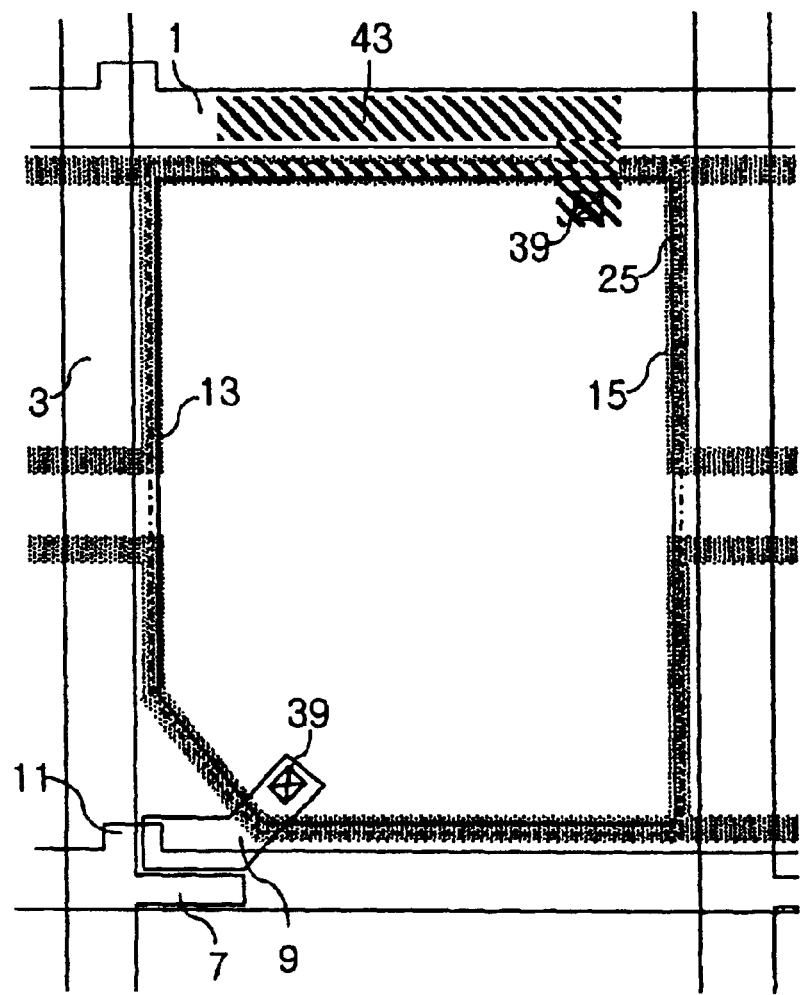
FIGS. 10A to 10C are plan views of the multi-domain liquid crystal display devices according to the fourth embodiment of the present invention.
Figure 10B:
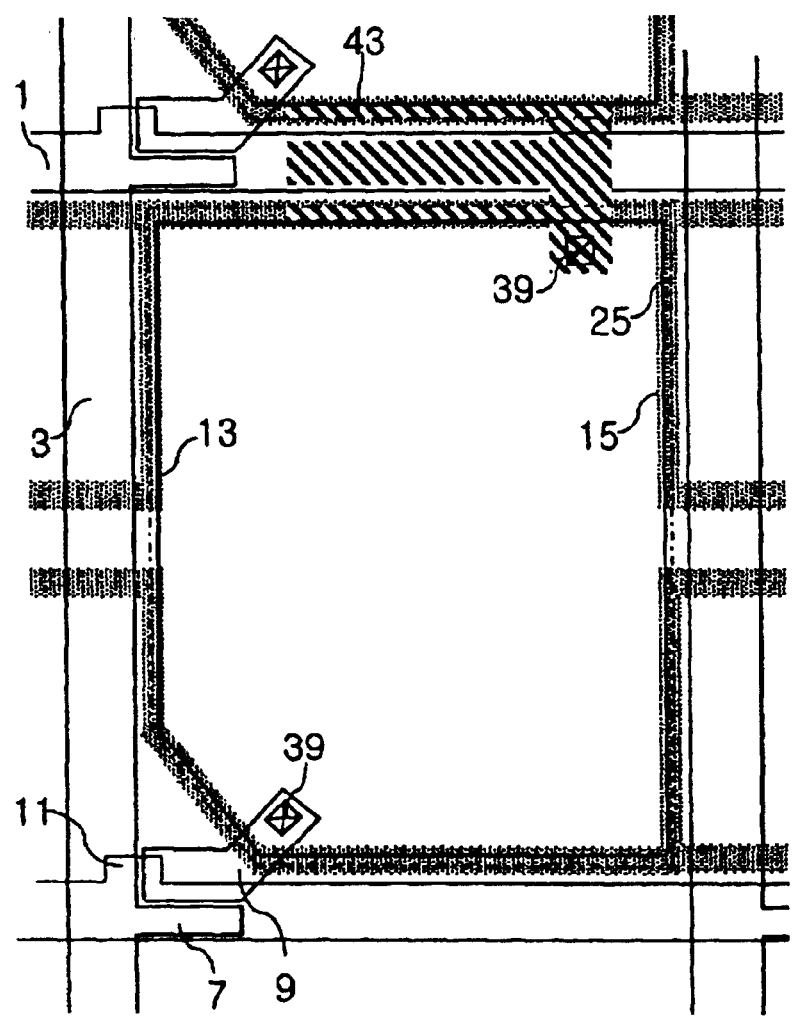
Figure 10C:
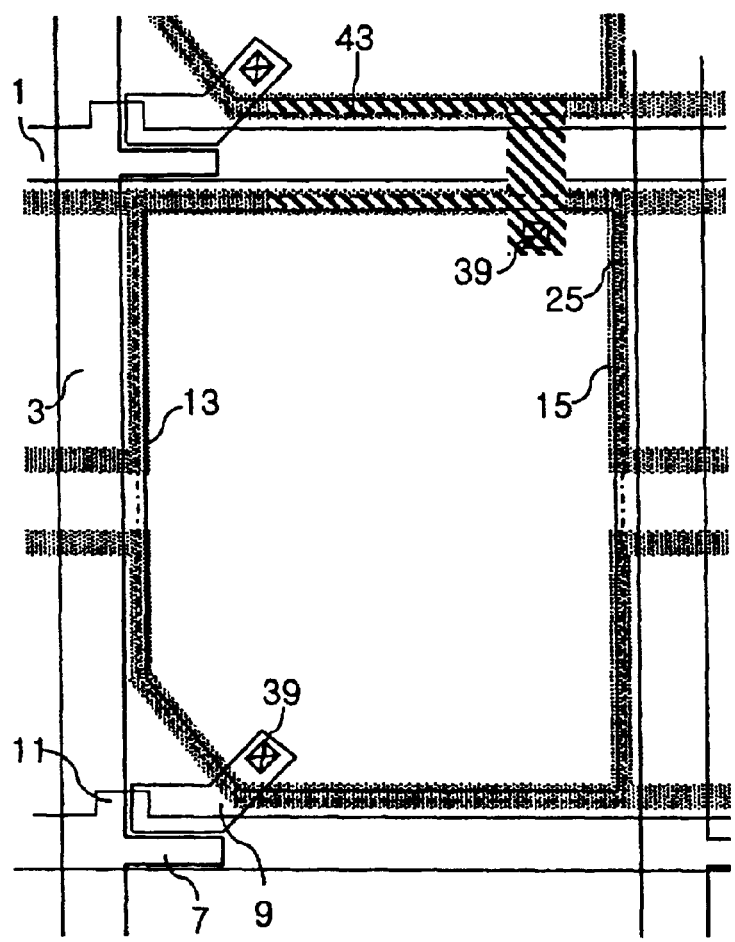
Figure 11A:
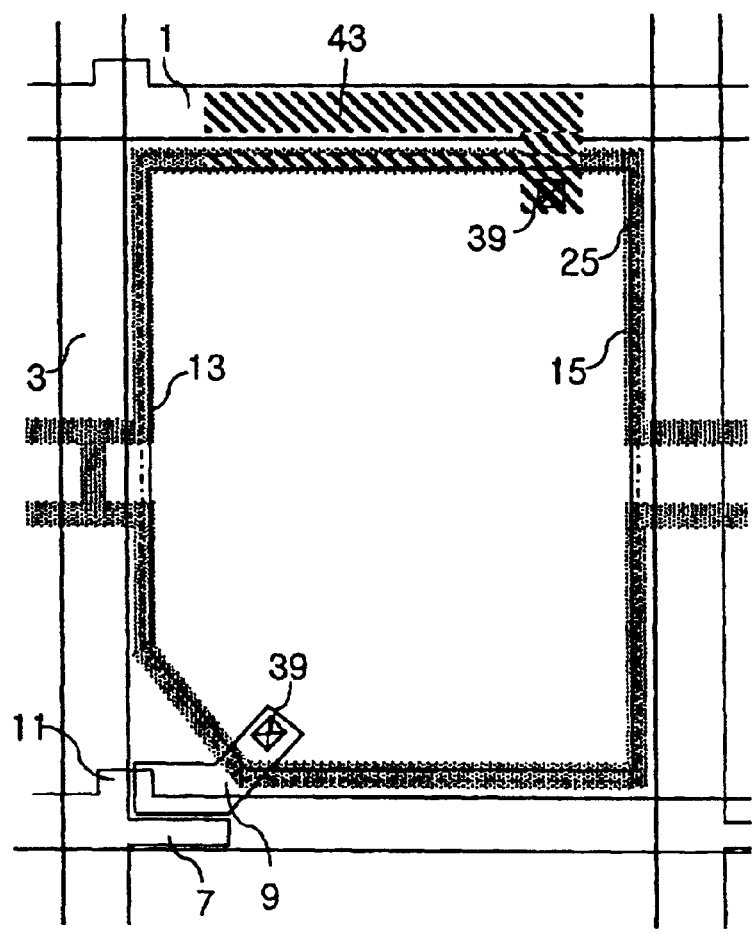
FIGS. 11A to 11C are plan views of the multi-domain liquid crystal display devices according to the fifth embodiment of the present invention.
Figure 11B:
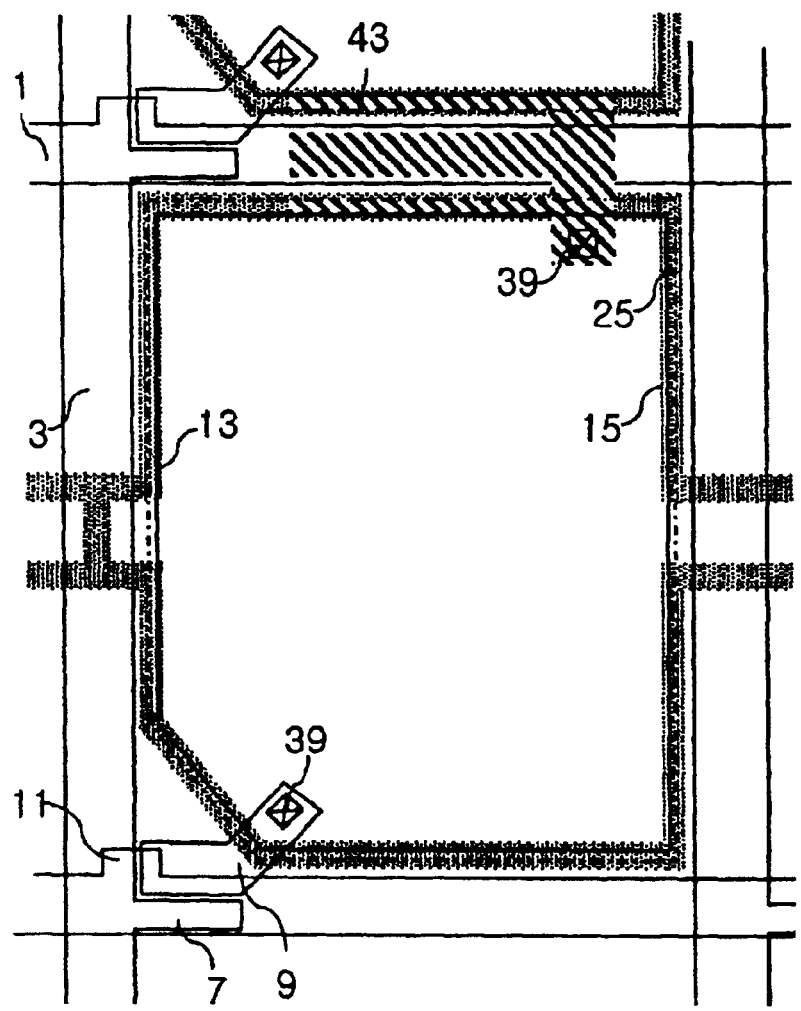
Figure 11C:
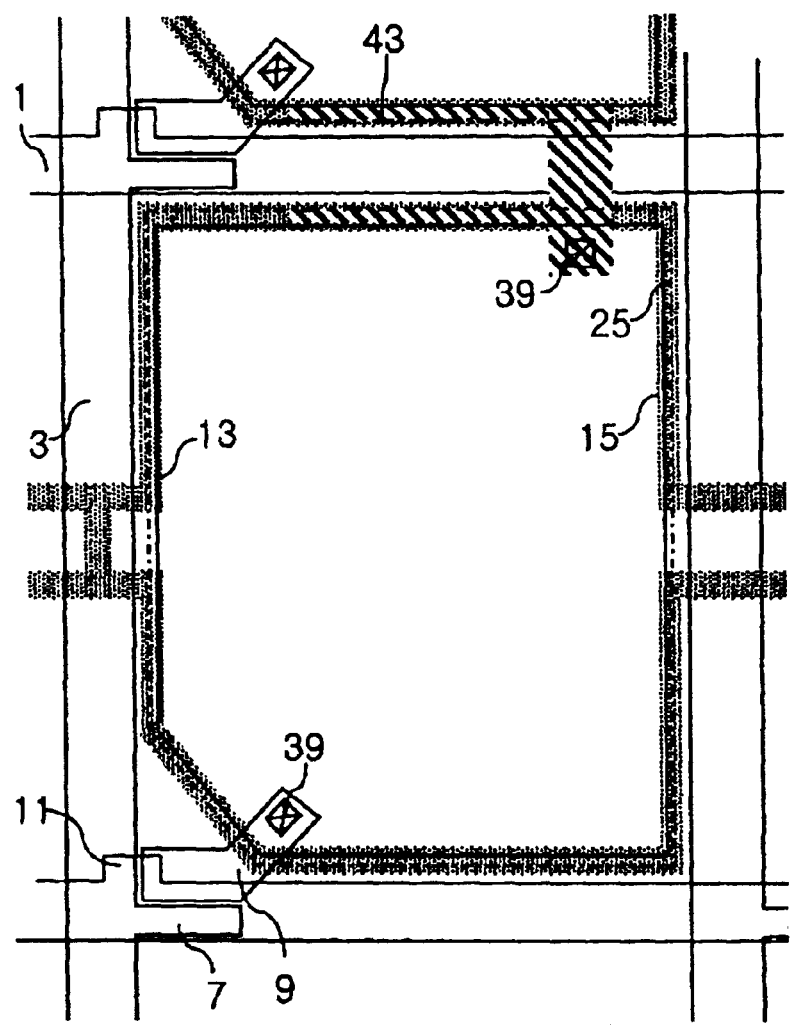
Figure 12A:
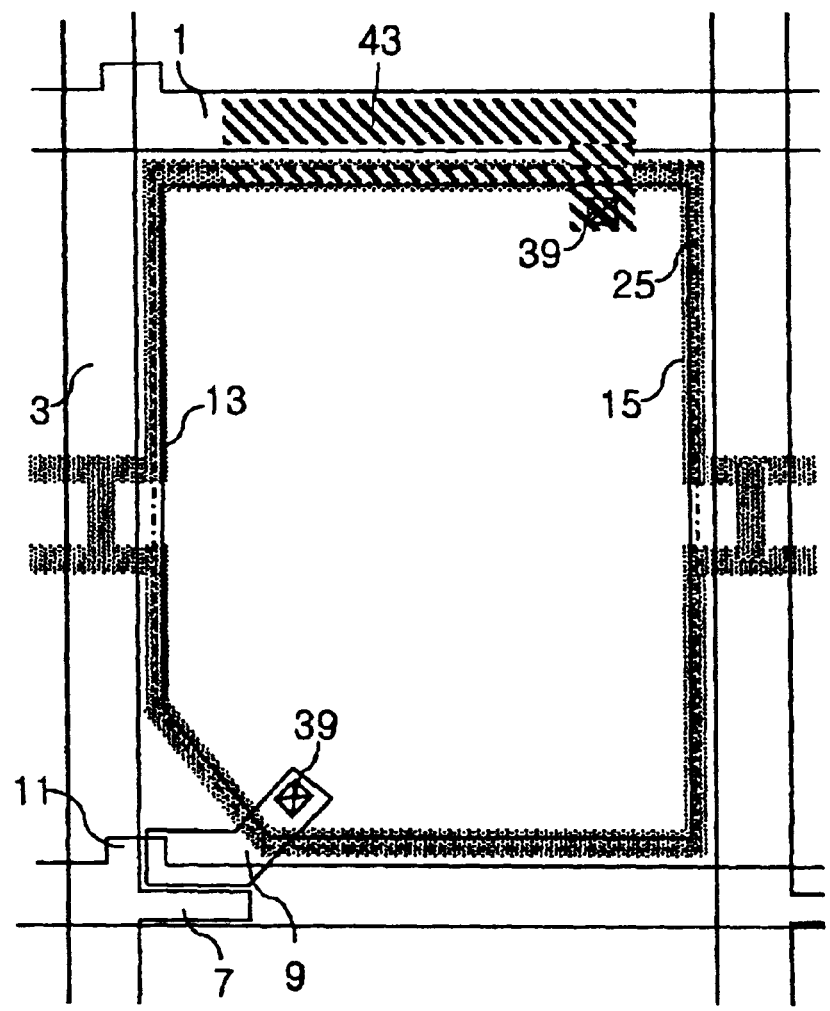
FIGS. 12A to 12C are plan views of the multi-domain liquid crystal display devices according to the sixth embodiment of the present invention.
Figure 12B:
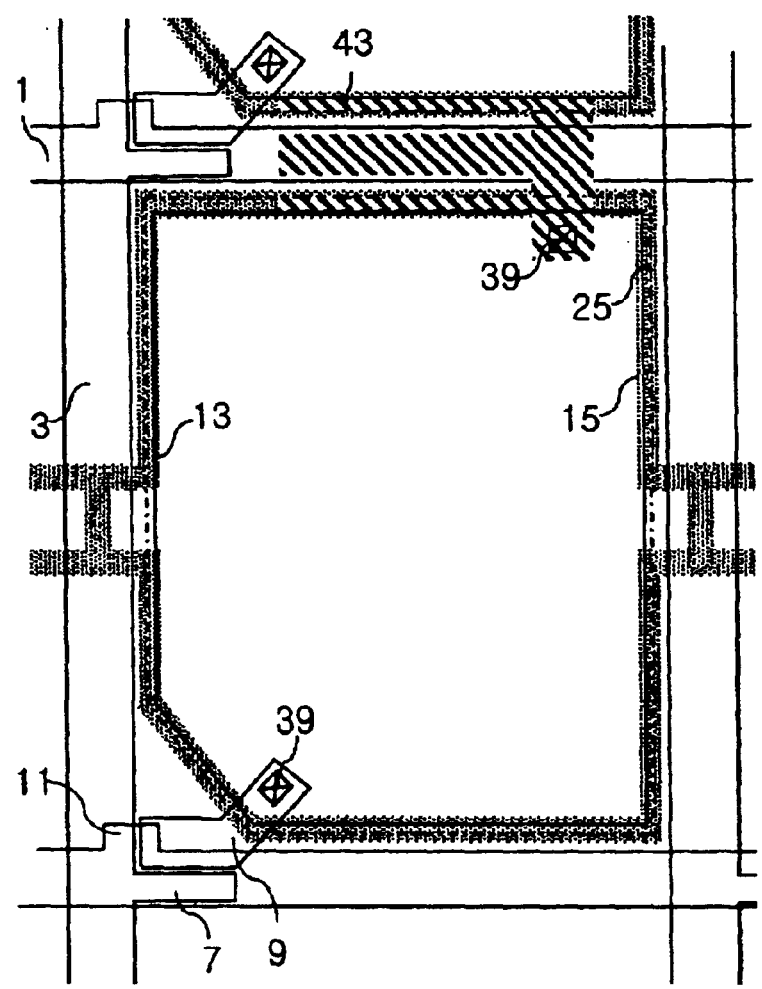
Figure 12C:
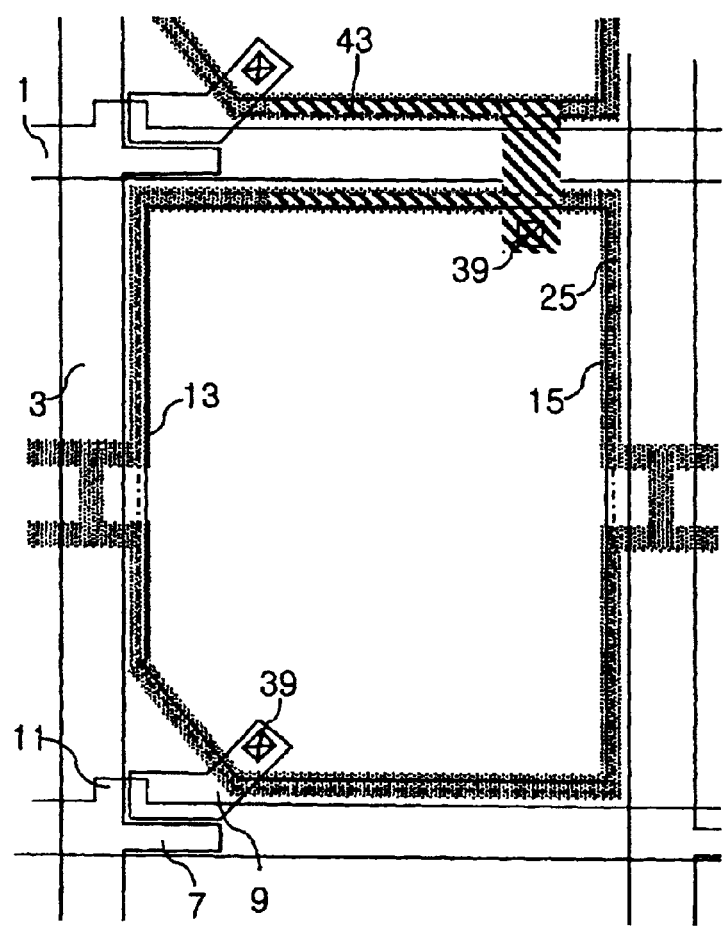
Figure 13A:
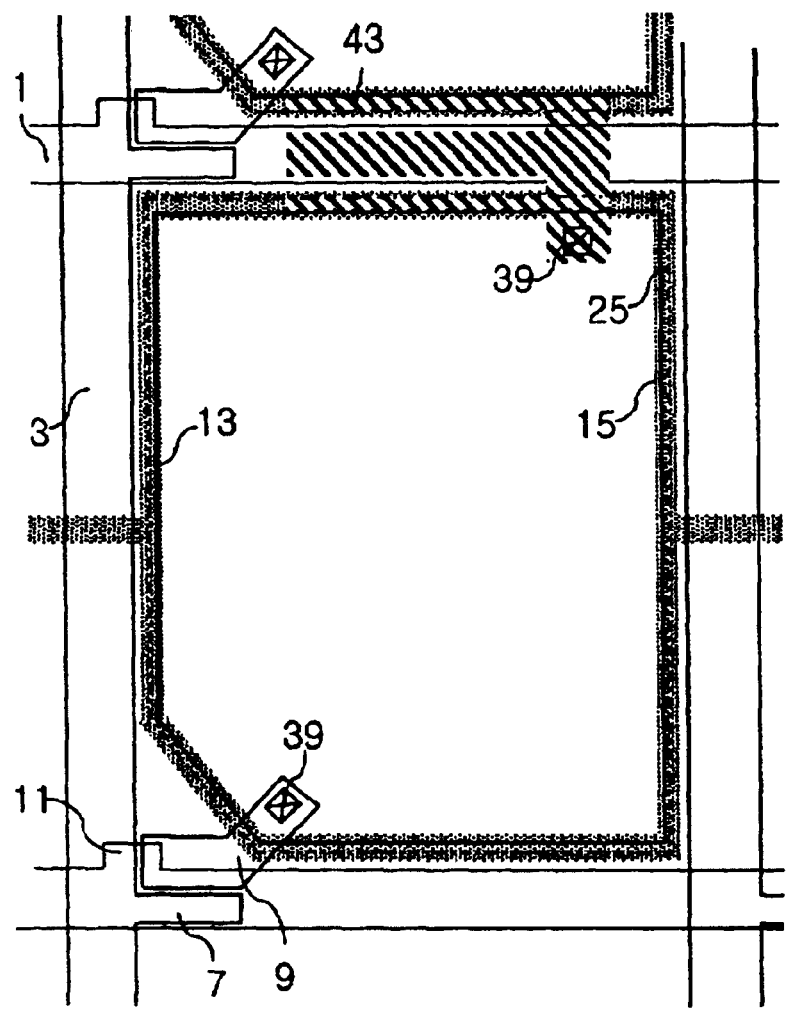
FIGS. 13A and 13B are plan views of the multi-domain liquid crystal display devices according to the seventh embodiment of the present invention.
Figure 13B:
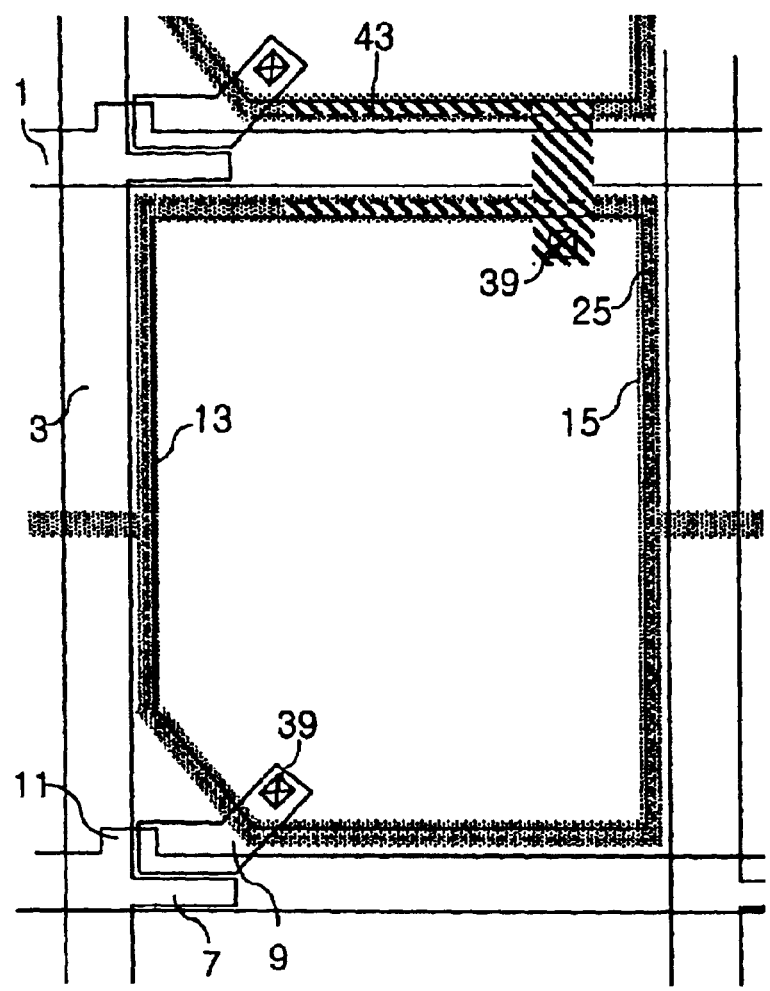

FIGS. 8A to 8C are plan views of the multi-domain liquid crystal display devices according to the second embodiment of the present invention, FIGS. 9A to 9C are plan views of the multi-domain liquid crystal display devices according to the third embodiment of the present invention, FIGS. 10A to 10C are plan views of the multi-domain liquid crystal display devices according to the fourth embodiment of the present invention, FIGS. 11A to 11C are plan views of the multi-domain liquid crystal display devices according to the fifth embodiment of the present invention, FIGS. 12A to 12C are plan views of the multi-domain liquid crystal display devices according to the sixth embodiment of the present invention, FIGS. 13A and 13B are plan views of the multi-domain liquid crystal display devices according to the seventh embodiment of the present invention.

In the multi-domain liquid crystal display device of the in the FIG. 8, two common-auxiliary electrode 15 surround the pixel region and are driven independently in the pixel region. The each common-auxiliary electrode has connecting parts which connect to a common-auxiliary electrode in a pixel region neighboring the pixel region, and the connecting part has protrusions.

A storage electrode 43 is formed overlapping the common-auxiliary electrode 15 and the gate bus line 1 (FIG. 8A), the common-auxiliary electrode 15, the gate bus line 1, and a common-auxiliary electrode in a pixel region neighboring the pixel region (FIG. 8B), the common-auxiliary electrode 15 and a common-auxiliary electrode in a pixel region neighboring the pixel region (FIG. 8C) to obtain storage capacitance.

In the multi-domain liquid crystal display device of the a in the FIG. 9, two common-auxiliary electrode 15 surround the pixel region and are driven independently in the pixel region. The each common-auxiliary electrode has connecting parts which connect to a common-auxiliary electrode in a pixel region neighboring the pixel region, and the connecting parts are formed on the side of the gate bus line 1.

A storage electrode 43 is formed overlapping the common-auxiliary electrode 15 and the gate bus line 1 (FIG. 9A), the common-auxiliary electrode 15, the gate bus line 1, and a common-auxiliary electrode in a pixel region neighboring the pixel region (FIG. 9B), the common-auxiliary electrode 15 and a common-auxiliary electrode in a pixel region neighboring the pixel region (FIG. 9C) to obtain storage capacitance.

In the multi-domain liquid crystal display device of the in the FIG. 10, two common-auxiliary electrode 15 surround the pixel region and are driven independently in the pixel region. The each common-auxiliary electrode has two connecting parts which connect to a common-auxiliary electrode in a pixel region neighboring the pixel region.

A storage electrode 43 is formed overlapping the common-auxiliary electrode 15 and the gate bus line 1 (FIG. 10A), the common-auxiliary electrode 15, the gate bus line 1, and a common-auxiliary electrode in a pixel region neighboring the pixel region (FIG. 10B), the common-auxiliary electrode 15 and a common-auxiliary electrode in a pixel region neighboring the pixel region (FIG. 10C) to obtain storage capacitance.

In the multi-domain liquid crystal display device of the in the FIG. 11, two common-auxiliary electrode 15 surround the pixel region. The each common-auxiliary electrode has connecting parts which connect to a common-auxiliary electrode in a pixel region neighboring the pixel region, and the common-auxiliary electrodes are connected each other at one of the connecting parts.

A storage electrode 43 is formed overlapping the common-auxiliary electrode 15 and the gate bus line 1 (FIG. 11A), the common-auxiliary electrode 15, the gate bus line 1, and a common-auxiliary electrode in a pixel region neighboring the pixel region (FIG. 11B), the common-auxiliary electrode 15 and a common-auxiliary electrode in a pixel region neighboring the pixel region (FIG. 11C) to obtain storage capacitance.

In the multi-domain liquid crystal display device of the in the FIG. 12, two common-auxiliary electrode 15 surround the pixel region. The each common-auxiliary electrode has connecting parts which connect to a common-auxiliary electrode in a pixel region neighboring the pixel region, and the common-auxiliary electrodes are connected each other at the every connecting parts.

A storage electrode 43 is formed overlapping the common-auxiliary electrode 15 and the gate bus line 1 (FIG. 12A), the common-auxiliary electrode 15, the gate bus line 1, and a common-auxiliary electrode in a pixel region neighboring the pixel region (FIG. 12B), the common-auxiliary electrode 15 and a common-auxiliary electrode in a pixel region neighboring the pixel region (FIG. 12C) to obtain storage capacitance.

In the multi-domain liquid crystal display device of the in the FIG. 13, one common-auxiliary electrode 15 surrounds the pixel region. The common-auxiliary electrode has connecting parts which connect to a common-auxiliary electrode in a pixel region neighboring the pixel region.

A storage electrode 43 is formed overlapping the common-auxiliary electrode 15 and the gate bus line 1 (FIG. 13A), the common-auxiliary electrode 15, the gate bus line 1, and a common-auxiliary electrode in a pixel region neighboring the pixel region (FIG. 13B), the common-auxiliary electrode 15 and a common-auxiliary electrode in a pixel region neighboring the pixel region (FIG. 13C) to obtain storage capacitance.

Figure 4C:
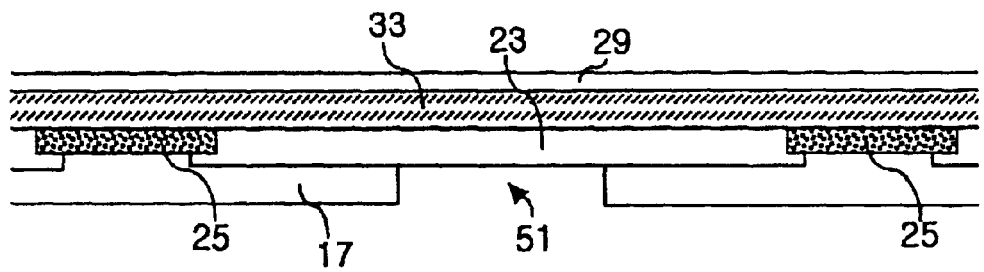
Figure 4C:
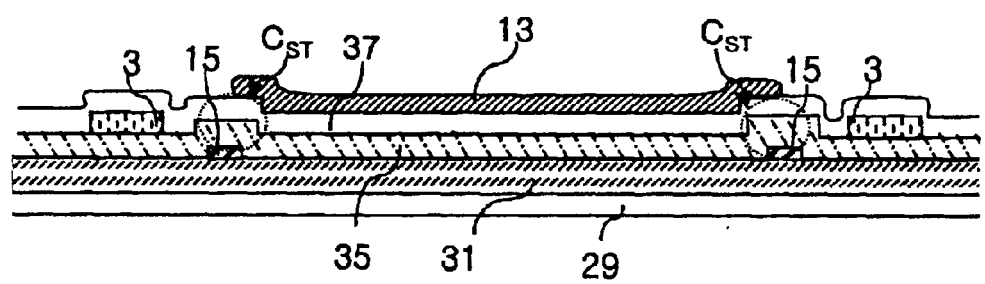
Figure 4D:
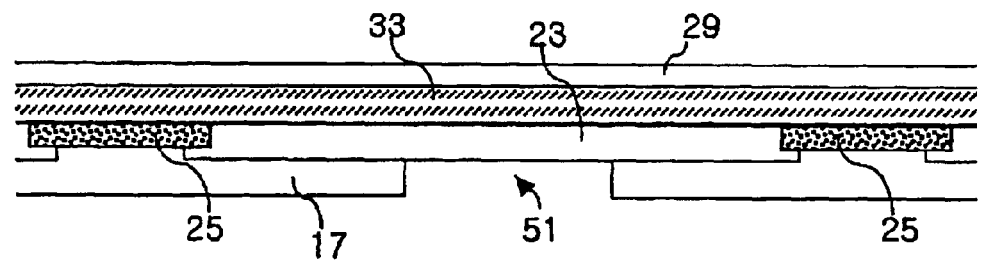
Figure 4D:
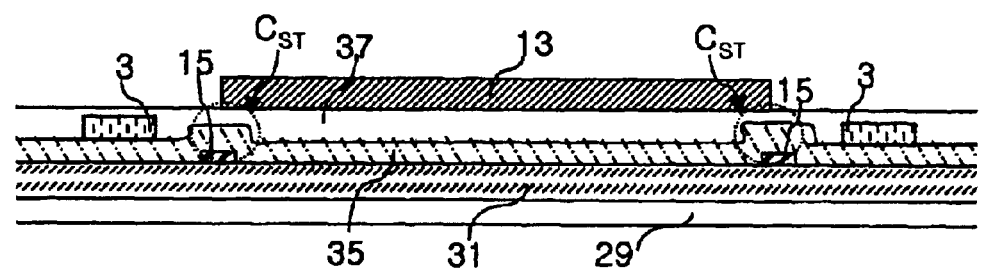

FIGS. 4A and 4C show that passivation layer 37 includes $SiN_x$ or $SiO_x$ and FIGS. 4B and 4D show that passivation layer 37 includes BCB or acrylic resin in the LCD. Also, FIGS. 4A and 4B show that dielectric frame 53 is formed on the common electrode 17, and FIGS. 4C and 4D show that window inducing electric field 51 is formed in the common electrode 17.

Figure 14:
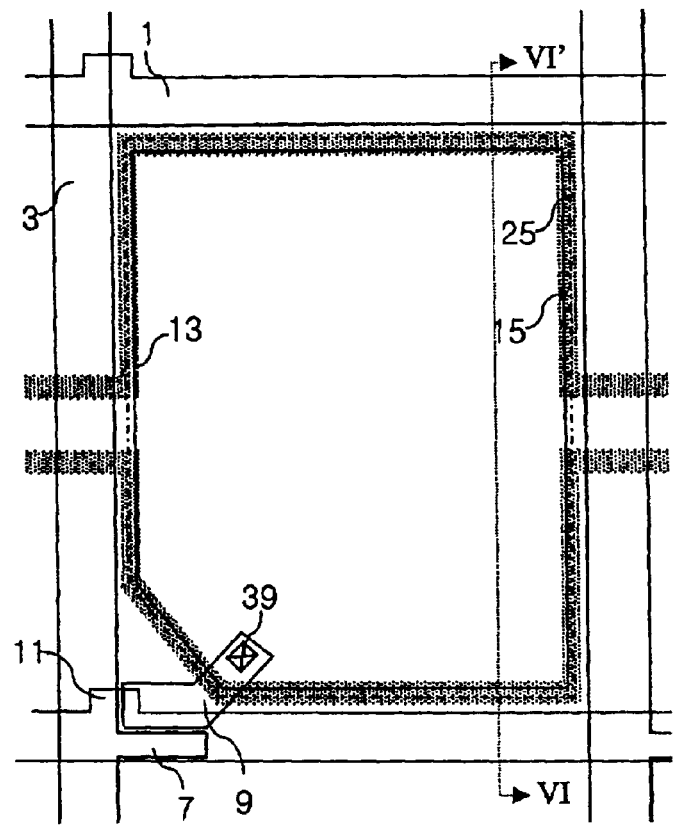
FIG. 14 is a plan view of the multi-domain liquid crystal display devices according to the eighth embodiment of the present invention.
Figure 15:
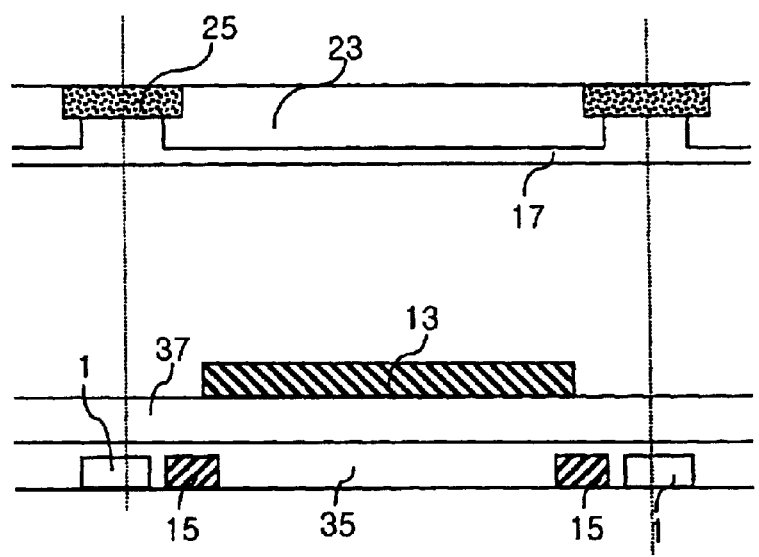
FIG. 15 is a sectional view taken along the line VI—VI of FIG. 14.
Figure 16:
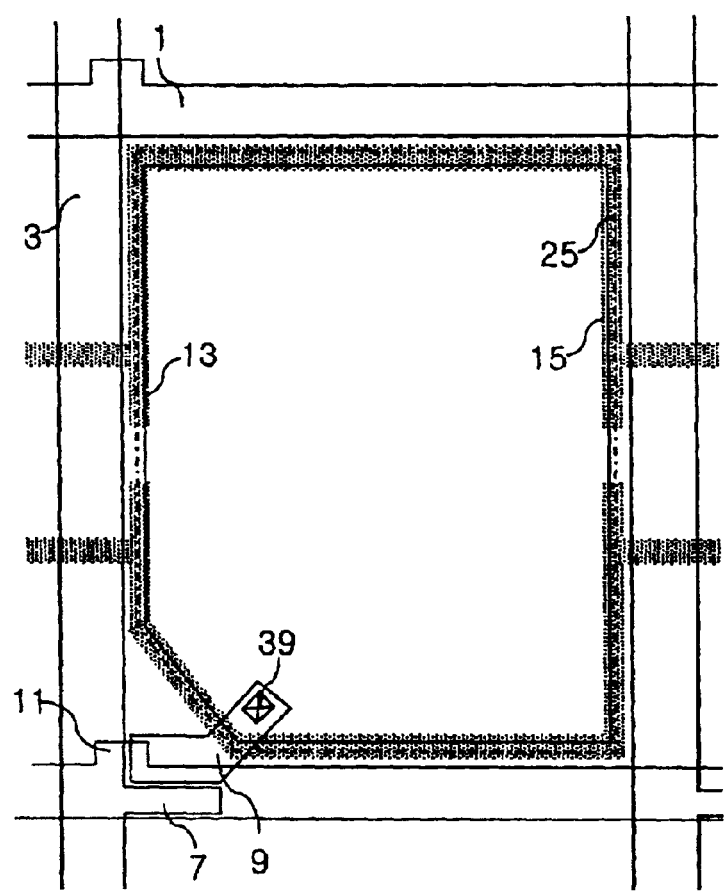
FIG. 16 is a plan view of the multi-domain liquid crystal display devices according to the ninth embodiment of the present invention.
Figure 17:
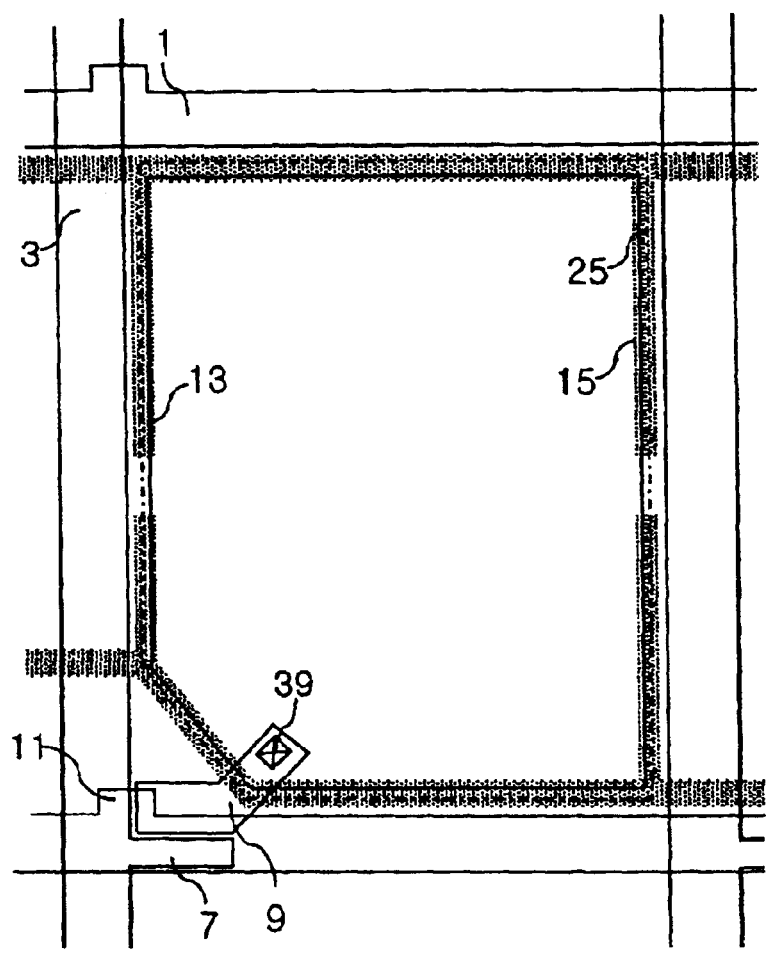
FIG. 17 is a plan view of the multi-domain liquid crystal display devices according to the tenth embodiment of the present invention.
Figure 18:
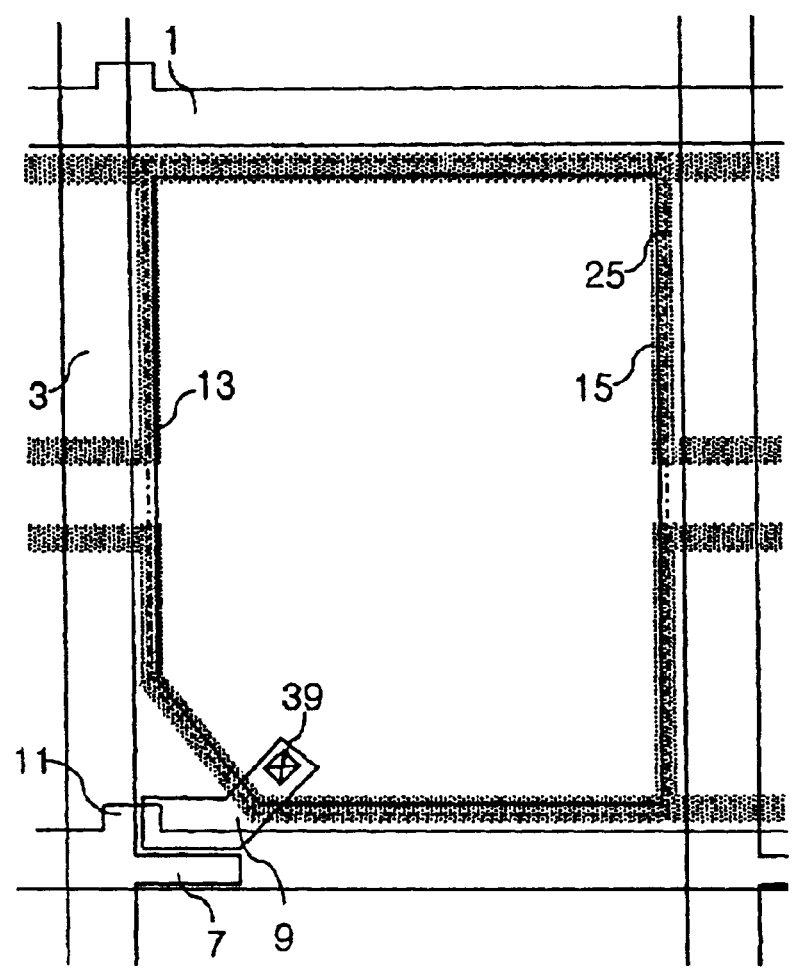
FIG. 18 is a plan view of the multi-domain liquid crystal display devices according to the eleventh embodiment of the present invention.
Figure 19:
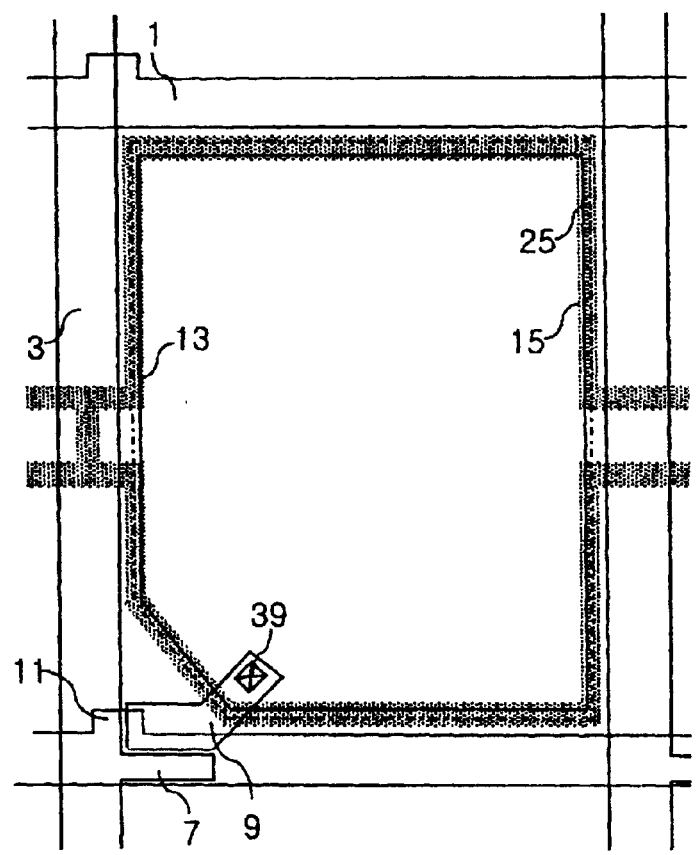
FIG. 19 is a plan view of the multi-domain liquid crystal display devices according to the twelfth embodiment of the present invention.
Figure 20:
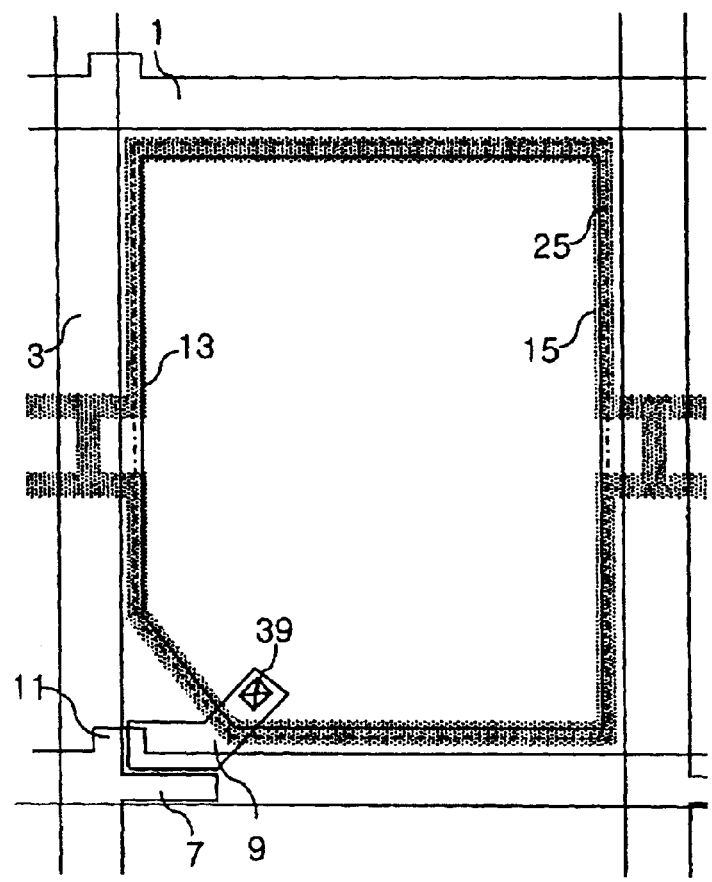
FIG. 20 is a plan view of the multi-domain liquid crystal display devices according to the thirteenth embodiment of the present invention.

FIG. 14 is a plan view of the multi-domain liquid crystal display devices according to the eighth embodiment of the present invention, FIG. 15 is a sectional view taken along the line VI—VI of FIG. 14, FIG. 16 is a plan view of the multi-domain liquid crystal display devices according to the ninth embodiment of the present invention, FIG. 17 is a plan view of the multi-domain liquid crystal display devices according to the tenth embodiment of the present invention, FIG. 18 is a plan view of the multi-domain liquid crystal display devices according to the eleventh embodiment of the present invention, FIG. 19 is a plan view of the multi-domain liquid crystal display devices according to the twelfth embodiment of the present invention, FIG. 20 is a plan view of the multi-domain liquid crystal display devices according to the thirteenth embodiment of the present invention.

Regarding to the multi-domain liquid crystal display devices according to the eighth to thirteenth embodiments of the present invention, the LCDs have the same structures of the first to sixth embodiments except not comprising the storage electrode. The pixel electrode 13 overlaps the common-auxiliary electrode 15 to obtain storage capacitance, and the light shielding layer 25 overlaps the common-auxiliary electrode 15. The FIG. 15 shows the structure that it does not form the storage electrode in LCDs.

Figure 21A:
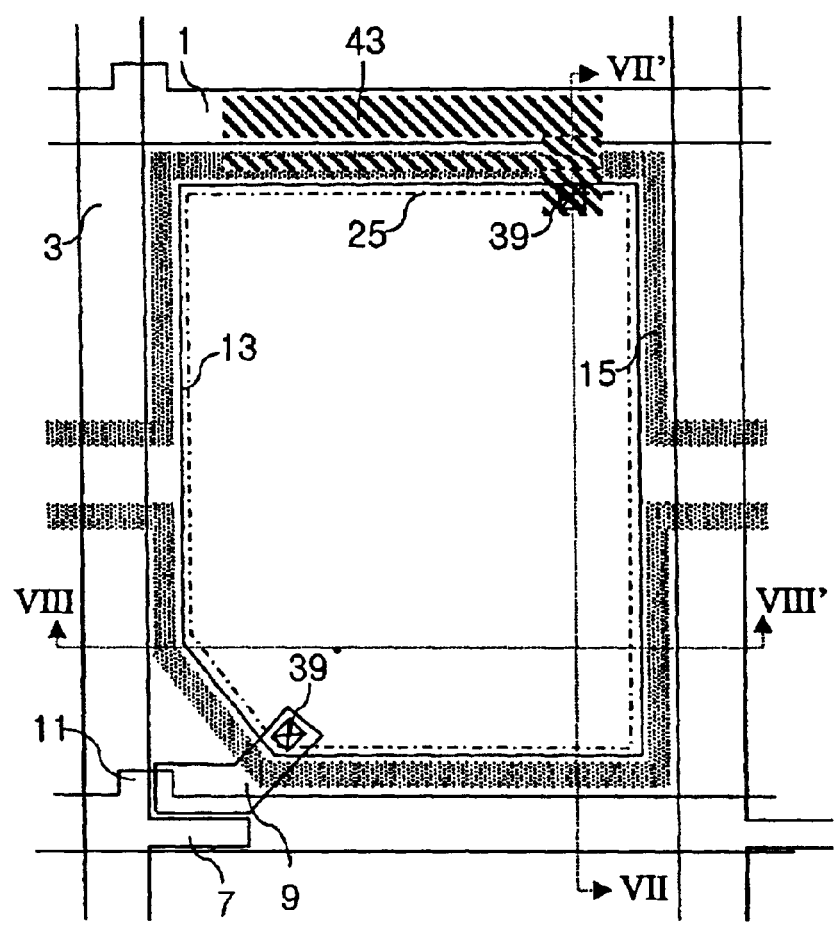
FIGS. 21A to 21C are plan views of the multi-domain liquid crystal display devices according to the fourteenth embodiment of the present invention.
Figure 21B:
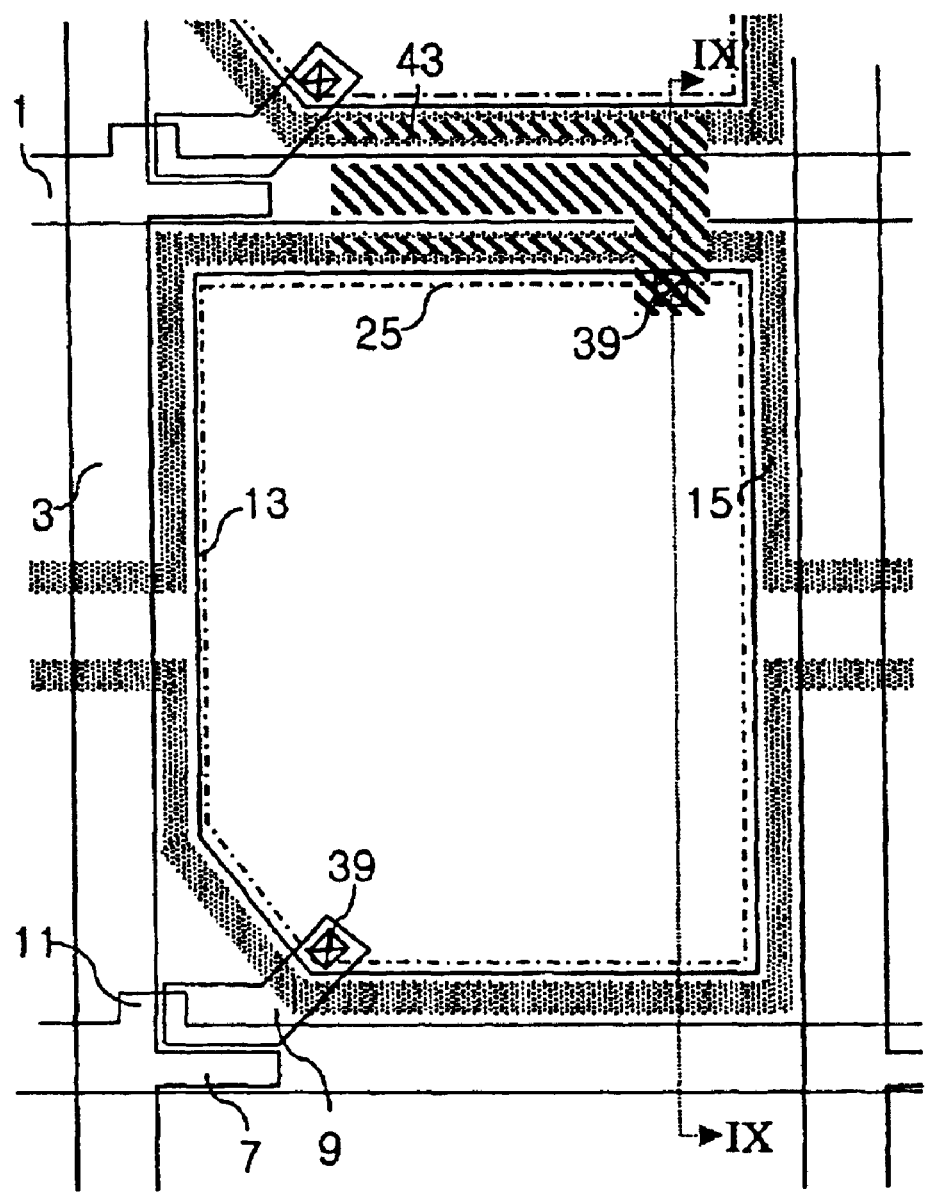
Figure 21C:
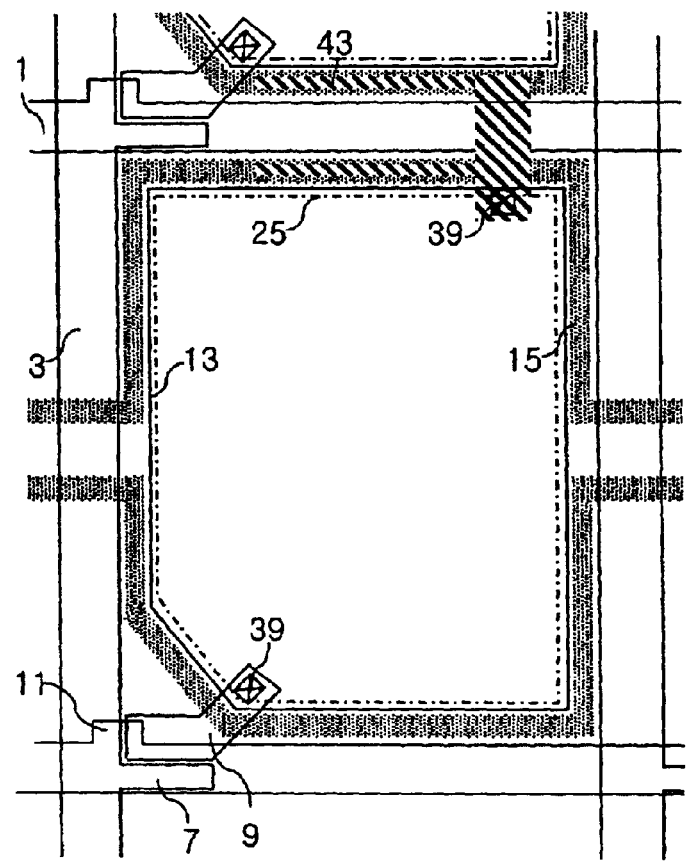
Figure 22:
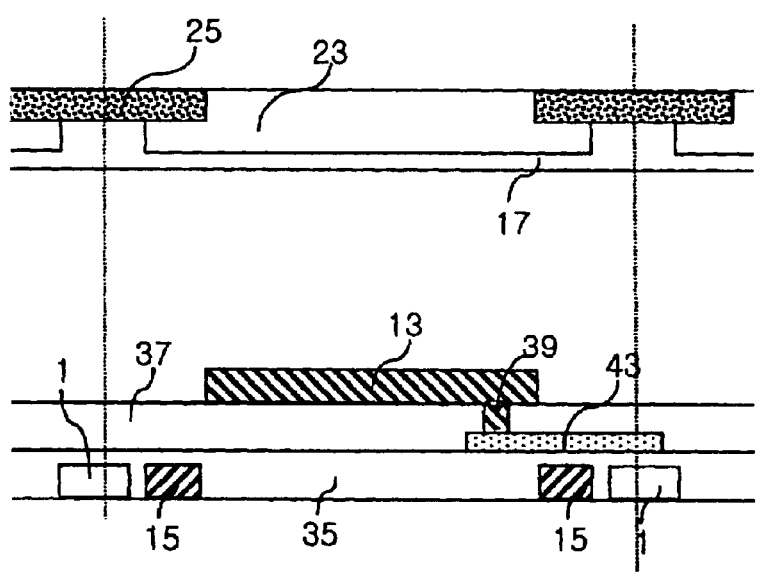
FIG. 22 is a sectional view taken along the line VII—VII of FIG. 21A.
Figure 23A:
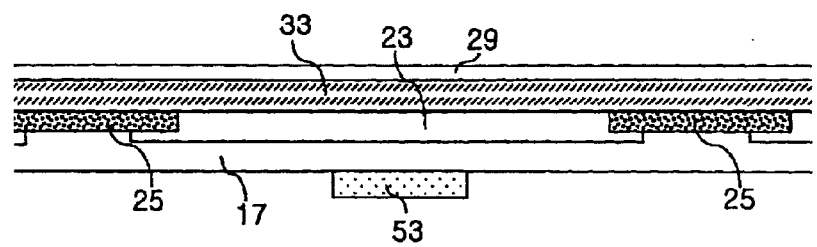
Figure 23A:
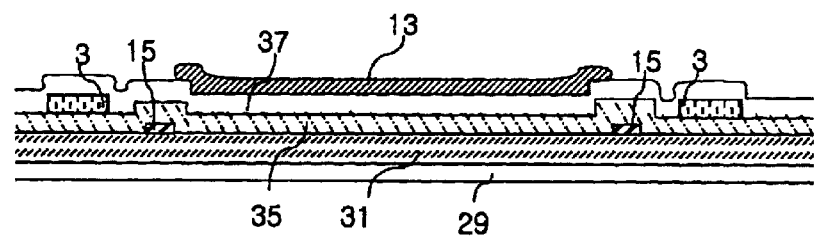
Figure 23B:
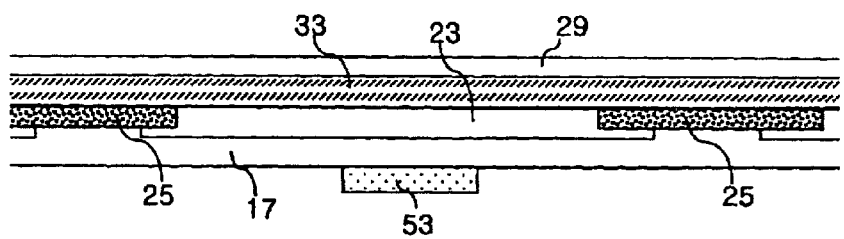
Figure 23B:
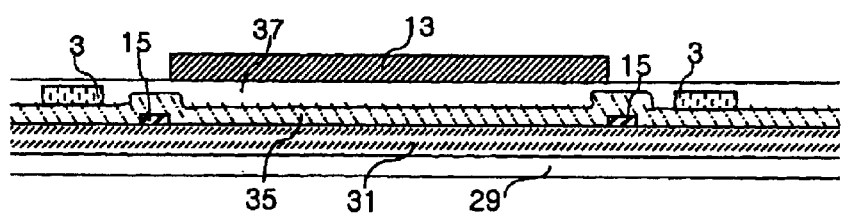
Figure 23C:
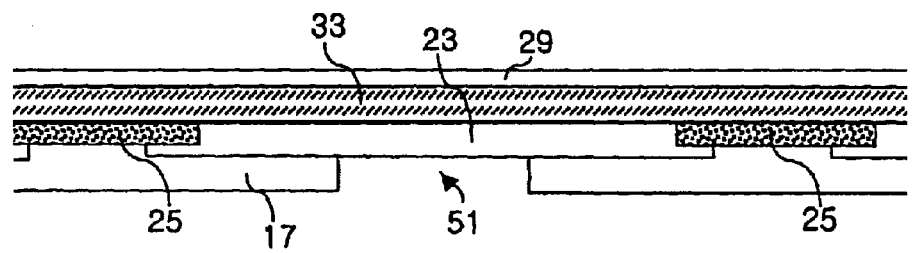
Figure 23C:
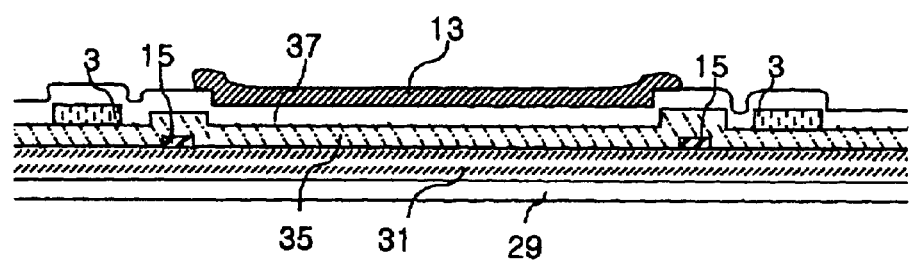
Figure 23D:
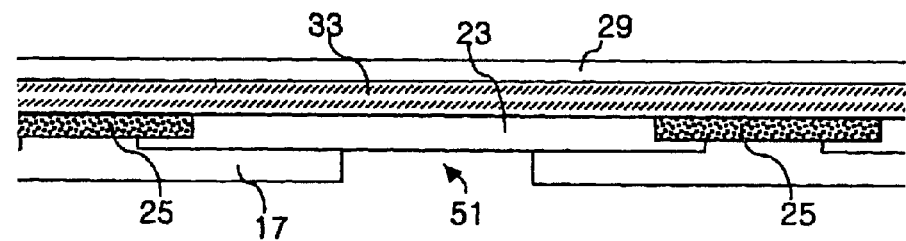
Figure 23D:
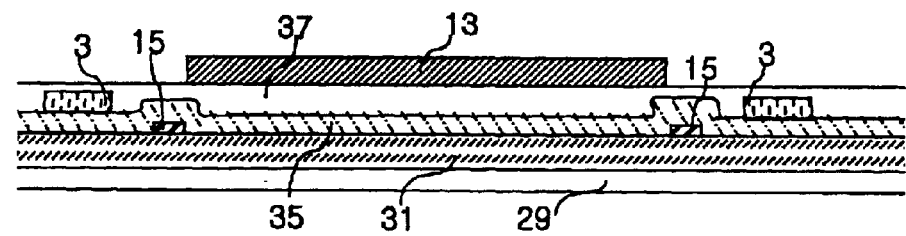
Figure 24:
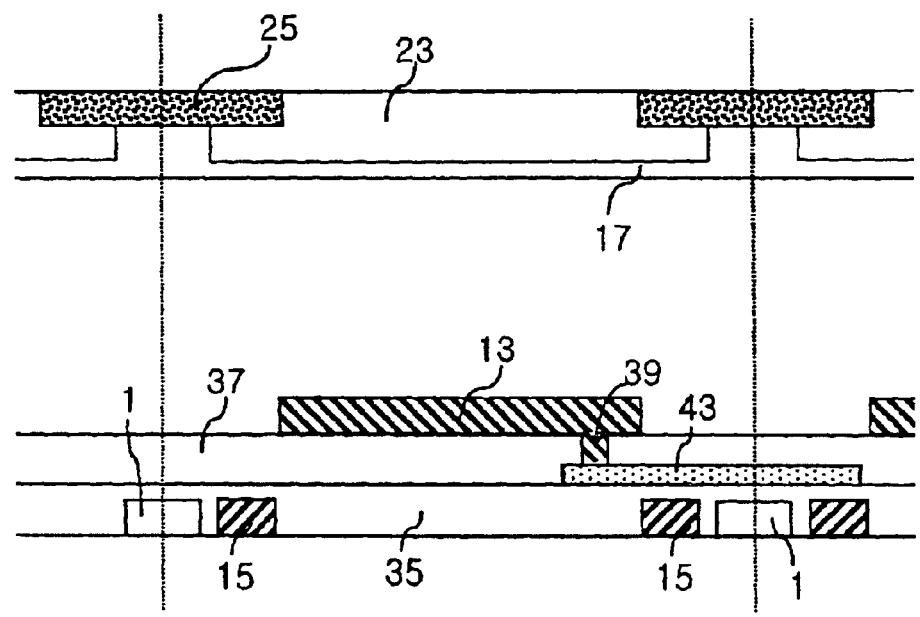
Figure 25A:
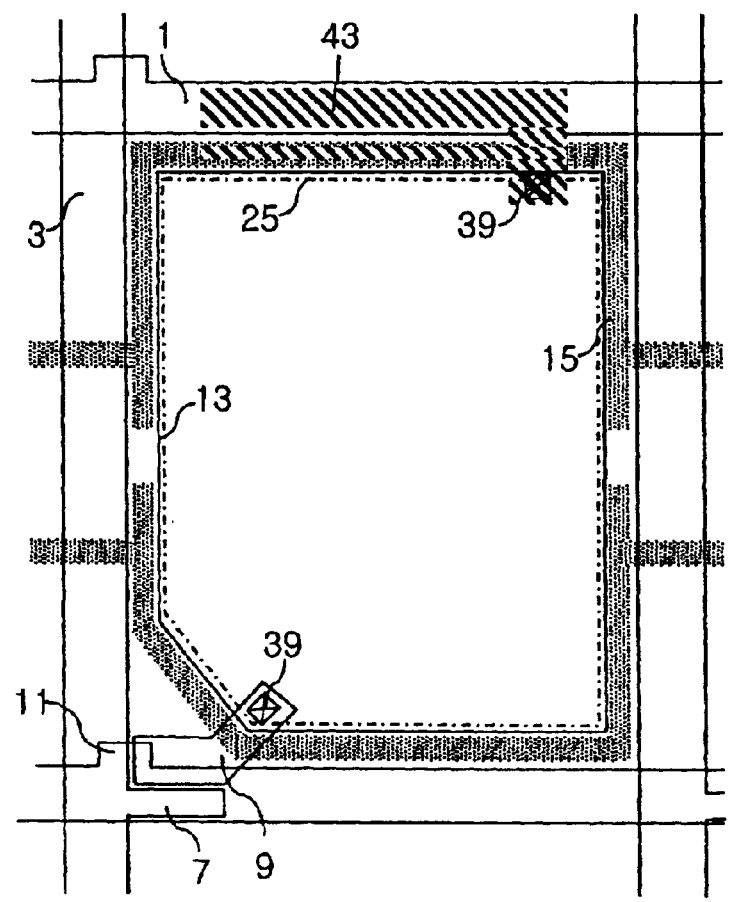
FIGS. 25A to 25C are plan views of the multi-domain liquid crystal display devices according to the fifteenth embodiment of the present invention.
Figure 25B:
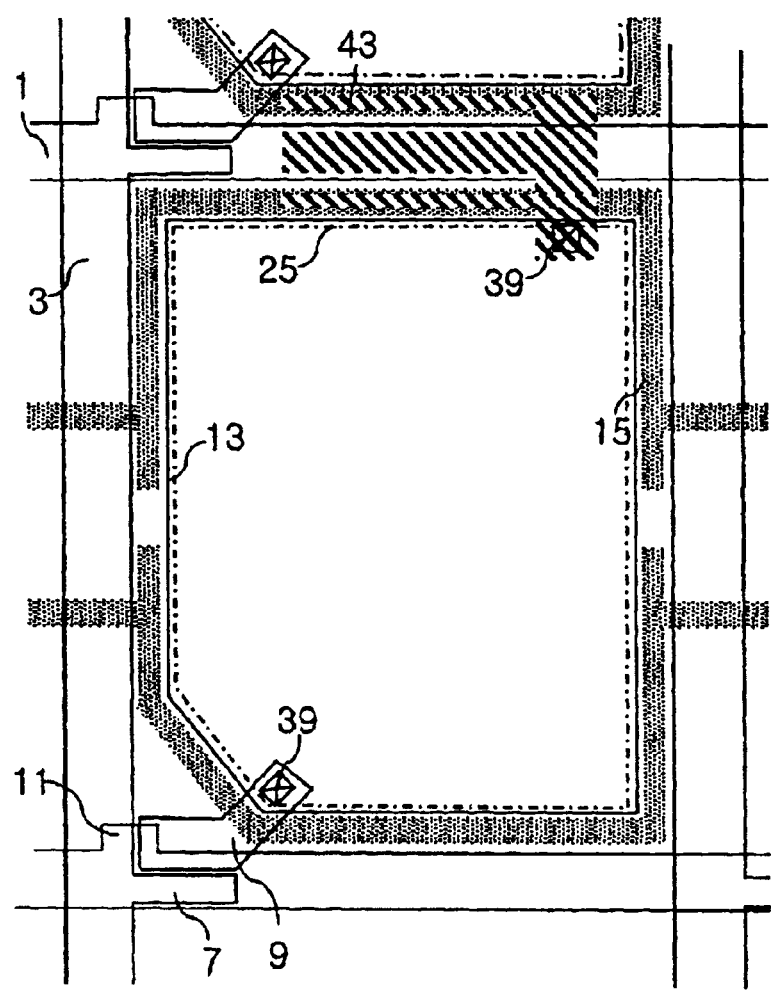
Figure 25C:
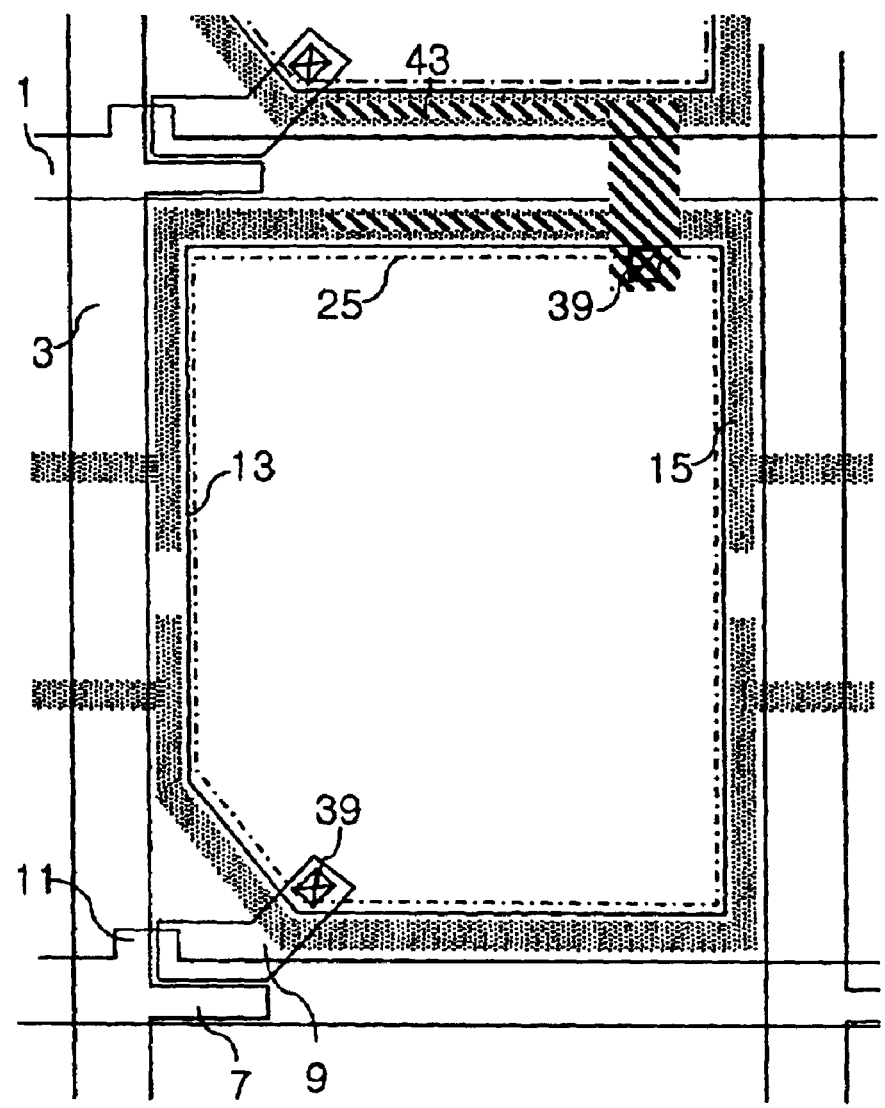
Figure 26A:
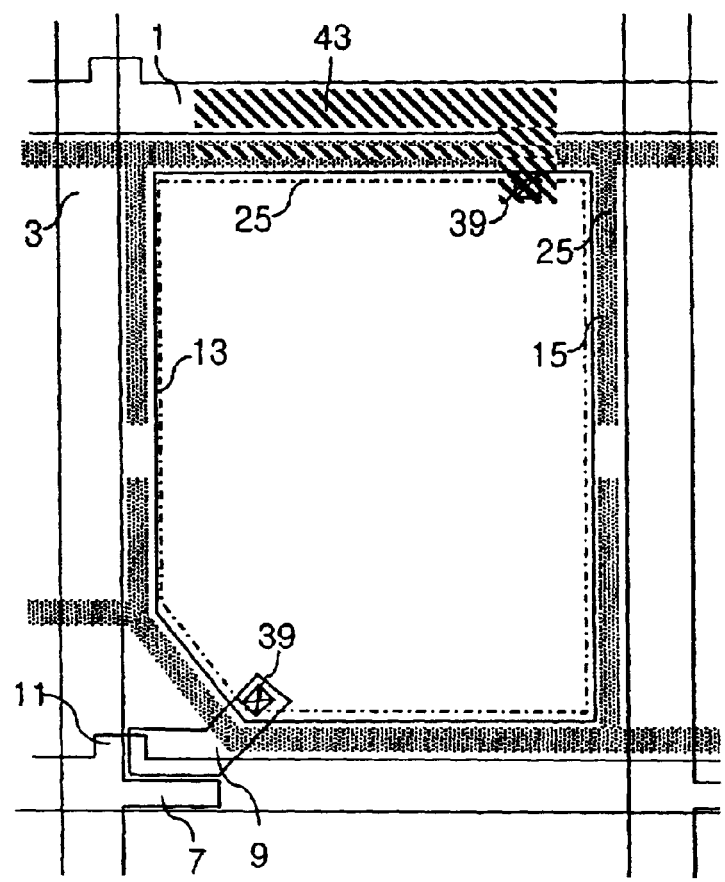
FIGS. 26A to 26C are plan views of the multi-domain liquid crystal display devices according to the sixteenth embodiment of the present invention.
Figure 26B:
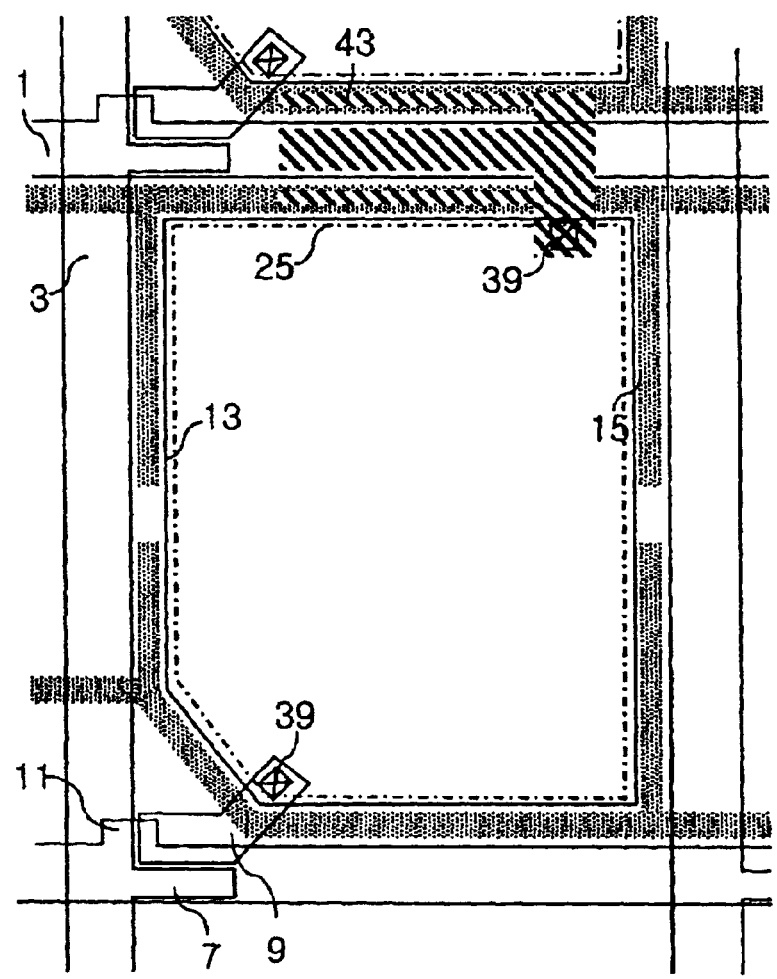
Figure 26C:
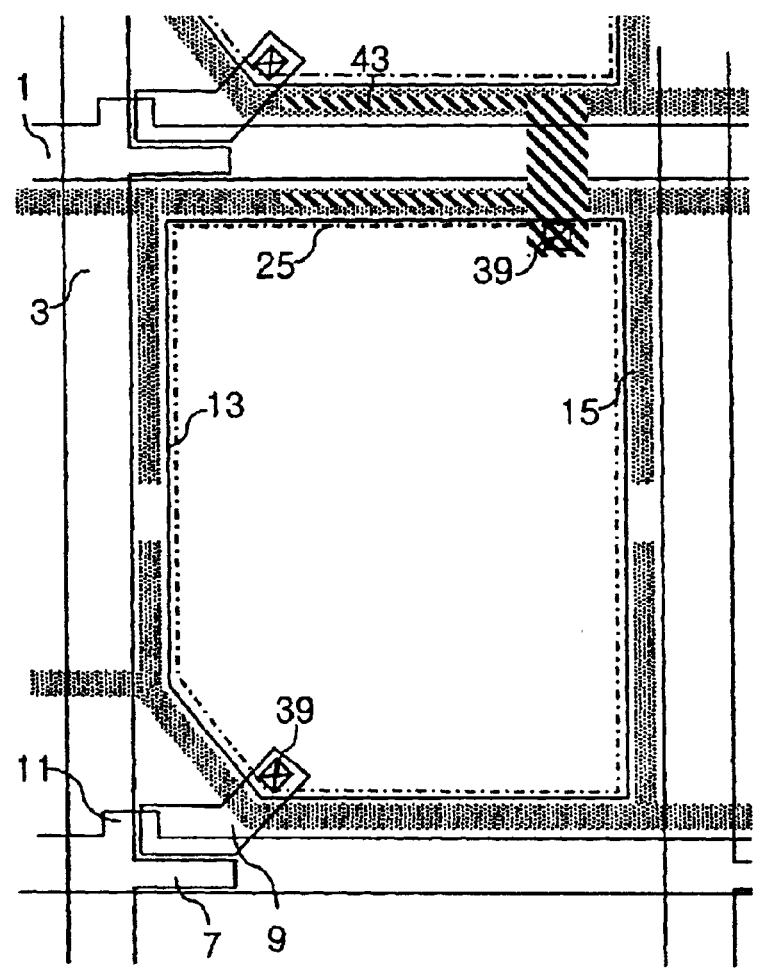
Figure 27A:
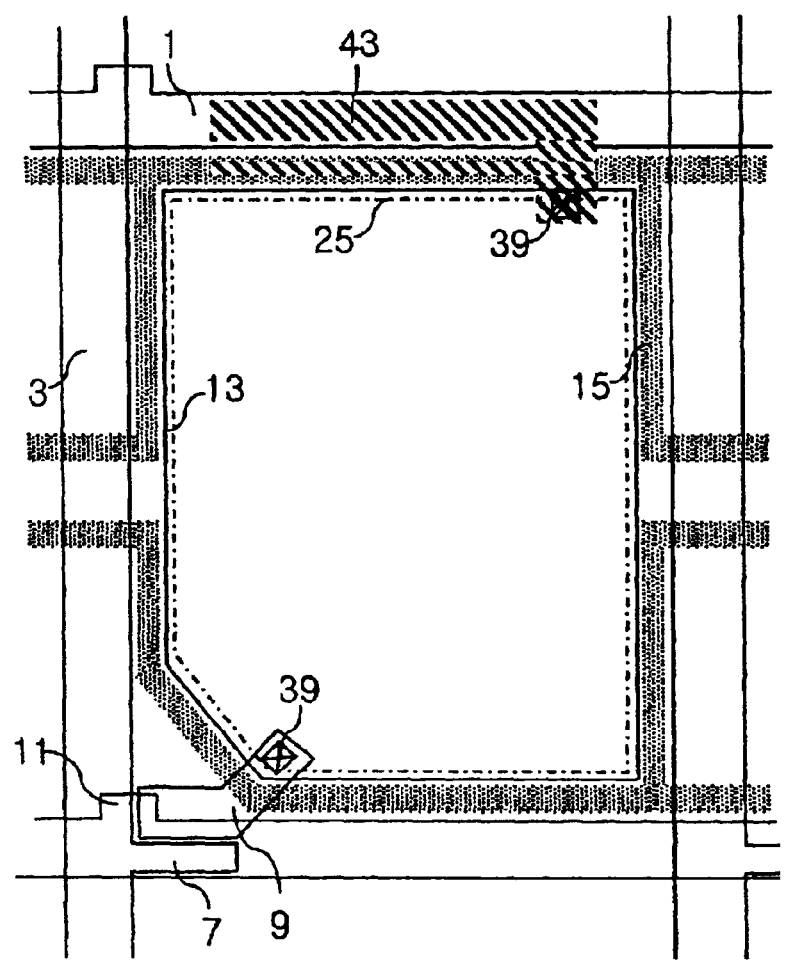
FIGS. 27A to 27C are plan views of the multi-domain liquid crystal display devices according to the seventeenth embodiment of the present invention.
Figure 27B:
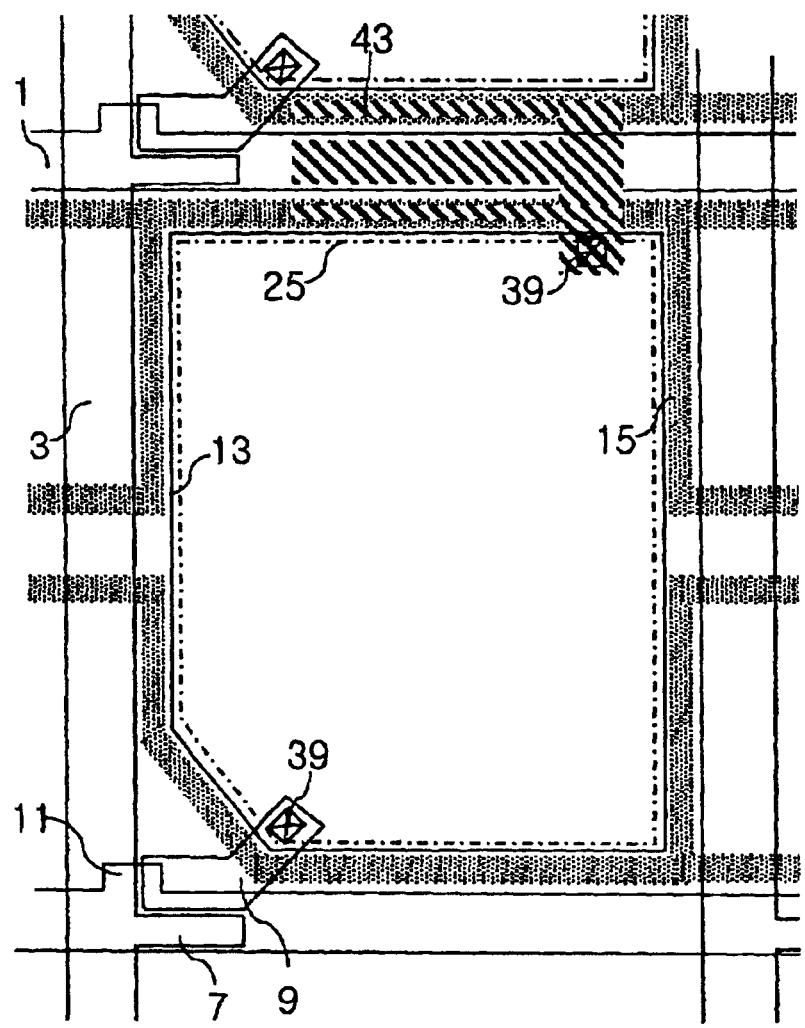
Figure 27C:
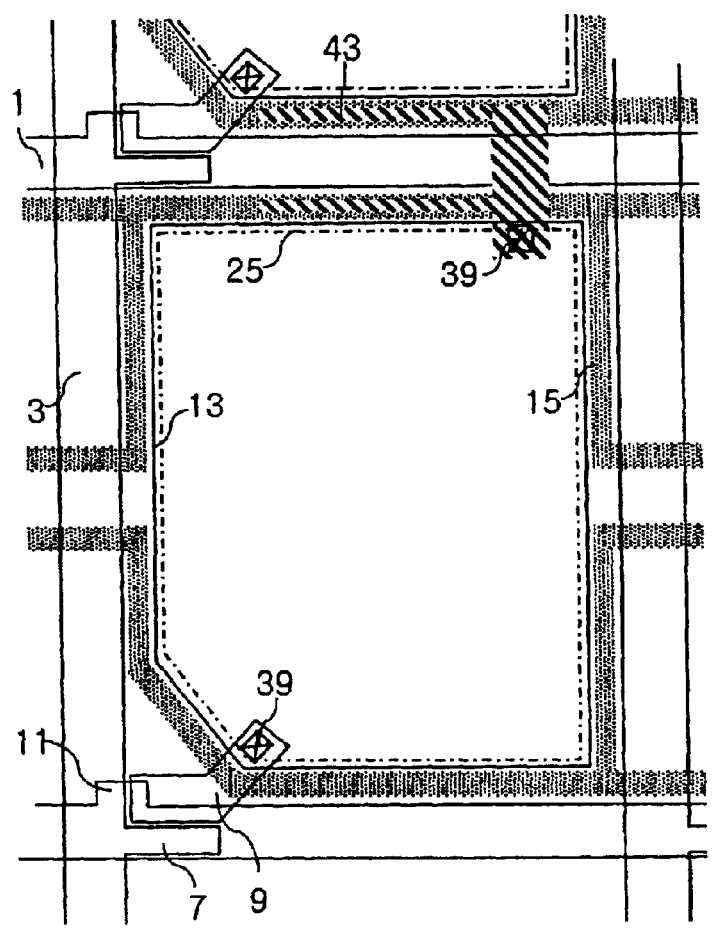
Figure 28A:
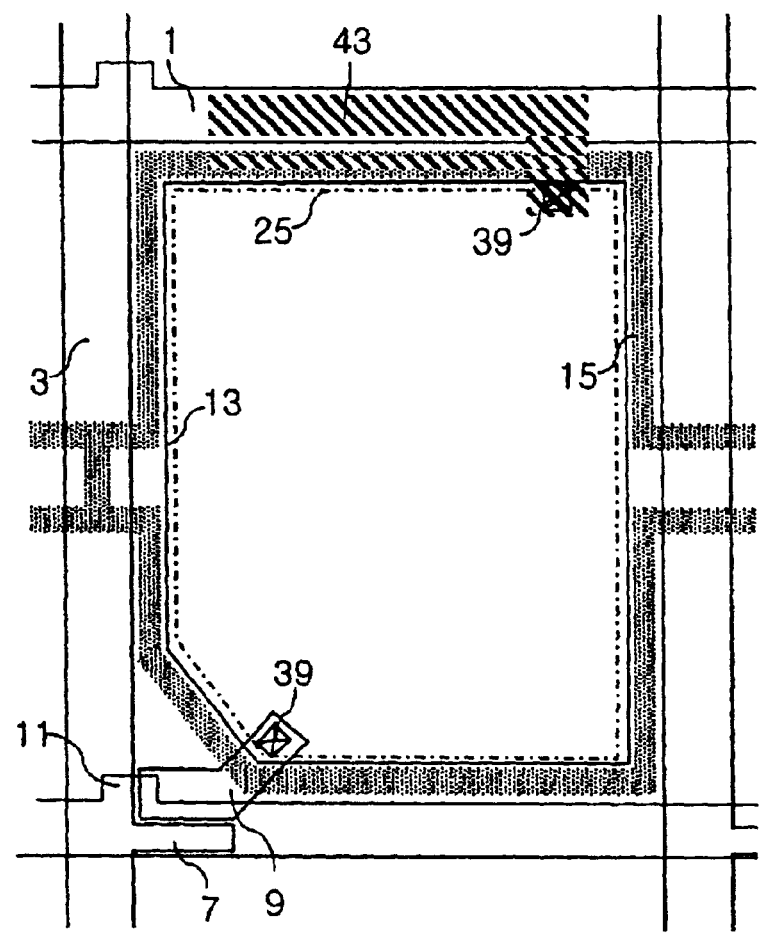
FIGS. 28A to 28C are plan views of the multi-domain liquid crystal display devices according to the eighteenth embodiment of the present invention.
Figure 28B:
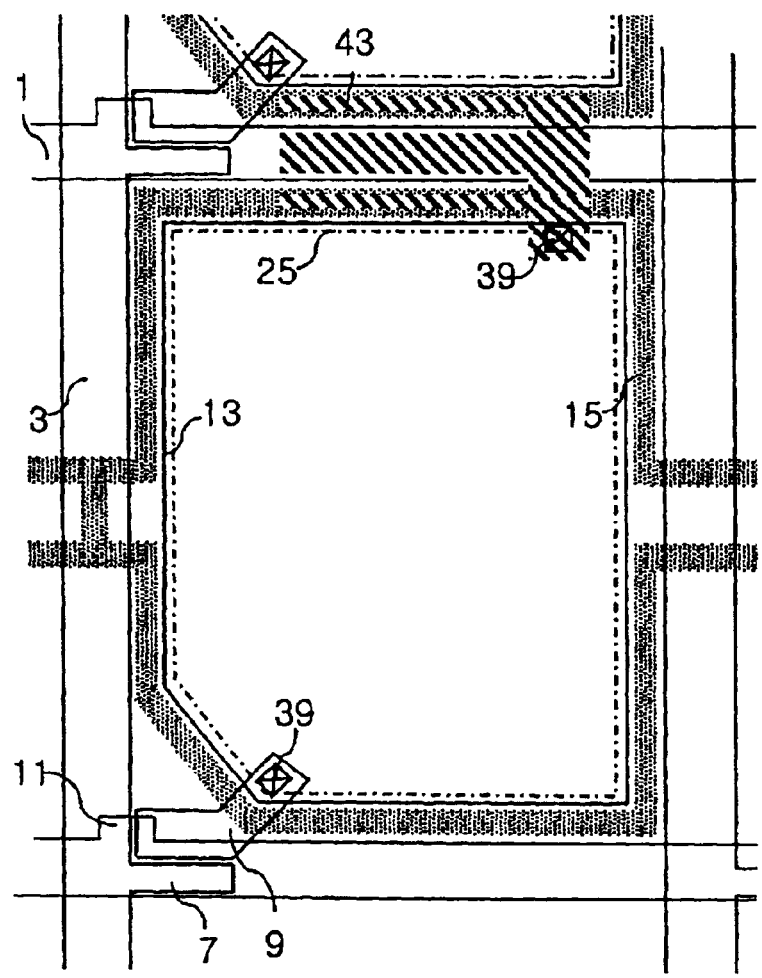
Figure 28C:
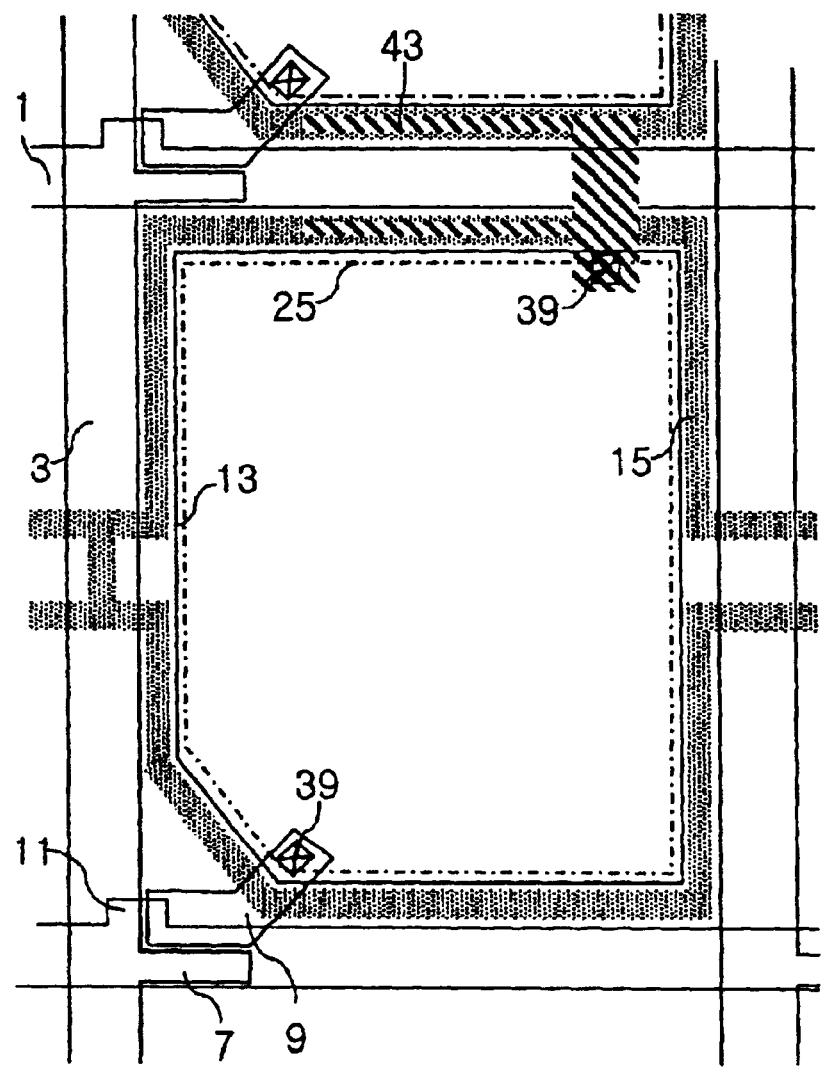
Figure 29A:
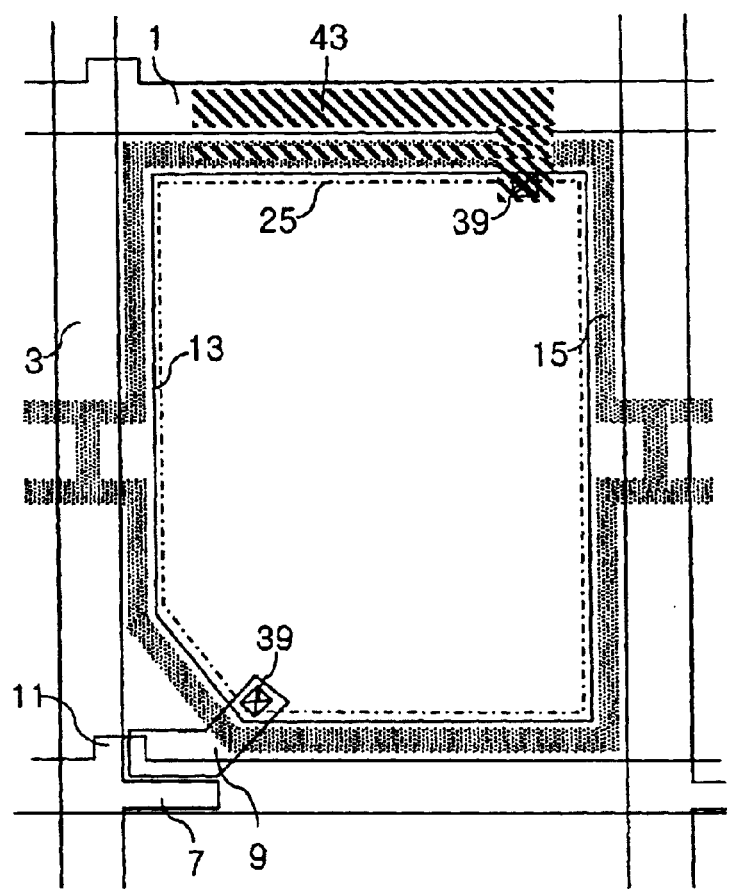
FIGS. 29A to 29C are plan views of the multi-domain liquid crystal display devices according to the nineteenth embodiment of the present invention.
Figure 29B:
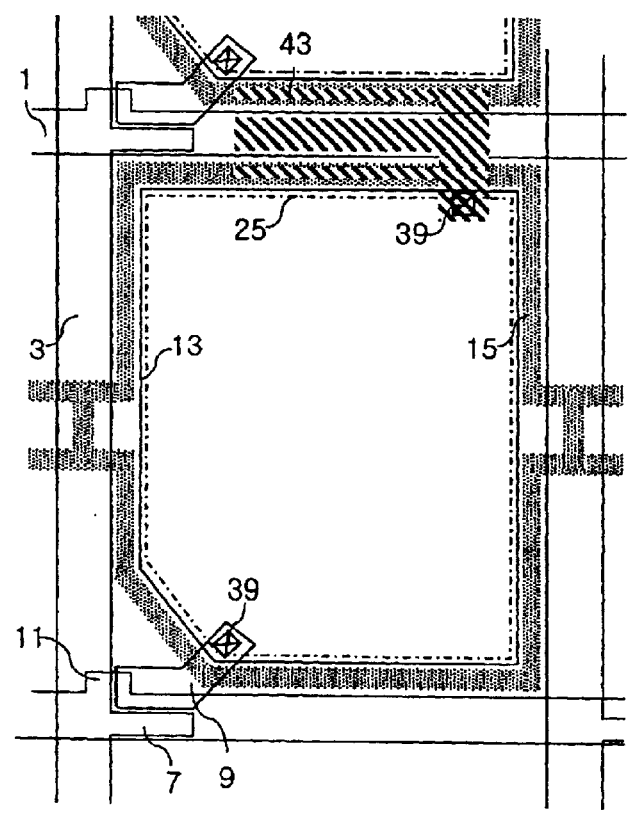
Figure 29C:
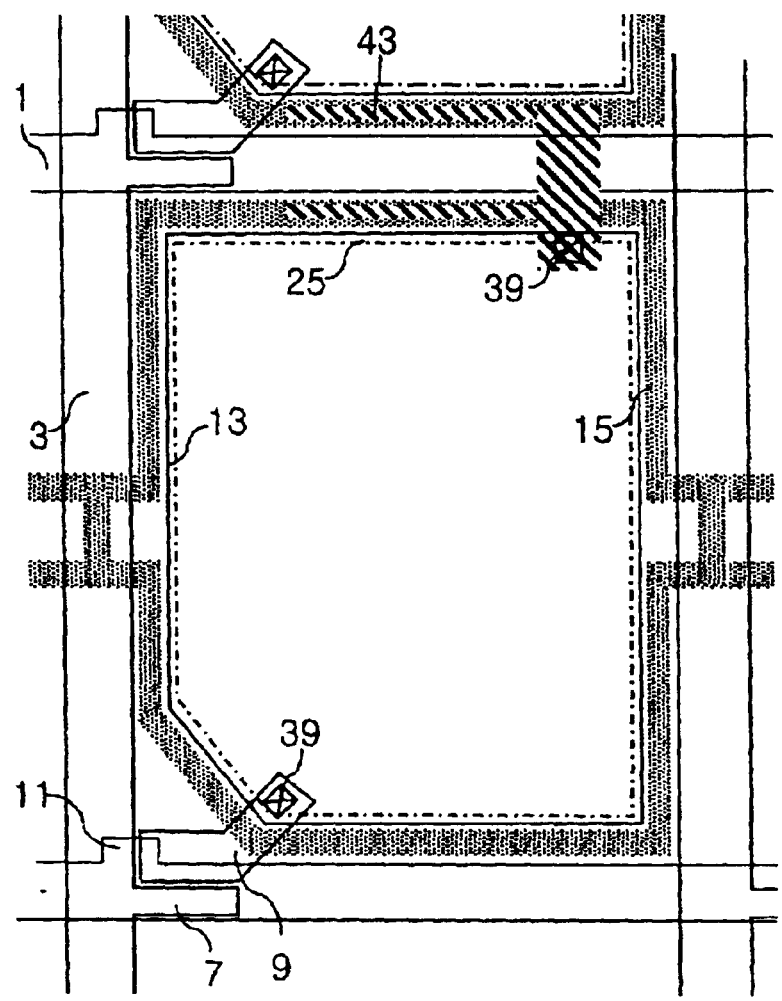
Figure 30A:
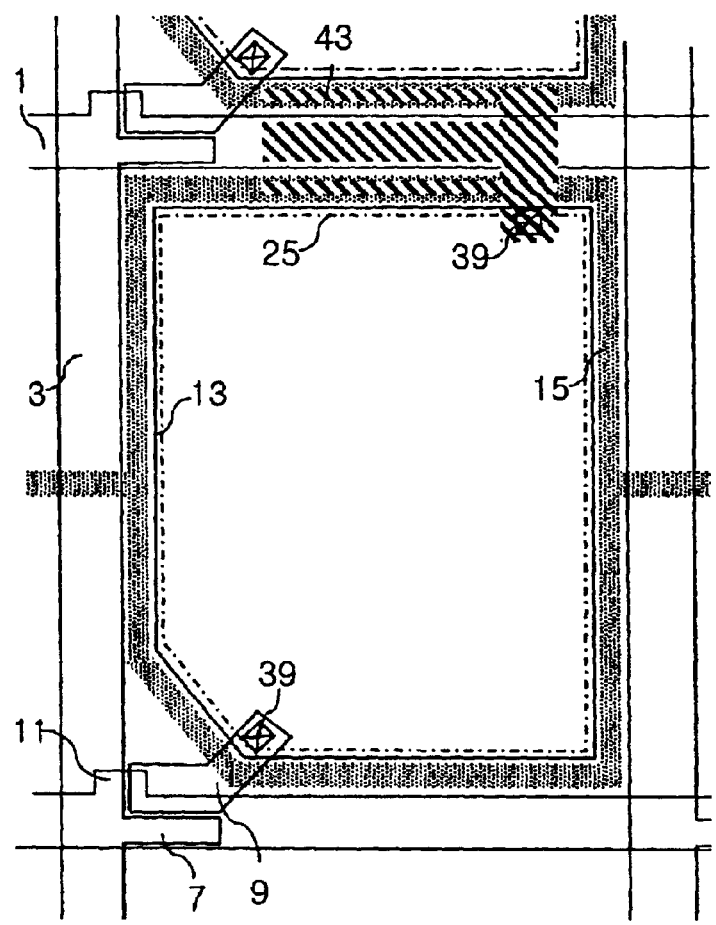
FIGS. 30A and 30B are plan views of the multi-domain liquid crystal display devices according to the twentieth embodiment of the present invention.
Figure 30B:
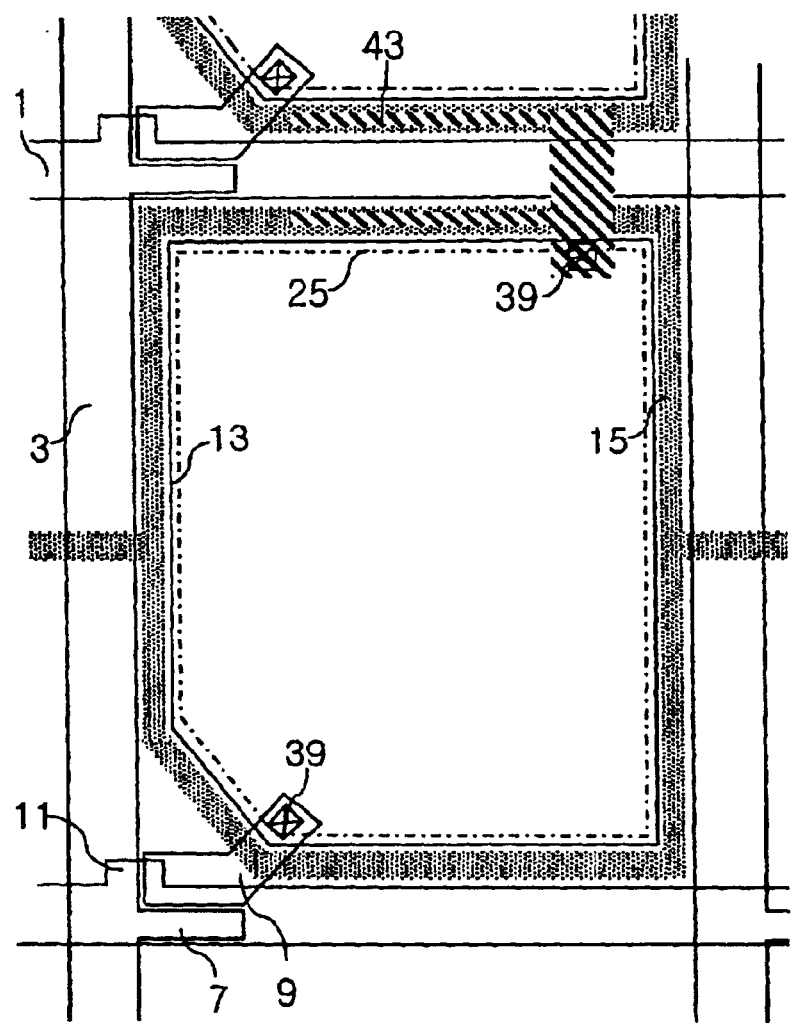
Figure 31A:
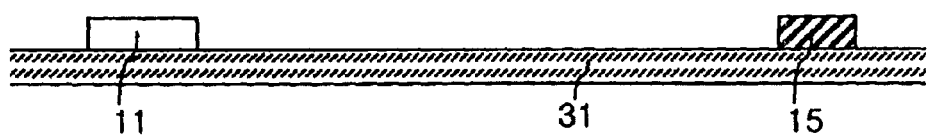
FIGS. 31A to 31E are views showing the forming process of the present multi-domain liquid crystal display device taken along the line X—X of FIG. 2C.
Figure 31B:
Figure 31C:
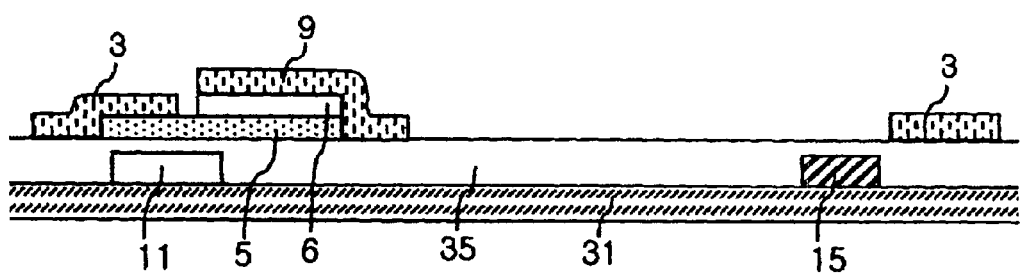
Figure 31D:
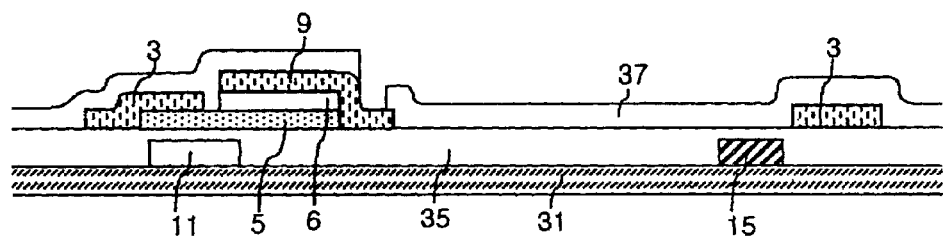
Figure 31E:
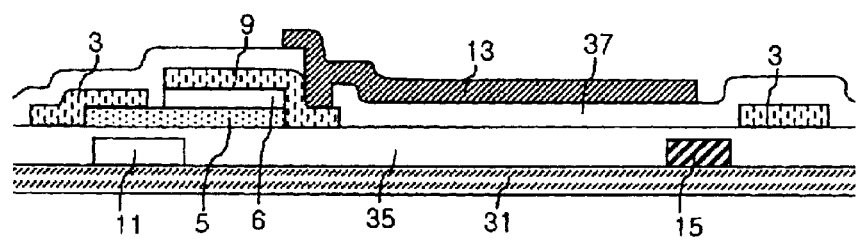

FIGS. 21A to 21C are plan views of the multi-domain liquid crystal display devices according to the fourteenth embodiment of the present invention, FIG. 22 is a sectional view taken along the line VII—VII of FIG. 21A, FIGS. 23A to 24D are sectional views taken along the line VIII—VIII of FIG. 21A, FIG. 24 is a sectional view taken along the line IX—IX of FIG. 21B, FIGS. 25A to 25C are plan views of the multi-domain liquid crystal display devices according to the fifteenth embodiment of the present invention, FIGS. 26A to 26C are plan views of the multi-domain liquid crystal display devices according to the sixteenth embodiment of the present invention, FIGS. 27A to 27C are plan views of the multi-domain liquid crystal display devices according to the seventeenth embodiment of the present invention, FIGS. 28A to 28C are plan views of the multi-domain liquid crystal display devices according to the eighteenth embodiment of the present invention, FIGS. 29A to 29C are plan views of the multi-domain liquid crystal display devices according to the nineteenth embodiment of the present invention, FIGS. 30A and 30B are plan views of the multi-domain liquid crystal display devices according to the twentieth embodiment of the present invention.

Regarding to the multi-domain liquid crystal display devices according to the fourteenth to twentieth embodiments of the present invention, the LCDs have the same structures of the first to sixth embodiments except that the pixel electrode 13 does not overlap the common-auxiliary electrode 15, and the light shielding layer 25 overlaps the pixel electrode 13.

FIG. 22 show the structure that a storage electrode 43 overlaps the common-auxiliary electrode 15 and the gate bus line 1 to obtain storage capacitance.

In the FIG. 24, a storage electrode 43 is formed overlapping the common-auxiliary electrode 15, the gate bus line 1, and a common-auxiliary electrode in a pixel region neighboring the pixel region, or the common-auxiliary electrode 15 and a common-auxiliary electrode in a pixel region neighboring the pixel region to obtain storage capacitance.

FIGS. 23a and 23C show that passivation layer 37 includes $SiN_x$ or $SiO_x$ and FIGS. 23B and 23D show that passivation layer 37 includes BCB or acrylic resin in the LCD. Also, FIGS. 23A and 23B show that dielectric frame 53 is formed on the common electrode 17, and FIGS. 23C and 23D show that window inducing electric field 51 is formed in the common electrode 17.

Figure 32A:
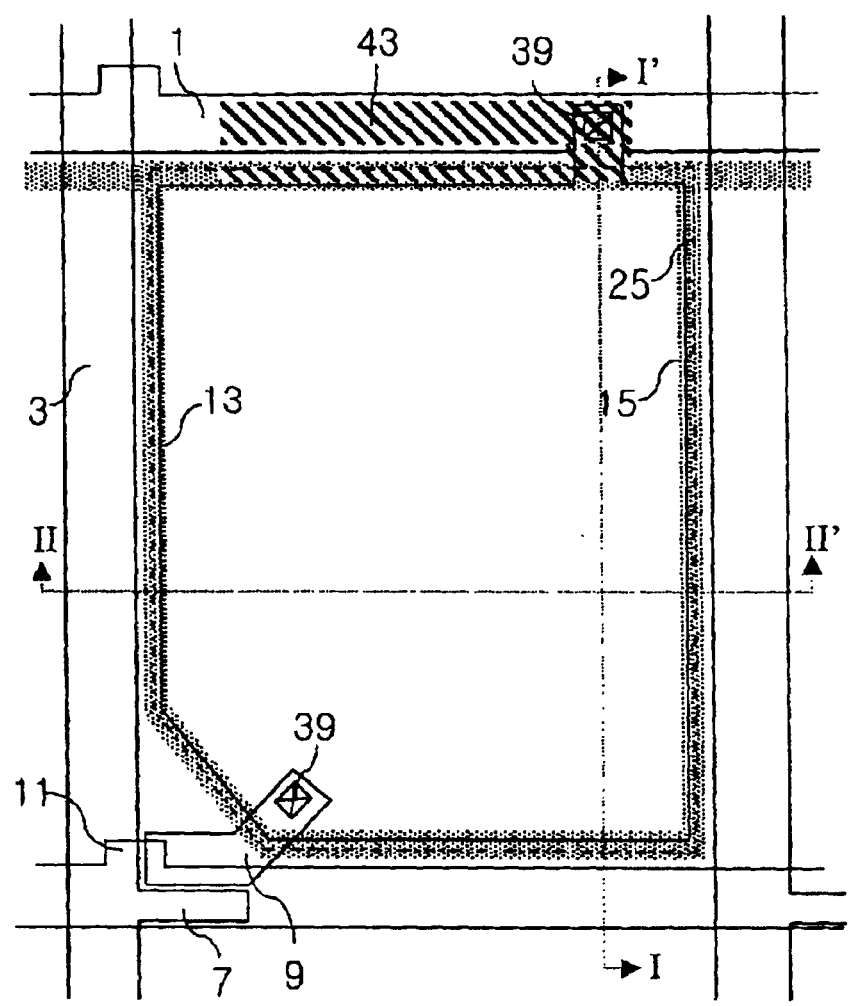
FIGS. 32A to 32G are plan views and sectional views taken along the lines I—I, II—II of FIG. 32A of the multi-domain liquid crystal display device according to the twenty-first embodiment of the present invention.
Figure 32B:
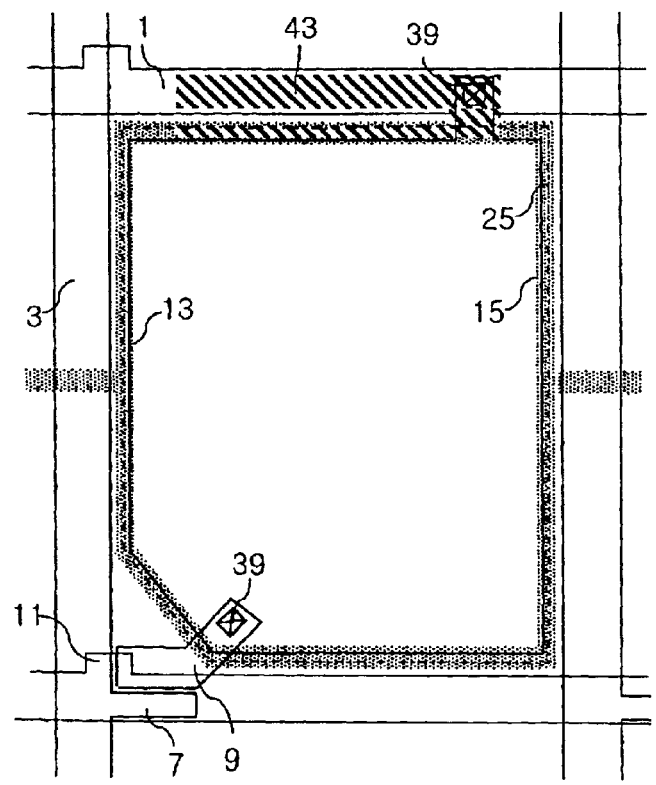
Figure 32C:
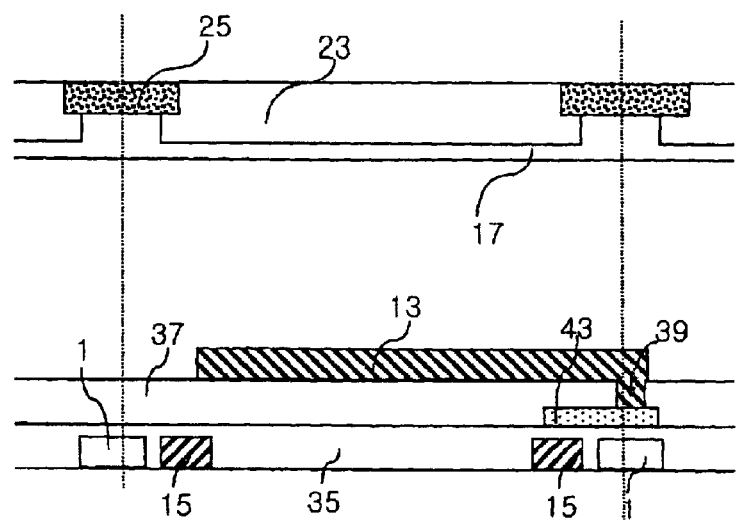

FIGS. 32A and 32B are plan views of the multi-domain liquid crystal display device according to the twenty-first embodiment of the present invention, FIG. 32C is a sectional view taken along the line I—I of FIG. 32A, and FIGS. 32D to 32G are sectional view taken along the lines I—I, II—II of FIG. 32A.

In the twenty-first embodiment of the present invention, the pixel electrode 13 has a prolonged part toward the gate bus line 1 to partially overlap the storage electrode 43, the passivation 37 below the prolonged part is removed to form the contact hole 39 between the pixel electrode 13 and the storage electrode 43.

The pixel electrode 13 overlaps common-auxiliary electrode 15, the light shielding layer 25 overlaps the common-auxiliary electrode 15, and the storage electrode 43 overlaps common-auxiliary electrode 15 and gate bus line 1 to forms a storage capacitance.

Figure 32D:
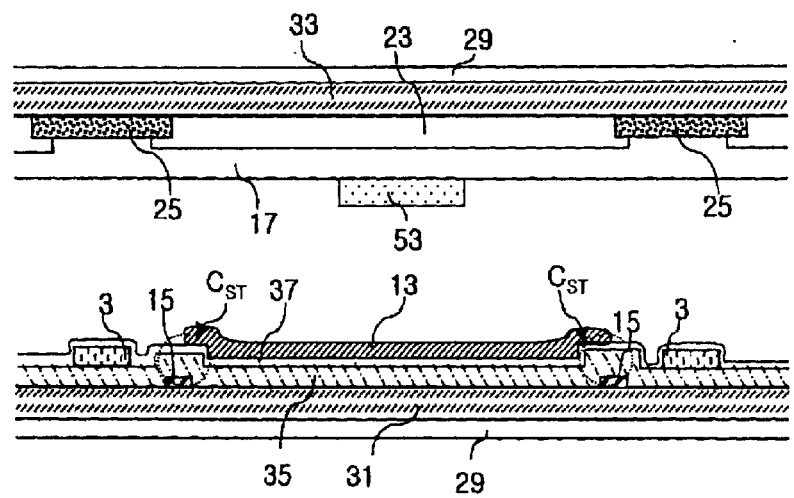
Figure 32E:
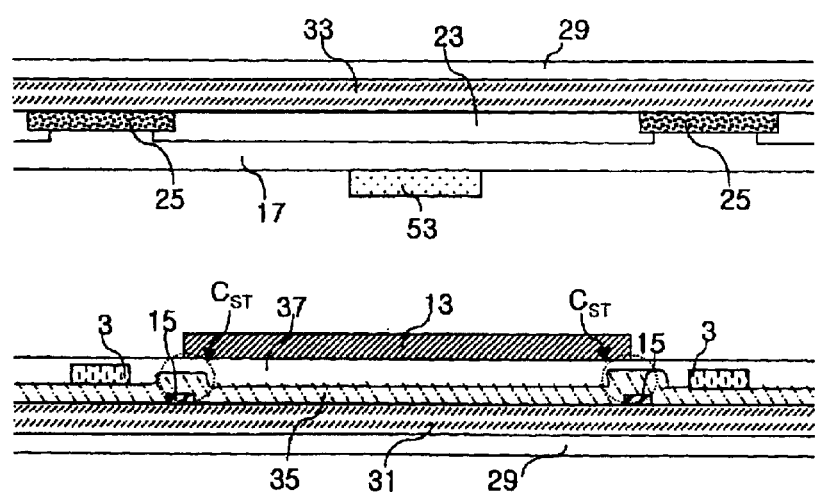
Figure 32F:
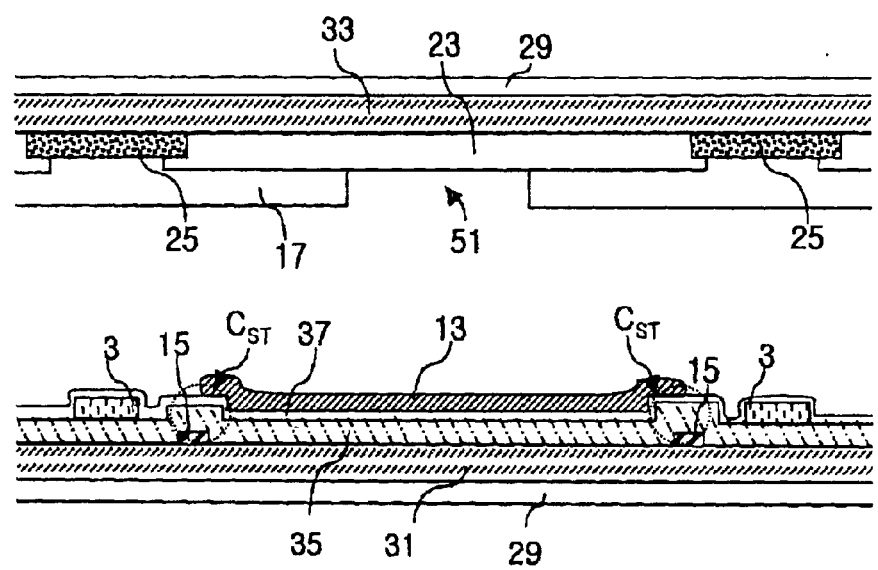
Figure 32G:
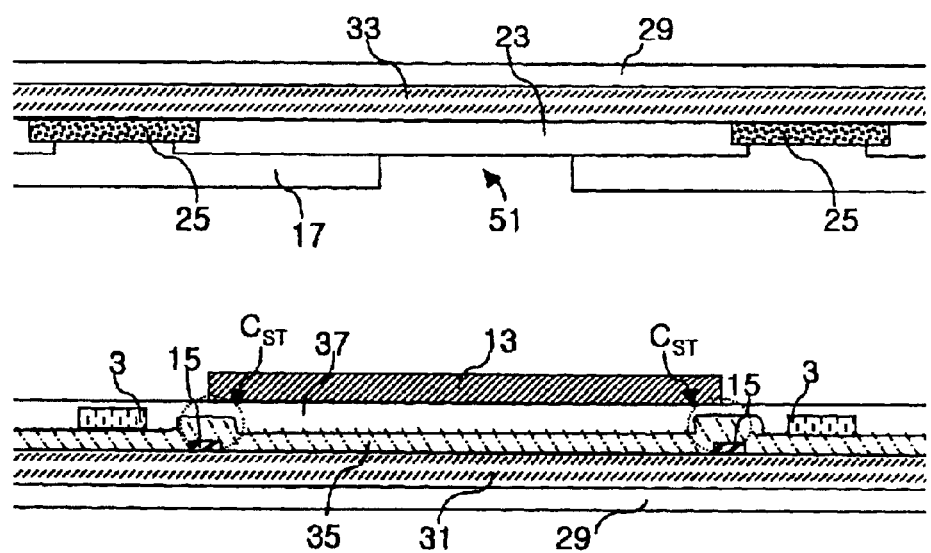

FIGS. 32D and 32E show that dielectric frame 53 is formed on the common electrode 17, and FIGS. 32F, 32G show that electric field inducing window 51 is formed in the common electrode 17. Also, FIGS. 32D and 32F show that passivation layer 37 includes $SiN_x$ or $SiO_x$ and FIGS. 32E and 32G show that passivation layer 37 includes BCB or acrylic resin in the LCD.

Figure 33A:
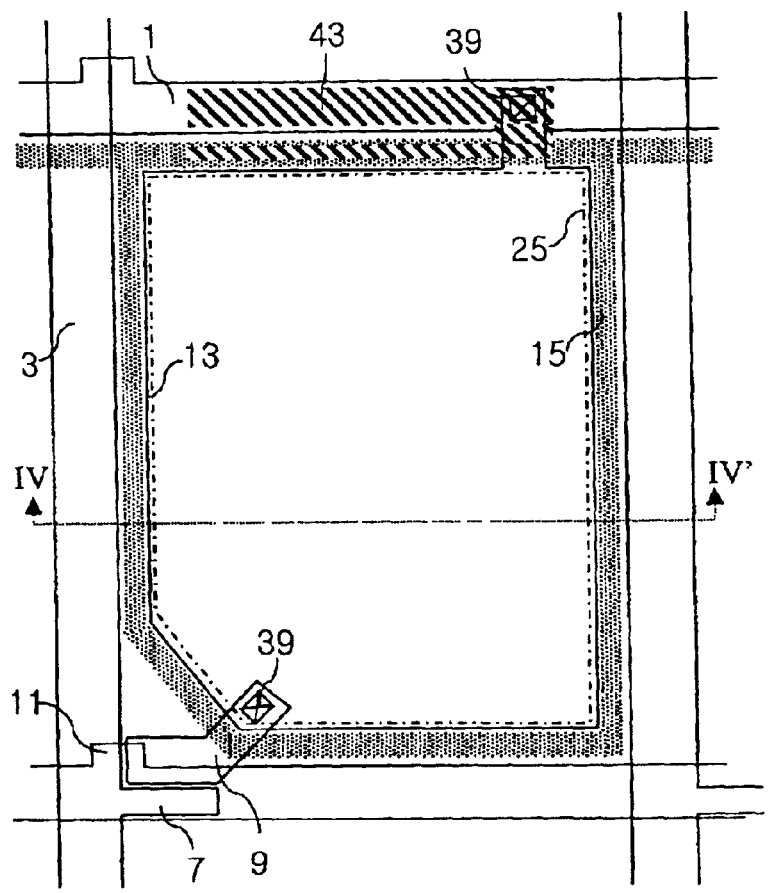
FIGS. 33A to 33H are plan views and sectional views taken along the lines III—III of FIG. 33B and IV—IV of the FIG. 33A of the multi-domain liquid crystal display device according to the twenty-second embodiment of the present invention.
Figure 33B:
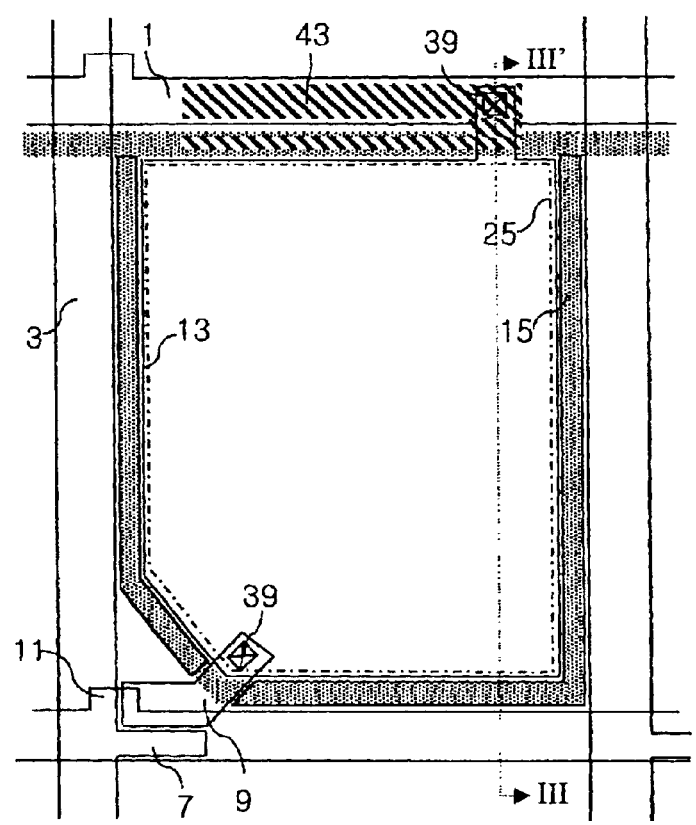
Figure 33C:
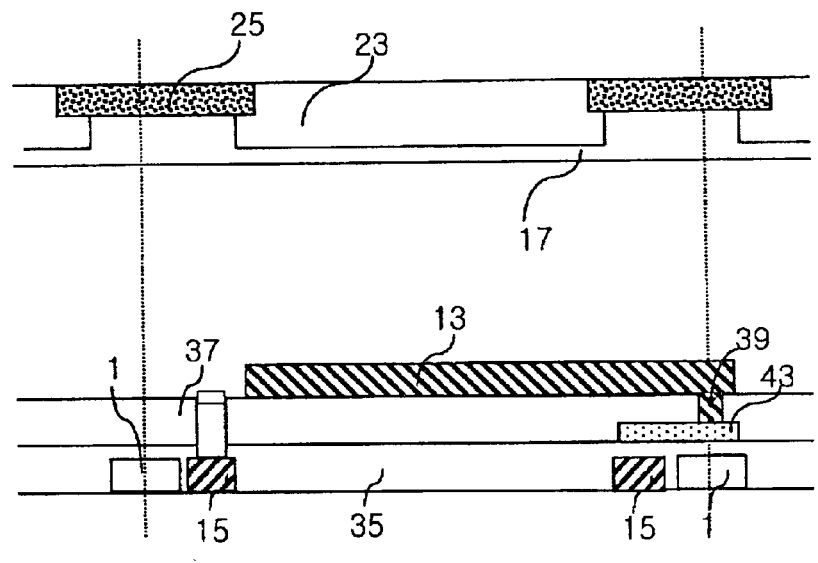
Figure 33D:
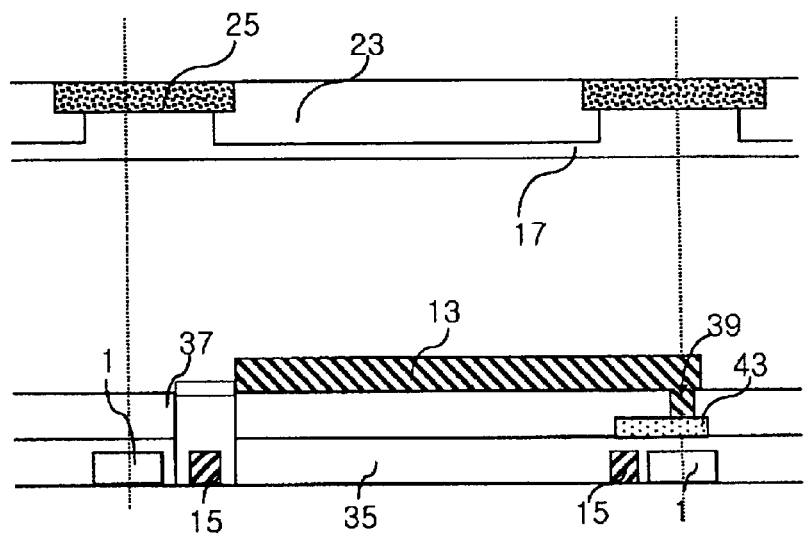

FIGS. 33A, 33B are plan views of the multi-domain liquid crystal display device according to the twenty-second embodiment of the present invention, FIGS. 33C, 33D are sectional views taken along the line III—III of FIG. 33B, and FIGS. 33E to 33H are sectional views taken along the line IV—IV of the FIG. 33A.

The pixel electrode 13 does not overlap common-auxiliary electrode 15, the light shielding layer 25 overlaps the common-auxiliary electrode 15, and the storage electrode 43 overlaps common-auxiliary electrode 15 and gate bus line 1 to forms a storage capacitance.

At this time, the gate insulator 35 and the passivation layer 37 on the common-auxiliary electrode 15 are removed, which intensifies the electric field of common-auxiliary electrode 15 that is applied to the pixel electrode 13.

The FIG. 33C shows a portion of the gate insulator 35 and passivation layer 37 that are removed to expose a part of the common-auxiliary electrode 15, and the FIG. 3D shows that three sides of the common-auxiliary electrode 15 are exposed.

Figure 33E:
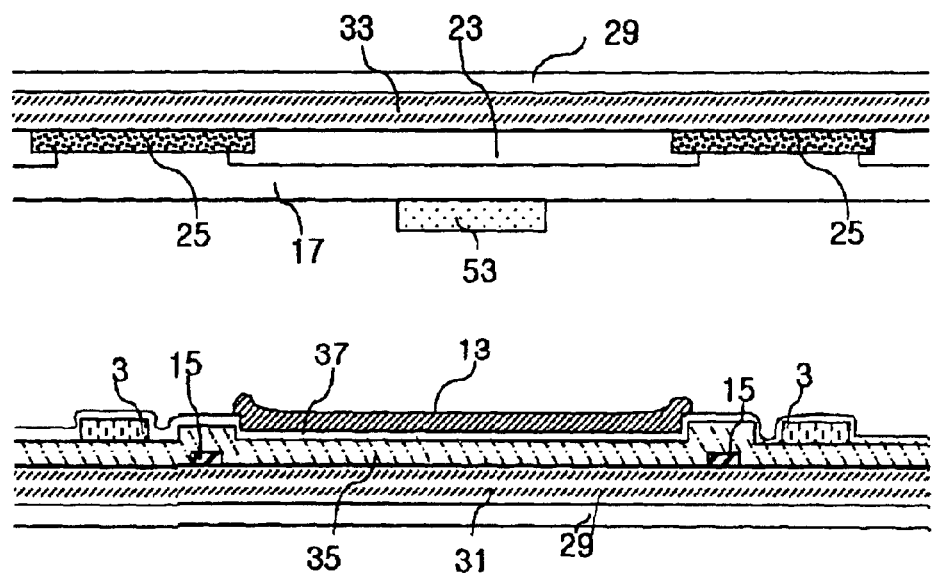
Figure 33F:
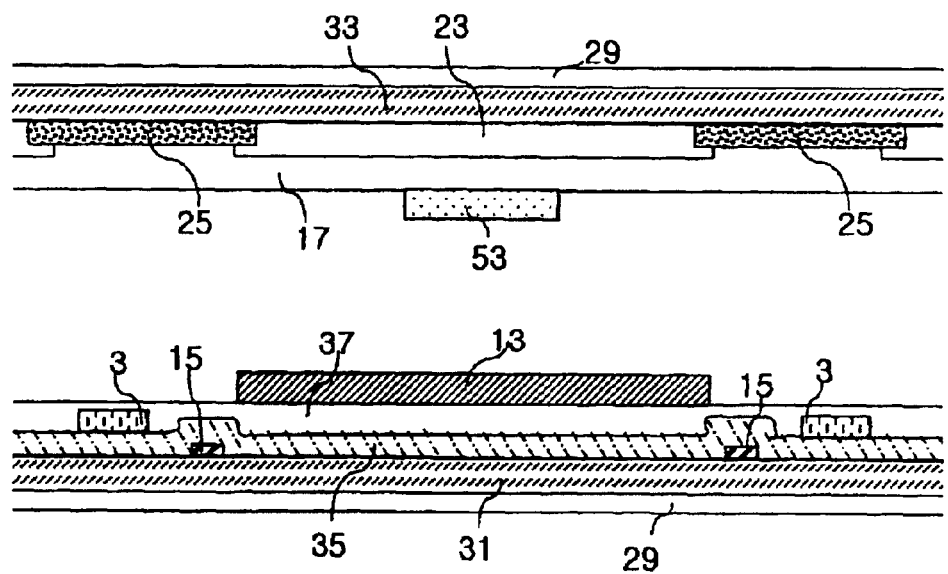
Figure 33G:
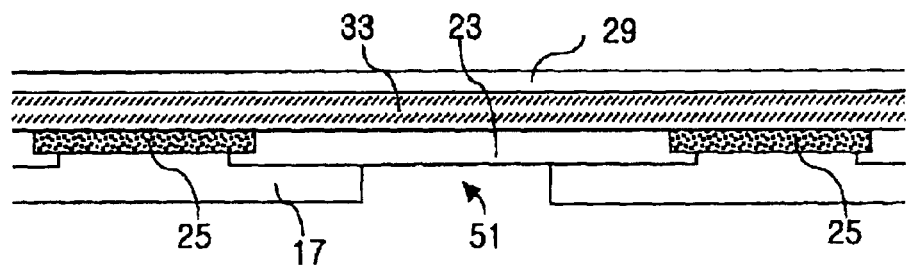
Figure 33G:
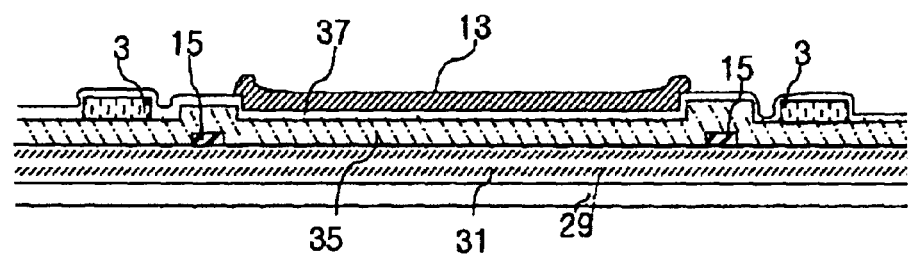
Figure 33H:
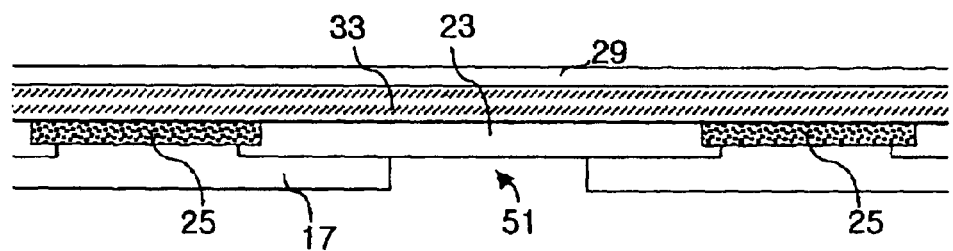
Figure 33H:
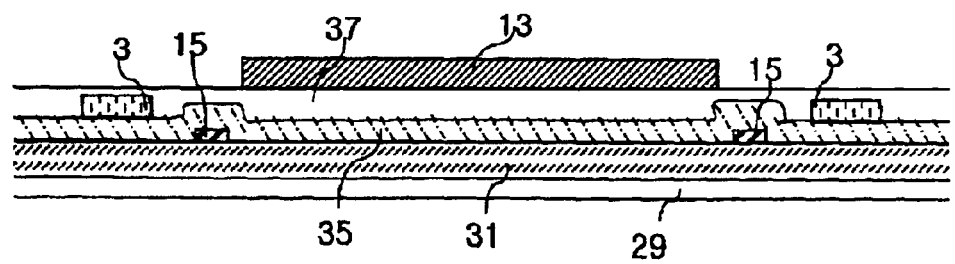

FIGS. 33E and 33F show that dielectric frame 53 is formed on the common electrode 17, and FIGS. 33G, 33H show that electric field inducing window 51 is formed in the common electrode 17. Also, FIGS. 33E and 33G show that passivation layer 37 includes $SiN_x$ or $SiO_x$ and FIGS. 33F and 33H show that passivation layer 37 includes BCB or acrylic resin in the LCD.

Figure 34A:
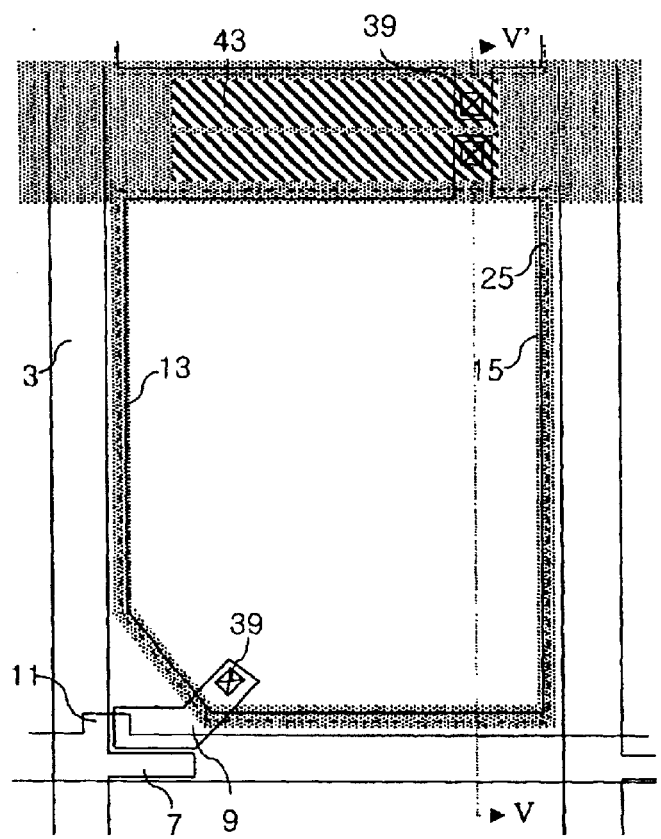
FIGS. 34A and 34B are plan view and sectional view taken along the line V—V of FIG. 34A of the multi-domain liquid crystal display device according to the twenty-third embodiment of the present invention.
Figure 34B:
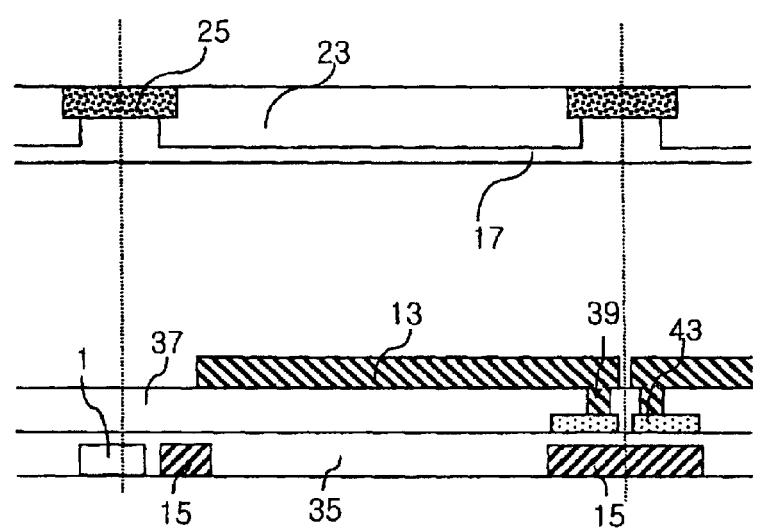

FIGS. 34A and 34B are plan view and sectional view taken along the line V—V of FIG. 34A of the multi-domain liquid crystal display device according to the twenty-third embodiment of the present invention.

In this embodiment, a pair of upper-lower pixel regions co-owns one common-auxiliary electrode 15, and the storage electrodes 43 in the upper-lower pixel regions are formed on the common-auxiliary electrode 15, so that the aperture ratio is largely improved.

The pixel electrode 13 overlaps common-auxiliary electrode 15, the light shielding layer 25 overlaps the common-auxiliary electrode 15, and the storage electrode 43 overlaps common-auxiliary electrode 15 and gate bus line 1 to forms a storage capacitance.

In addition, in this embodiment it is possible to form the dielectric frame 53 on the common electrode 17 or the electric field inducing window 51 in the common electrode 17.

Figure 35A:
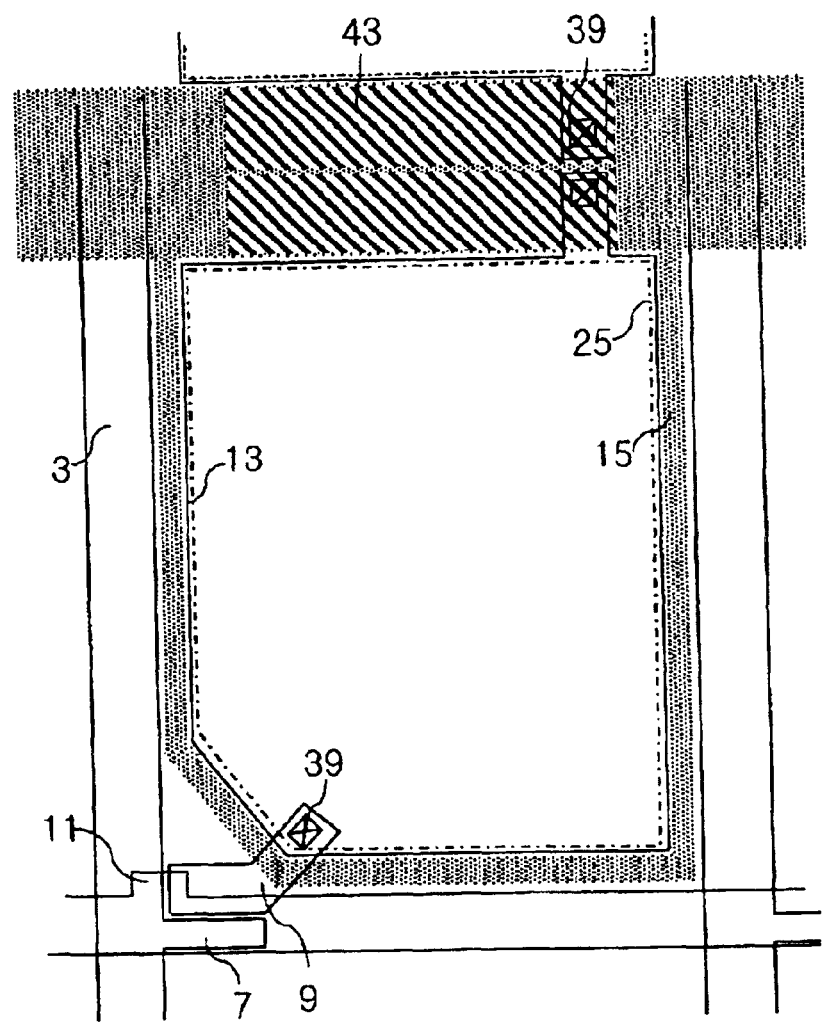
FIGS. 35A and 35B are plan views and sectional views taken along the line VI—VI of FIG. 35B of the multi-domain liquid crystal display device according to the twenty-fourth embodiment of the present invention.
Figure 35B:
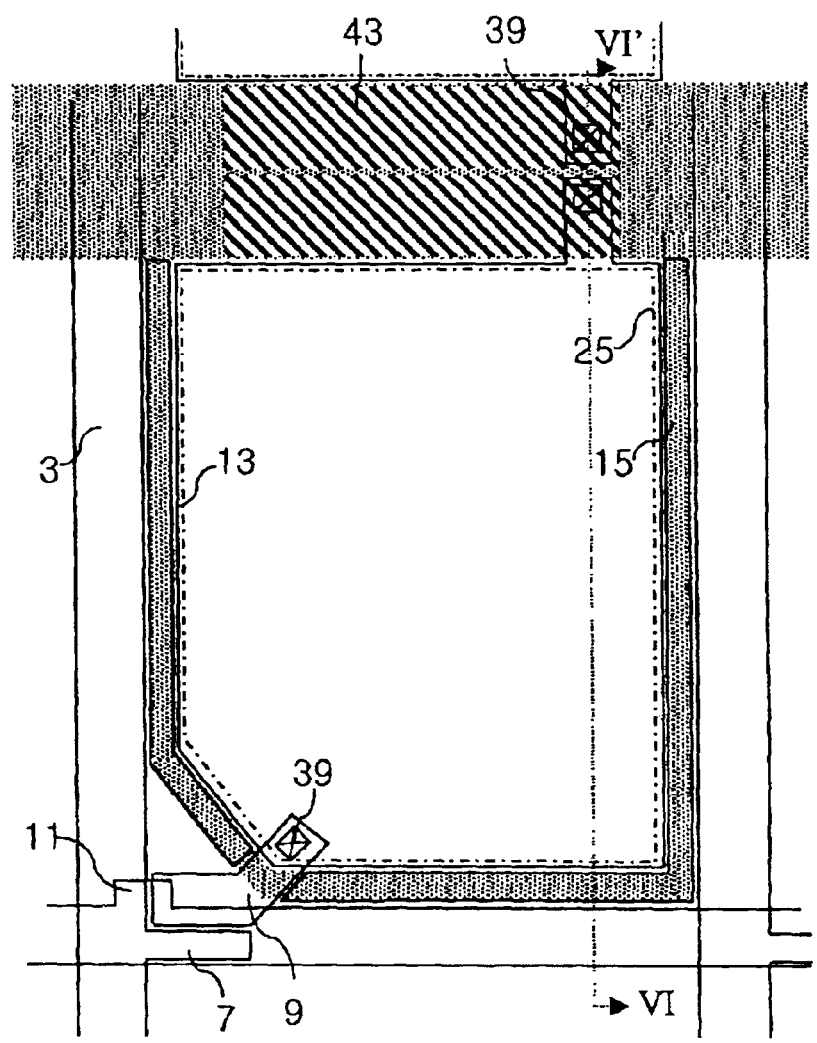

FIGS. 35A and 35B are plan views and sectional views taken along the line VI—VI of FIG. 35B of the multi-domain liquid crystal display device according to the twenty-fourth embodiment of the present invention.

The multi-domain LCD has the same structure as in the third embodiment of the present invention except as follows.

Pixel electrode 13 does not overlap common-auxiliary electrode 15, and the light shielding layer 25 overlaps the pixel electrode 13. At this time, a portion of the gate insulator 35 and passivation layer 37 on the common-auxiliary electrode 15 are removed, which intensifies the electric field of common-auxiliary electrode 15 that is applied to the pixel electrode 13 (refer to FIG. 35B).

Figure 35C:
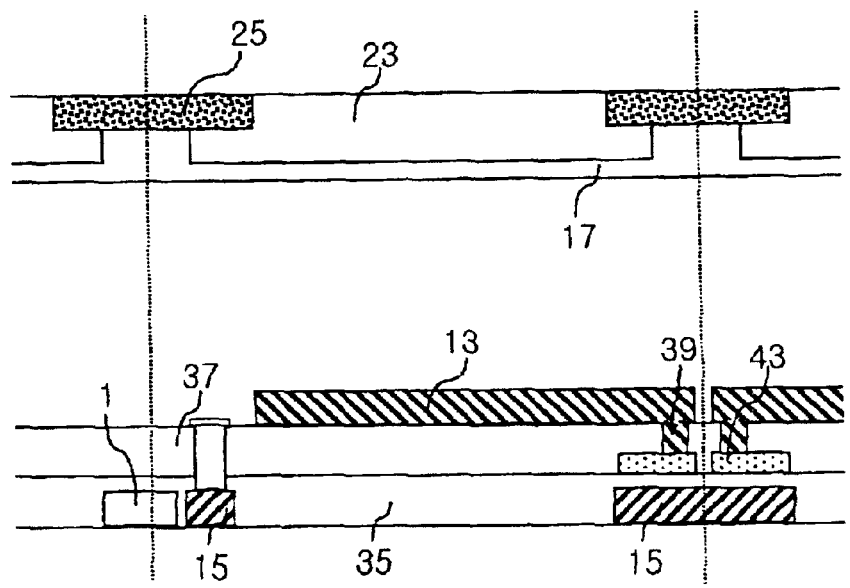
Figure 35D:
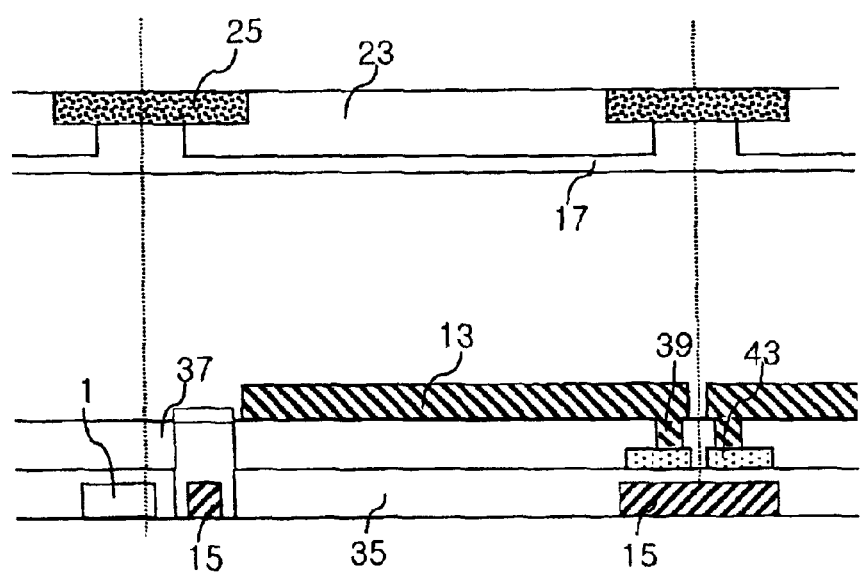
Figure 36A:
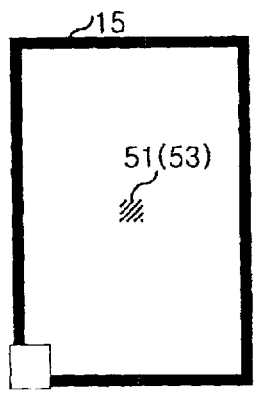
FIGS. 36A to 36G are plan views showing the various windows inducing electric field and dielectric frames according to the embodiments of the present invention.
Figure 36B:
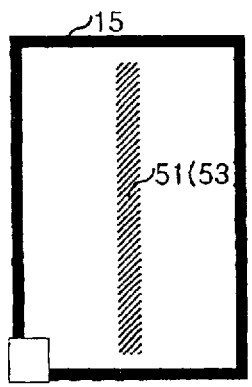
Figure 36C:
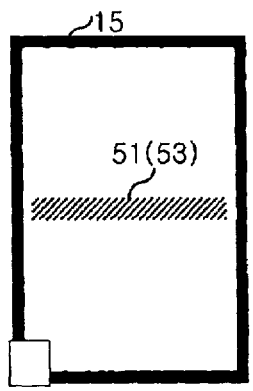
Figure 36D:
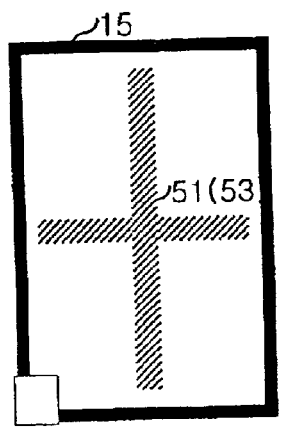
Figure 36E:
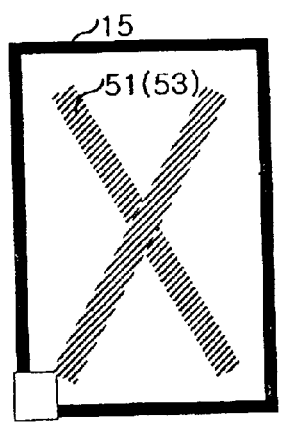
Figure 36F:
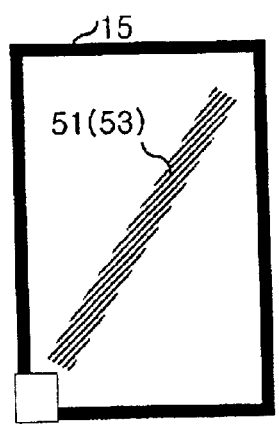
Figure 36G:
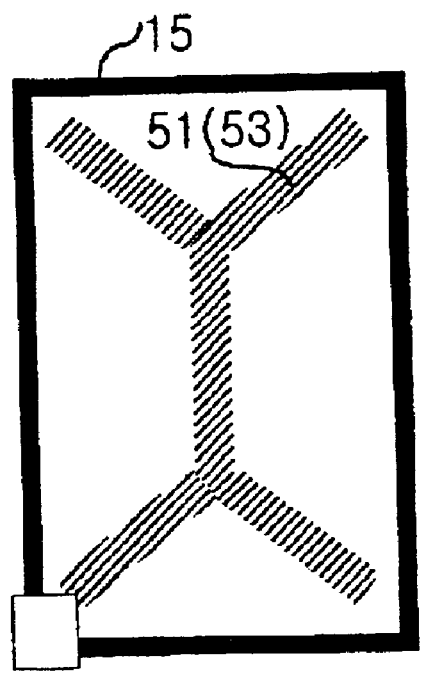

FIG. 35C shows a portion of the gate insulator 35 and passivation layer 37 that are removed to expose a part of the common-auxiliary electrode 15, and the FIG. 35D shows that three sides of the common-auxiliary electrode 15 are exposed.

In the multi-domain LCD of the present invention, the aperture ratio is enhanced by an optimum structure design of a n-line thin film transistor (U.S. Pat. No. 5,694,185) so as to reduce power consumption, increase luminance, and lower reflection, thus improving contrast ratio. Aperture ratio is increased by forming the TFT above the gate line and providing a n-line TFT. The parasitic capacitor, occurring between the gate bus line and the drain electrode, can be reduced when a TFT having the same channel length as the symmetrical TFT structure is manufactured due to effect of channel length extension.

FIGS. 36A to 36G are plan views showing the various windows inducing electric field 51 and dielectric frames 53 according to the embodiments of the present invention.

The multi-domain LCD of the present invention has a dielectric frame 53 on the pixel electrode and/or common electrode, or an window inducing electric field 51 like a hole or slit in the pixel electrode, passivation layer, gate insulator, color filter layer, and/or common electrode by patterning, thereby electric field distortion effect and multi-domain are obtained.

That is, from forming window inducing electric field 51 or dielectric frame 53, the multi-domain is obtained by dividing each pixel into four domains such as in a +, x , or double Y shape, or dividing each pixel horizontally, vertically, and/or diagonally, and differently alignment-treating or forming alignment directions on each domain and on each substrate.

Furthermore, in multi-domain LCD of the present invention, an alignment layer(not shown in the figure) is formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle. The light used in the photo-alignment is preferably a light in a range of ultraviolet light, and any of unpolarized light, linearly polarized light, and partially polarized light can be used.

In the rubbing or photo-alignment treatment, it is possible to apply one or both of the first and second substrates, and to apply different aligning-treatment on each substrate.

From the aligning-treatment, a multi-domain LCD is formed with at least two domains, and LC molecules of the LC layer are aligned differently one another on each domain. That is, the multi-domain is obtained by dividing each pixel into four domains such as in a + or x shape, or dividing each pixel horizontally, vertically, and/or diagonally, and differently alignment-treating or forming alignment directions on each domain and on each substrate.

It is possible to have at least one domain of the divided domains unaligned. It is also possible to have all domains unaligned.

Consequently, since the multi-domain LCD of the present invention forms the gate electrode and the common-auxiliary electrode on the same layer and, a storage electrode 43 overlapping the common-auxiliary electrode 15, the gate bus line 1, and/or a common-auxiliary electrode in a pixel region neighboring the pixel region, an appropriate capacitance is obtained, the viewing angle is improved, and a high voltage is not needed to raise the intensity of the electric field applied between the two electrodes. Also, in the case of conducting an alignment-treatment, a high response time and a stable LC structure can be obtained by a pretilt angle and an anchoring energy. Moreover, the disclination is thus removed to thereby improve the brightness.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device, comprising:

first and second substrates facing each other;

a liquid crystal layer between said first and second substrates;

a plurality of gate bus lines arranged in a first direction on said first substrate and a plurality of data bus lines arranged in a second direction on said first substrate to define a plurality of pixel regions, each pixel region having a common-auxiliary electrode;

a thin film transistor positioned at a crossing area of said data bus line and said gate bus line, said thin film transistor comprising a gate electrode, a semiconductor layer, and source/drain electrodes;

a plurality of pixel electrodes electrically charged through the thin film transistor;

an alignment layer on at least one substrate between said first and second substrates; and a storage electrode overlapping a common-auxiliary electrode in a pixel region neighboring the pixel region in the second direction.

2. The multi-domain liquid crystal display device according to claim 1, wherein the common-auxiliary electrode in a first pixel region of the pixel regions has first connecting parts which connect to the common-auxiliary electrode in a second pixel region of the pixel regions, wherein the second pixel region neighbors the first pixel regions in the first direction.

3. The multi-domain liquid crystal display device according to claim 2, wherein the first connecting parts have second connecting parts which connect to the common-auxiliary electrode in a third pixel region, wherein the third pixel region neighbors the first pixel region in the second direction.

4. The multi-domain liquid crystal display device according to claim 2, wherein the common-auxiliary electrode in the first pixel region has protrusions crossing the first connecting parts.

5. The multi-domain liquid crystal display device according to claim 1, wherein said pixel electrode overlaps said common-auxiliary electrode.

6. The multi-domain liquid crystal display device according to claim 1, further comprising a storage electrode overlapping said gate bus line.

7. The multi-domain liquid crystal display device according to claim 1, wherein said pixel region is divided into at least two portions, liquid crystal molecules in said liquid crystal layer in each portion being driven differently from each other.

8. The multi-domain liquid crystal display device according to claim 1, wherein said alignment layer is divided into at least two portions, liquid crystal molecules in said liquid crystal layer in each portion being aligned differently from each other.

9. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a plurality of pixel region;

a common-auxiliary electrode surrounding said pixel region on a same layer whereon said gate bus line is formed;

a gate insulator over said whole first substrate;

a storage electrode overlapping said gate bus line on the gate insulator, the storage electrode connecting electrically the pixel electrode on an area except the pixel region and the storage electrode overlapping the common-auxiliary electrode in a pixel region neighboring the pixel region in the second direction;

a passivation layer on said gate insulator over said whole first substrate;

a pixel electrode electrically charged through said data bus line in said pixel region;

a light shielding layer on said second substrate;

a color filter layer on said light shielding layer; a common electrode on said color filter layer; and an alignment layer on at least one substrate between said first and second substrates.

10. The multi-domain liquid crystal display device according to claim 9, further comprising;

an n-line thin film transistor positioned at a crossing area of said data bus line and said gate bus line.

11. The multi-domain liquid crystal display device according to claim 9, wherein said pixel electrode overlaps said common-auxiliary electrode.

12. The multi-domain liquid crystal display device according to claim 11, wherein said light shielding layer overlaps said common-auxiliary electrode.

13. The multi-domain liquid crystal display device according to claim 9, wherein said gate insulator and said passivation layer are formed in an area except said common-auxiliary electrode.

14. The multi-domain liquid crystal display device according to claim 9, wherein said cannon-auxiliary electrode is electrically connected to said common electrode.

15. The multi-domain liquid crystal display device according to claim 9, further comprising;

a dielectric frame for distorting electric field on said common electrode.

16. The multi-domain liquid crystal display device according to claim 9, wherein said pixel electrode has a window inducing electric field therein.

17. The multi-domain liquid crystal display device according to claim 9, wherein said passivation layer has a window inducing electric field therein.

18. The multi-domain liquid crystal display device according to claim 9, wherein said gate insulator has a window inducing electric field therein.

19. The multi-domain liquid crystal display device according to claim 9, wherein said common electrode has a window inducing electric field therein.

20. The multi-domain liquid crystal display device according to claim 9, wherein said color filter layer has a window inducing electric field therein.

21. The multi-domain liquid crystal display device according to claim 9, further comprising;

an over coat layer on said color filter layer.

22. The multi-domain liquid crystal display device according to claim 21, wherein said over coat layer has a window inducing electric field therein.

23. The multi-domain liquid crystal display device according to claim 9, wherein said passivation layer includes a material selected from the group consisting of BCB (BenzoCycloButene), acrylic resin, and polyimide compound.

24. The multi-domain liquid crystal display device according to claim 9, wherein said common-auxiliary electrode includes a material selected from the group consisting of ITO (indium tin oxide), aluminum, molybdenum, chromium, tantalum, titanium, and an alloy thereof.

25. The multi-domain liquid crystal display device according to claim 9, wherein said pixel electrode includes a material selected from the group consisting of ISO (indium tin oxide), aluminum, and chromium.

26. The multi-domain liquid crystal display device according to claim 9, wherein said common electrode includes ITO (indium tin oxide).

27. The multi-domain liquid crystal display device according to claim 9, wherein said pixel region is divided into at least two portions, liquid crystal molecules in said liquid crystal layer in each portion being driven differently from each other.

28. The multi-domain liquid crystal display device according to claim 9, wherein said alignment lay-r is divided into at least two portions, liquid crystal molecules in said liquid crystal layer in each portion being aliened differently from each other.

29. The multi-domain liquid crystal display device according to claim 28, wherein all portions of said at least two portions of the alignment layer are non alignment-treated.

30. The multi-domain liquid crystal display device according to claim 9, wherein said liquid cry-tal layer includes liquid crystal molecules having negative dielectric anisotropy.

31. The multi-domain liquid crystal di-play device according to claim 9, further comprising:

a negative biaxial film on at least one substrate.

32. The multi-domain liquid crystal display device according to claim 9, wherein said liquid crystal layer includes chiral dopants.

* * * * *